US 8,224,859 B2

(12) United States Patent
Guyan et al.

(10) Patent No.: US 8,224,859 B2
(45) Date of Patent: *Jul. 17, 2012

(54) COMPONENT BASED INFORMATION LINKING DURING CLAIM PROCESSING

(75) Inventors: George V. Guyan, Bethlehem, PA (US); Robert H. Pish, Minneapolis, MN (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/180,318

(22) Filed: Jul. 11, 2011

(65) Prior Publication Data

US 2011/0270898 A1 Nov. 3, 2011

Related U.S. Application Data

(63) Continuation of application No. 09/305,146, filed on May 4, 1999, now Pat. No. 7,979,382.

(51) Int. Cl.
*G06F 17/00* (2006.01)

(52) U.S. Cl. ........ 707/791; 707/793; 707/795; 707/796; 707/802; 707/803

(58) Field of Classification Search ............... 707/791, 707/793, 795, 796, 802, 803, 806, 812
See application file for complete search history.

(56) References Cited

U.S. PATENT DOCUMENTS

| 4,648,037 A | 3/1987 | Valentino |
| 4,713,755 A | 12/1987 | Worley, Jr. et al. |
| 4,796,181 A | 1/1989 | Wiedemer |
| 4,831,526 A | 5/1989 | Luchs et al. |
| 4,975,840 A | 12/1990 | DeTore et al. |
| 5,093,794 A | 3/1992 | Howie et al. |
| 5,128,859 A | 7/1992 | Carbone et al. |
| 5,181,162 A | 1/1993 | Smith et al. |

(Continued)

FOREIGN PATENT DOCUMENTS

EP 0841612 A2 5/1998

(Continued)

OTHER PUBLICATIONS

Stipulation and Order of Partial Dismissal filed Jun. 17, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 4 pages.

(Continued)

*Primary Examiner* — Sana Al Hashemi
(74) *Attorney, Agent, or Firm* — Brinks Hofer Gilson & Lione

(57) ABSTRACT

A computer system includes a server computer and an insurance claim database. The insurance claim database stores data in electronic format and includes a claim folder that decomposes data of an insurance claim for an insured event into a plurality of levels, the plurality of levels including a policy level, a claim level, a participant level and a line level. The server computer is configured to generate a user interactive interface that interactively displays at least one of the plurality of levels reflecting information related to a policy, the claim, claimants and an insured person in a structured format to a plurality of users, and to allow each of the users to simultaneously interact with one of the plurality of levels to retrieve and enter data for the same insurance claim.

25 Claims, 18 Drawing Sheets

U.S. PATENT DOCUMENTS

| | | |
|---|---|---|
| 5,182,705 A | 1/1993 | Barr et al. |
| 5,191,522 A | 3/1993 | Bosco et al. |
| 5,208,748 A | 5/1993 | Flores et al. |
| 5,216,603 A | 6/1993 | Flores et al. |
| 5,241,664 A | 8/1993 | Ohba et al. |
| 5,253,362 A | 10/1993 | Nolan et al. |
| 5,307,262 A | 4/1994 | Ertel |
| 5,325,291 A | 6/1994 | Garrett |
| 5,367,619 A | 11/1994 | Dipaolo et al. |
| 5,392,428 A | 2/1995 | Robins |
| 5,404,518 A | 4/1995 | Gilbertson et al. |
| 5,420,973 A | 5/1995 | Dagdeviren |
| 5,445,653 A | 8/1995 | Hixson et al. |
| 5,446,653 A | 8/1995 | Miller et al. |
| 5,523,942 A | 6/1996 | Tyler et al. |
| 5,530,861 A | 6/1996 | Diamant et al. |
| 5,557,515 A | 9/1996 | Abbruzzese et al. |
| 5,581,682 A | 12/1996 | Anderson et al. |
| 5,592,611 A | 1/1997 | Midgely et al. |
| 5,613,108 A | 3/1997 | Morikawa |
| 5,627,764 A | 5/1997 | Schutzman et al. |
| 5,630,069 A | 5/1997 | Flores et al. |
| 5,632,015 A | 5/1997 | Zimowski et al. |
| 5,640,501 A | 6/1997 | Turpin |
| 5,649,182 A | 7/1997 | Reitz |
| 5,655,085 A | 8/1997 | Ryan et al. |
| 5,664,109 A | 9/1997 | Johnson et al. |
| 5,671,360 A | 9/1997 | Hambrick et al. |
| 5,673,402 A | 9/1997 | Ryan et al. |
| 5,675,745 A | 10/1997 | Oku et al. |
| 5,687,385 A | 11/1997 | Janay |
| 5,692,501 A | 12/1997 | Minturn |
| 5,701,400 A | 12/1997 | Amado |
| 5,706,452 A | 1/1998 | Ivanov |
| 5,721,913 A | 2/1998 | Ackroff et al. |
| 5,721,940 A | 2/1998 | Luther et al. |
| 5,724,575 A | 3/1998 | Hoover et al. |
| 5,726,884 A | 3/1998 | Sturgeon et al. |
| 5,734,837 A | 3/1998 | Flores et al. |
| 5,742,836 A | 4/1998 | Turpin et al. |
| 5,745,687 A | 4/1998 | Randell |
| 5,745,901 A | 4/1998 | Entner et al. |
| 5,752,055 A | 5/1998 | Redpath et al. |
| 5,758,351 A | 5/1998 | Gibson et al. |
| 5,765,170 A | 6/1998 | Morikawa |
| 5,768,506 A | 6/1998 | Randell |
| 5,790,116 A | 8/1998 | Malone et al. |
| 5,799,297 A | 8/1998 | Goodridge et al. |
| 5,809,318 A | 9/1998 | Rivette et al. |
| 5,809,478 A | 9/1998 | Greco et al. |
| 5,819,230 A | 10/1998 | Christie et al. |
| 5,826,020 A | 10/1998 | Randell |
| 5,826,237 A | 10/1998 | Macrae et al. |
| 5,826,239 A | 10/1998 | Du et al. |
| 5,836,011 A | 11/1998 | Hambrick et al. |
| 5,839,112 A | 11/1998 | Schreitmueller et al. |
| 5,845,289 A | 12/1998 | Baumeister et al. |
| 5,848,271 A | 12/1998 | Caruso et al. |
| 5,848,393 A | 12/1998 | Goodridge et al. |
| 5,855,005 A | 12/1998 | Schuler et al. |
| 5,860,066 A | 1/1999 | Rouse |
| 5,862,327 A | 1/1999 | Kwang et al. |
| 5,867,385 A | 2/1999 | Brown et al. |
| 5,870,711 A | 2/1999 | Huffman |
| 5,873,066 A | 2/1999 | Underwood et al. |
| 5,875,330 A | 2/1999 | Goti |
| 5,881,230 A | 3/1999 | Christensen et al. |
| 5,884,256 A | 3/1999 | Bennett et al. |
| 5,886,693 A | 3/1999 | Ho et al. |
| 5,890,130 A | 3/1999 | Cox et al. |
| 5,890,133 A | 3/1999 | Ernst |
| 5,899,989 A | 5/1999 | Ikeuchi et al. |
| 5,903,873 A | 5/1999 | Peterson et al. |
| 5,907,828 A | 5/1999 | Meyer et al. |
| 5,920,696 A | 7/1999 | Brandt et al. |
| 5,925,100 A | 7/1999 | Drewry et al. |
| 5,940,804 A | 8/1999 | Turley et al. |
| 5,946,694 A | 8/1999 | Copeland et al. |
| 5,950,169 A | 9/1999 | Borghesi et al. |
| 5,956,687 A | 9/1999 | Wamsley et al. |
| 5,970,464 A | 10/1999 | Apte et al. |
| 5,974,390 A | 10/1999 | Ross |
| 5,987,247 A | 11/1999 | Lau |
| 5,991,733 A | 11/1999 | Aleia et al. |
| 5,999,911 A | 12/1999 | Berg et al. |
| 6,002,396 A | 12/1999 | Davies |
| 6,003,007 A | 12/1999 | DiRienzo |
| 6,003,011 A | 12/1999 | Sarin et al. |
| 6,012,066 A | 1/2000 | Discount et al. |
| 6,021,418 A | 2/2000 | Brandt et al. |
| 6,023,572 A | 2/2000 | Lautzenheiser et al. |
| 6,023,578 A | 2/2000 | Birsan et al. |
| 6,028,997 A | 2/2000 | Leymann et al. |
| 6,038,590 A | 3/2000 | Gish |
| 6,041,304 A | 3/2000 | Meyer et al. |
| 6,044,382 A | 3/2000 | Martino |
| 6,044,384 A | 3/2000 | Ishima et al. |
| 6,049,773 A | 4/2000 | McCormack et al. |
| 6,055,519 A | 4/2000 | Kennedy et al. |
| 6,058,413 A | 5/2000 | Flores et al. |
| 6,061,665 A | 5/2000 | Bahreman |
| 6,065,000 A | 5/2000 | Jensen |
| 6,065,009 A | 5/2000 | Leymann et al. |
| 6,067,525 A | 5/2000 | Johnson et al. |
| 6,070,152 A | 5/2000 | Carey et al. |
| 6,073,109 A | 6/2000 | Flores et al. |
| 6,076,066 A | 6/2000 | DiRienzo et al. |
| 6,078,890 A | 6/2000 | Mangin et al. |
| 6,098,070 A | 8/2000 | Maxwell |
| 6,108,673 A | 8/2000 | Brandt et al. |
| 6,112,190 A | 8/2000 | Fletcher et al. |
| 6,115,646 A | 9/2000 | Fiszman et al. |
| 6,119,093 A | 9/2000 | Walker et al. |
| 6,125,363 A | 9/2000 | Buzzeo et al. |
| 6,131,155 A | 10/2000 | Alexander et al. |
| 6,134,536 A | 10/2000 | Shepherd |
| 6,141,011 A | 10/2000 | Bodnar et al. |
| 6,151,660 A | 11/2000 | Aoki |
| 6,158,044 A * | 12/2000 | Tibbetts ...................... 717/100 |
| 6,163,781 A | 12/2000 | Wess, Jr. |
| 6,163,784 A | 12/2000 | Taguchi |
| 6,170,002 B1 | 1/2001 | Ouchi |
| 6,182,274 B1 | 1/2001 | Lau |
| 6,199,099 B1 | 3/2001 | Gershman et al. |
| 6,223,164 B1 | 4/2001 | Seare et al. |
| 6,230,169 B1 | 5/2001 | Nagae |
| 6,233,537 B1 | 5/2001 | Gryphon et al. |
| 6,253,369 B1 | 6/2001 | Cloud et al. |
| 6,256,636 B1 | 7/2001 | Choy |
| 6,266,645 B1 | 7/2001 | Simpson |
| 6,266,666 B1 | 7/2001 | Ireland et al. |
| 6,272,482 B1 | 8/2001 | McKee et al. |
| 6,278,977 B1 | 8/2001 | Agrawal et al. |
| 6,279,009 B1 | 8/2001 | Smirnov et al. |
| 6,289,348 B1 | 9/2001 | Richard et al. |
| 6,289,385 B1 | 9/2001 | Whipple et al. |
| 6,308,224 B1 | 10/2001 | Leymann et al. |
| 6,311,192 B1 | 10/2001 | Rosenthal et al. |
| 6,321,133 B1 | 11/2001 | Smirnov et al. |
| 6,321,374 B1 | 11/2001 | Choy |
| 6,327,046 B1 | 12/2001 | Miyamoto et al. |
| 6,330,541 B1 | 12/2001 | Meyer et al. |
| 6,332,155 B1 | 12/2001 | Notani |
| 6,334,146 B1 | 12/2001 | Parasnis et al. |
| 6,336,096 B1 | 1/2002 | Jernberg |
| 6,343,271 B1 | 1/2002 | Peterson et al. |
| 6,347,303 B2 | 2/2002 | Nagai et al. |
| 6,349,238 B1 | 2/2002 | Gabbita et al. |
| 6,349,320 B1 | 2/2002 | Emberton et al. |
| 6,356,905 B1 | 3/2002 | Gershman et al. |
| 6,370,508 B2 | 4/2002 | Beck et al. |
| 6,380,951 B1 | 4/2002 | Petchenkine et al. |
| 6,389,588 B1 | 5/2002 | Wadhwa et al. |
| 6,393,431 B1 | 5/2002 | Salvati et al. |
| 6,393,456 B1 | 5/2002 | Ambler et al. |
| 6,397,191 B1 | 5/2002 | Notani et al. |
| 6,397,192 B1 | 5/2002 | Notani et al. |

| | | |
|---|---|---|
| 6,415,259 B1 | 7/2002 | Wolfinger et al. |
| 6,426,759 B1 | 7/2002 | Ting et al. |
| 6,442,528 B1 | 8/2002 | Notani et al. |
| 6,442,557 B1 | 8/2002 | Buteau et al. |
| 6,442,563 B1 | 8/2002 | Bacon et al. |
| 6,470,303 B2 | 10/2002 | Kidd et al. |
| 6,493,675 B1 | 12/2002 | Kanaya et al. |
| 6,501,832 B1 | 12/2002 | Saylor et al. |
| 6,505,176 B2 | 1/2003 | DeFrancesco, Jr. et al. |
| 6,516,322 B1 | 2/2003 | Meredith |
| 6,519,578 B1 | 2/2003 | Reddy |
| 6,535,883 B1 | 3/2003 | Lee et al. |
| 6,546,396 B1 | 4/2003 | Borkowski et al. |
| 6,549,893 B1 | 4/2003 | Lannert et al. |
| 6,567,783 B1 | 5/2003 | Notani et al. |
| 6,574,636 B1 | 6/2003 | Balon et al. |
| 6,606,740 B1 | 8/2003 | Lynn et al. |
| 6,625,602 B1 | 9/2003 | Meredith et al. |
| 6,632,251 B1 | 10/2003 | Rutten et al. |
| 6,651,060 B1 | 11/2003 | Harper et al. |
| 6,671,692 B1 | 12/2003 | Farner et al. |
| 6,671,693 B1 | 12/2003 | Marpe et al. |
| 6,671,716 B1 | 12/2003 | Marpe et al. |
| 6,679,959 B2 | 1/2004 | Boyd et al. |
| 6,684,190 B1 | 1/2004 | Powers et al. |
| 6,687,557 B2 | 2/2004 | Ouchi |
| 6,687,878 B1 | 2/2004 | Eintracht et al. |
| 6,697,784 B2 | 2/2004 | Bacon et al. |
| 6,714,914 B1 | 3/2004 | Peters et al. |
| 6,725,224 B1 | 4/2004 | McCarthy et al. |
| 6,728,947 B1 | 4/2004 | Bengston |
| 6,738,736 B1 | 5/2004 | Bond |
| 6,738,757 B1 | 5/2004 | Wynne et al. |
| 6,763,353 B2 | 7/2004 | Li et al. |
| 6,768,984 B2 | 7/2004 | Allen et al. |
| 6,769,112 B1 | 7/2004 | Montana et al. |
| 6,810,383 B1 | 10/2004 | Loveland |
| 6,826,579 B1 | 11/2004 | Leymann et al. |
| 6,832,368 B1 | 12/2004 | Zimowski |
| 6,862,732 B1 | 3/2005 | Schultz et al. |
| 6,868,193 B1 | 3/2005 | Gharbia et al. |
| 6,874,008 B1 | 3/2005 | Eason et al. |
| 6,877,153 B2 | 4/2005 | Konnersman |
| 6,879,959 B1 | 4/2005 | Chapman et al. |
| 6,888,929 B1 | 5/2005 | Saylor et al. |
| 6,889,375 B1 | 5/2005 | Chan et al. |
| 6,895,084 B1 | 5/2005 | Saylor et al. |
| 6,896,574 B2 | 5/2005 | Needham et al. |
| 6,898,574 B1 | 5/2005 | Regan |
| 6,901,405 B1 | 5/2005 | McCrady et al. |
| 6,918,053 B1 | 7/2005 | Thatte et al. |
| 6,920,456 B2 | 7/2005 | Lee et al. |
| 6,925,593 B1 | 8/2005 | Knutson et al. |
| 6,928,487 B2 | 8/2005 | Eggebraaten et al. |
| 6,937,990 B1 | 8/2005 | Walker et al. |
| 6,938,030 B1 | 8/2005 | Simone, Jr. et al. |
| 6,952,679 B1 | 10/2005 | Pulford |
| 6,970,931 B1 | 11/2005 | Bellamy et al. |
| 6,975,914 B2 | 12/2005 | DeRemer et al. |
| 6,993,528 B1 | 1/2006 | Aver et al. |
| 7,000,186 B1 | 2/2006 | Gropper et al. |
| 7,007,227 B1 | 2/2006 | Constantino et al. |
| 7,013,309 B2 | 3/2006 | Chakraborty et al. |
| 7,039,597 B1 | 5/2006 | Notani et al. |
| 7,047,535 B2 | 5/2006 | Lee et al. |
| 7,051,036 B2 | 5/2006 | Rosnow et al. |
| 7,051,071 B2 | 5/2006 | Stewart et al. |
| 7,051,072 B2 | 5/2006 | Stewart et al. |
| 7,051,074 B1 | 5/2006 | Buchsbaum et al. |
| 7,065,504 B2 | 6/2006 | Sakuma et al. |
| 7,069,536 B2 | 6/2006 | Yaung |
| 7,076,504 B1 | 7/2006 | Handel et al. |
| 7,100,147 B2 | 8/2006 | Miller et al. |
| 7,110,952 B2 | 9/2006 | Kursh |
| 7,113,913 B1 | 9/2006 | Davis et al. |
| 7,117,271 B2 | 10/2006 | Haverstock et al. |
| 7,124,203 B2 | 10/2006 | Joshi et al. |
| 7,150,000 B2 | 12/2006 | Feldman |
| 7,171,647 B1 | 1/2007 | Smith et al. |
| 7,181,427 B1 | 2/2007 | De Francesco et al. |
| 7,184,967 B1 | 2/2007 | Mital et al. |
| 7,188,073 B1 | 3/2007 | Tam et al. |
| 7,194,679 B1 | 3/2007 | Green |
| 7,203,654 B2 | 4/2007 | Menendez |
| 7,216,163 B2 | 5/2007 | Sinn |
| 7,219,050 B2 | 5/2007 | Ishikawa et al. |
| 7,228,547 B2 | 6/2007 | Yaung |
| 7,240,915 B2 | 7/2007 | Peng et al. |
| 7,242,991 B2 | 7/2007 | Budinger et al. |
| 7,249,157 B2 | 7/2007 | Stewart et al. |
| 7,249,180 B2 | 7/2007 | Erickson et al. |
| 7,260,962 B2 | 8/2007 | Lax et al. |
| 7,260,971 B2 | 8/2007 | Cappeller et al. |
| 7,269,621 B2 | 9/2007 | Chang et al. |
| 7,269,718 B2 | 9/2007 | Alexander, III et al. |
| 7,290,605 B2 | 11/2007 | Waddell et al. |
| 7,296,056 B2 | 11/2007 | Yaung |
| 7,300,548 B2 | 11/2007 | Tran et al. |
| 7,305,488 B2 | 12/2007 | Wallace et al. |
| 7,310,060 B2 | 12/2007 | Stilwell et al. |
| 7,310,607 B2 | 12/2007 | Brandt et al. |
| 7,337,121 B1 | 2/2008 | Beinat et al. |
| 7,398,218 B1 | 7/2008 | Bernaski et al. |
| 7,933,786 B2 | 4/2011 | Wargin et al. |
| 2002/0035488 A1 | 3/2002 | Aquila et al. |
| 2002/0165739 A1 | 11/2002 | Guyan et al. |
| 2002/0188674 A1 | 12/2002 | Brown et al. |
| 2003/0009357 A1 | 1/2003 | Pish |
| 2003/0145124 A1 | 7/2003 | Guyan et al. |
| 2003/0200527 A1 | 10/2003 | Lynn et al. |
| 2004/0225535 A1 | 11/2004 | Bond, Jr. et al. |
| 2005/0246206 A1 | 11/2005 | Obora et al. |
| 2006/0218017 A1 | 9/2006 | Ren et al. |
| 2007/0005463 A1 | 1/2007 | Davis et al. |
| 2007/0156463 A1 | 7/2007 | Burton et al. |
| 2007/0255601 A1 | 11/2007 | Heydon et al. |

FOREIGN PATENT DOCUMENTS

| | | |
|---|---|---|
| EP | 0844558 A2 | 5/1998 |
| EP | 0854431 A2 | 7/1998 |
| EP | 0897149 A1 | 2/1999 |
| JP | 11-353234 | 12/1999 |
| WO | WO 8401448 A1 | 4/1984 |
| WO | WO 9108543 A1 | 6/1991 |
| WO | WO 9300643 A1 | 1/1993 |
| WO | WO 9416395 A1 | 7/1994 |
| WO | WO 95/03569 | 2/1995 |
| WO | WO 9631828 A1 | 10/1996 |
| WO | WO 9812616 A2 | 3/1998 |
| WO | WO 9821680 A1 | 5/1998 |
| WO | WO 9838563 A2 | 9/1998 |
| WO | WO 0067180 A2 | 11/2000 |
| WO | WO 0067181 A2 | 11/2000 |
| WO | WO 0067182 A2 | 11/2000 |
| WO | WO 0067184 A2 | 11/2000 |
| WO | WO 0067186 A2 | 11/2000 |

OTHER PUBLICATIONS

Final Judgment filed Jun. 22, 2011, in lawsuit asserting U.S. Patent No. 7,617,240, captioned *Accenture Global Services GmbH, et al.* v. *Guidewire Software, Inc.*, Case No. 09cv848, D. Del. Nov. 10, 2009. 1 page.

Office Action mailed Jul. 20, 2011, in commonly owned U.S. Appl. No. 12/691,515. 15 pages.

Nov. 21, 2011 Response to Office Action issued Jul. 20, 2011, in commonly owned U.S. Appl. No. 12/691,515. 9 pages.

Appeal Brief filed Oct. 12, 2011 by Plaintiff-Appellant Accenture Global Services GmbH and Accenture LLP, in United States Court of Appeals. Appeal from United States District lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. Appeal Case No. 2011-1486. 50 pages.

Non-Confidential Brief of Defendant-Appellee Guidewire Software Inc., filed Jan. 6, 2012, in United States Court of Appeals. Appeal from United States District lawsuit asserting U.S. Patent No.

7,013,284 B2, captioned *Accenture Global Services GmbH, et al. v. Guidewire Software, Inc.*, Case No. 07cv826, D. Del. Dec. 18, 2007. Appeal Case No. 2011-1486. 74 pages.

Notice of Allowance dated Nov. 18, 2011, for commonly owned U.S. Appl. No. 10/434,827, filed May 9, 2003. 5 pages.

Accenture, Accenture to Implement Claim Components Solution for OneBeacon Insurance. available: http://newsroom.accenture.com/article_print.cfm?article_id=3830; Jan. 10, 2002, 1 page.

Agarwal et al., "Architecting Object Applications for High Performance with Relational Databases, High Performance Object/Relational Applications," Aug. 10, 1995, pp. 1-8.

Anonymous, Accountancy, "Proposals to Admit Corporate Capital Lift Off," Nov. 1993, vol. 112, Iss.1203, p. 57, printed 3 Pages.

Anonymous, National Underwriter, "Market Mix," Property & Casualty/risk & Benefits Management ed.), Erlanger: vol. 97, Iss. 25, p. 47, Jun 21, 1993. Printed 2 pages.

"Answer and Counterclaims," filed on Feb. 6, 2008 in lawsuit asserting U.S. Patent No. 7,013,284 B2, captioned *Accenture Global Services GmbH, et al. v. Guidewire Software, Inc.*, D. Del. Dec. 18, 2007, 25 pages.

Robert W. Baldwin, Naming and Grouping Privileges to Simplify Security Management in Large Databases, available at http://www.cs.purdue.edu/homes/ninghui/cources/Fall03/papers/baldwin.pdf (17 pages) (Copyrighted in 1990).

Bandat, K, "Document Based Customization and Adaptation of Process" *IBM Technical Disclosure Bulletin*, Sep. 1994, pp. 629-630.

Bloss, Code optimizations for lazy evaluation, Lisp and Symbolic Computation, vol. 1, Sep. 1988, pp. 147-164.

Bulletin of the Technical Committee on Data Engineering, *IEEE Computer Society*, vol. 16 No. 2., Jun. 1993, pp. 1-56.

Claims Technology, A Five-Step Diagnosis for Your Claim Operation by John Raguin, available at http://web/archive.org/20040808072822/www.claimsmag.com/Issues/sept02/claims_tech.asp (Sep. 2002) (3 pages).

Cugola et al., "Exploiting an event-based infrastructure to develop complex distributed systems", Software Engineering, Proceedings of the 1988 International Conference on Kyoto, Japan, Apr. 19-25, 1998, IEEE pp. 261-270.

Denning, Peter J. et al. "Completing the Loops," *INTERFACES: Institute for Operations Research and the Management Science*, vol. 25 No. 3, May-Jun. 1995, pp. 42-57.

Engel, James D., "Technology in claims management", *Risk Management*, vol. 42 No. 12, Dec. 1995, 2 pages.

European Examination Report dated Feb. 18, 2004, for European Patent Application No. 00928844.0, filed May 4, 2000, 4 pages.

European Examination Report dated Feb. 1, 2005, for European Patent Application No. 00928844.0, filed May 4, 2000, 16 pages.

Extended European Search Report for European Patent Application No. 06005193.5, dated Aug. 22, 2006.

Feiler, Peter H. et al. "An Incremental Programming Environment," *Proceedings of the 5th International Conference on Software Engineering*, San Diego, California, 1981, pp. 44-53.

Fisher, Susan, E., "Insurer streamlines info gathering" (Client/Server Deployment: Arkwright Mutual Insurance) *PC Week*, Nov. 15, 1993, vol. 10 No. 45, 2 pages.

Freeman, Charles, "Microsoft Access 97 Step by Step," published by Microsoft Press, 1997, Table of Contents and Quick Look Guide vii-xiv, Finding You Best Starting Point pp. xvi-xxvi, Part 1, Lesson 1 and Lesson 2, pp. Cover-40, 63-108, 251-254.

Georgakopoulos, D., Hornick, M., "An Overflow of Work Management: From Processing Modeling to Workflow Automation Infrastructure," Distributed and Parallel Databases, © 1995 Kluwer Academic Publishers, Boston, Manufactured in The Netherlands; (1995) vol. 3, pp. 119-153.

Groiss, et al., "Interoperability with World Wide Workflows", 1st World Conference on Integrated Design and Process Technology, 1995. pp. 1-7.

Held, Jeffrey J., "GroupWare in Investment Banking: Improving Revenue and Deal Flow", Network Computing Practice, *GroupWare '92*, Edited by David D. Coleman, The Conference Group, Morgan Kaufmann Publishers, 1992, pp. 461-464.

Hung K. Sun Y. Rose T. "A dynamic business object architecture for an insurance industrial project." *Proceedings of International Conference on Object Oriented Information Systems (OOIS'97)*. Brisbane, Qld., Australia Nov. 10-12, 1997, Published 1998, abstract 1 page.

Image-Enabled App Streams Workflow for Gerling Re.(Gerling Global Reinsurance's use of keyFile's document management software and insurance Software and Systems' SICS insurance record-keeping software)(Product Information).*Insurance & Technology*, Feb. 1, 1997, 3 pages.

International Search Report dated Apr. 17, 2002, for PCT Application No. PCT/US00/12351, filed May 4, 2000, 5 pages.

International Search Report dated Jun. 3, 2002, for corresponding international application PCT/US00/12240, 2 pages.

International Search Report dated Aug. 6, 2002, for PCT Application No. PCT/US00/12501, filed May 4, 2000, 3 pages.

International Search Report dated Aug. 8, 2002 for PCT/US00/12508, 2 pages.

International Search Report dated Dec. 9, 2002 for PCT/US00/12238, 2 pages.

Kappel, G. et al., "Coordination in Workflow Management Systems A Rule-Based Approach", *Department of Information Systems*, University of Linz, A-4040), Linz, Austria, 1998, pp. 99-119.

Kellogg et al, "Interface management: a CORBA universal service manager," *Systems Management, 1998*. Proceedings of the IEEE Third International Workshop on Newport, RI, USA, Apr. 22-24, 1998, Los Alamitos, CA, USA, IEEE Comput. Soc., US, pp. 148-149.

Koehler SH, "Objects in Insurance. Gaining the Competitive Edge in Financial Services." *Proceedings of Object Expo '94*. New York, NY, USA Jun. 6-10, 1994, Published 1994, abstract, 1 page.

Korzeniowski, Paul, "Workflow software automates processes; passing messages on network platform helps CareAmerica process insurance claims" (Use of workflow software to streamline business processes) (Client/Service Computing),*Software Magazine*, Feb. 1993 vol. 13 No. 3, 4 pages.

Koschel et al. "Configurable event triggered services for CORB-based systems," *Enterprise Distributed Object Computing Workshop, 1998*. EDOC '98 Proceedings, Second International La Jolla, CA, USA, Nov. 3-5, 1998. New York, NY, USA, IEEE, US, pp. 306-318.

McCall, Grant Watch, Health Affairs Spring 1991, pp. 164-176.

Medina-Mora, Raul et al. "ALOE Users' and Implentors' Guide," *Technical Report CMUCS-81-145, CMU, Computer Science Department*, Nov. 1981. 81 pages.

Medina-Mora, Raul "Syntax-Directed Editing Towards Integrated Programming Environments," *Doctoral Thesis, Department of Computer Science, Carnegie-Mellon University*, Mar. 1982,180 pages.

Medina-Mora, "Action Workflow™ Technology and Applications for Groupware" *GroupWare '92*, Edited by David D. Coleman, The Conference Group, Morgan Kaufmann Publishers, 1992, pp. 165-167.

Medina-Mora, Raul et al. "The Action Workflow Approach to Workflow Management Technology," *Proceedings of the 1992 ACM conference on Computer-supported cooperative work*, Nov. 1992, pp. 281-288.

Medina-Mora, Raul et al. "ActionWorkflow in Use: Clark County Department of Business License," *Proceedings of the Twelfth International Conference on Data Engineering*, Feb.-Mar. 1996, pp. 288-294.

Medina-Mora, Raul, et al. "Action Workflow as the Enterprise Integration Technology." Bulletin of the Technical Committee on Data Engineering. *IEEE Computer Societ*. vol. 16 No. 2, Jun. 1993, pp. 49-52.

Milligan, J., "Case study: Advantage. (Motorists Insurance Companies uses Advantage, a business-rule DBMS developed in-house, to manage quoting, data entry, rating and other core processes)"(Data Architect) (Company Operations). *Database Programming & Design*, vol. 10 No. 12, Dec. 1997, 5 pages.

Muth et al., "Integrating Light-Weight Workflow Management Systems with Existing Business Environments", Proceedings, 15th International Conference on Data Engineering Mar. 23-26, 1999. 8 pages.

Nilsson, Y. "TFM: a tool for task flow management." *Philips Telecommunication and Data Systems Review*, vol. 47, No. 4, Dec. 1989, pp. 33-46. Netherlands. Abstract.

Notice of Allowance and Fees Due, mailed Jan. 10, 2008, for commonly owned U.S. Appl. No. 09/305,234.
Office Action, mailed Nov. 5, 2007, for commonly owned U.S. Appl. No. 11/017,086.
"Primavera Products and Solutions", www.primavera.com/products/p3.html, downloaded from internet Feb. 2, 2001, 2 pages.
"Primavera Extends Lead in High-End Project Management Software", Business Wire, Apr. 4, 1995, 3 pages.
Potel, M., "MVP: Model-View-Presenter the Taligent Programming Model for C++ and Java," Taligent, Inc., 1994, 16 pages.
Publishing a FileMaker Pro 4/5, Database on the Web: A tutorial, available at http://ion.uillinois.edu/resources/tutorials/software/tutorials/fmpro/filemakertutorial1.doc (last updated May 21, 2000) (10 pages).
"Report on the Filing or Determination of an Action Regarding a Patent or Trademark," identifying U.S. Patent No. 7,013,284 B2 asserted in *Accenture Global Services GmbH, et al.* v. *Guidewire Software, Inc.*, D. Del. Dec. 18, 2007. 1 page.
Stickel E., "Competitive product development in the financial services industry-a knowledge-based approach" *International Journal of Intelligent Systems in Accounting, Finance and Management*, vol. 4, No. 4, Dec. 1995, pp. 273-287, abstract.
Sutherland, RW, "TABLE Driven Health Insurance Claim Preparation" *IBM Technical Disclosure Bulletin*, Jul. 1986, 1 page, abstract.
Tauhert, C., "AFLAC cuts processing time with object system. (American Family Life Assurance, Portable Systems Technology's SmartImage insurance processing automation system) (Company Operations)". *Insurance & Technology*, vol. 22 No. 6, Jun. 1997, pp. 25(2) abstract, 1 page.
Todd et al., "Microsoft Exchange Server 5.5.", published by SAMS publishing, Indianapolis, Indiana, 1998. pp. i-xliii and 1-1060.
Tombros, Dimitrios et al., "Semantics of Reactive Components in Event-Driven Workflow Execution", *Institut for Informatic, Universitat Zurich, Advanced Information systems Engineering, 9th International Conference, SAiSE'97*, Barcelona,Catalonia, Spain, Jun. 16-20, 1997 Proceedings, pp. 409-422.
Tsai, W.H. et al. "Architecture of a Multi-Microprocessor System for Parallel Processing of Image Sequences," *Proceedings of 1981 IEEE Computer Society Workshop on Computer Architecture of Pattern Analysis and Image Database Management*, 1981, pp. 104-111.
Tsuchiya et al. "Operator-oriented approach for the inter-work of service and network management," *Global Convergence of Telecommunications and Distributed Object Computing, 1997*. Proceedings. Tine 97 Santiago, Chile, Nov. 17-20, 1997, Los Alamitos, CA, USA, EEE Comput. Soc., US, pp. 144-150.
Way, P., John Hancock streamlines legacy systems with objects. (John Hancock Mutual Life Insurance)(Company Operations) *Insurance & Technology*, vol. 22.No. 9, Sep. 1997, abstract, 1 page.
Winograd, Terry et al. Understanding Computers and Cognition: A New Foundation for Design, Ablex Publishing Corporation, Norwood, New Jersey, 1986,110 pages.
Winograd, Terry (1987-88). "A Language/Action Perspective on the Design of Cooperative Work," *Published in Human-Computer Interaction* vol. 3 No. 1, 1987-1988, 15 pages.
Winograd, Terry, "Groupware and the Emergence of Business Technology", *Group Ware '92*, Edited by David D. Coleman, The Conference Group, Morgan Kaufmann Publishers, 1992, pp. 69-72.
Zhao, J.L., Stohr, E.A., "Temporal Workflow Management in a Claim Handling System," 1999, ACM SIGSOFT Software Engineering Notes, San Francisco, CA, USA © 1999 ACM 1-58113-070-8/99/0002. vol. 24, Issue 2 WACC '99, Feb. 1999. pp. 187-195.
The prosecution history of U.S. Appl. No. 09/305,234 shown in the attached Patent Application Information retrieval file wrapper document list, printed Aug. 13, 2009, including each substantive office action and applicant response, 8 pages.
The prosecution history of U.S. Appl. No. 11/017,086 shown in the attached Patent Application Retrieval file wrapper document list, printed Apr. 4, 2008, including each substantive office action and applicant response, 2 pages.
Continued Prosecution Application (CPA) Request dated Apr. 18, 2002, for U.S. Appl. No. 09/305,228, filed May 4, 1999. 2 pages.
Request for Continued Examination dated Oct. 6, 2003, for U.S. Appl. No. 09/305,228, filed May 4, 1999. 2 pages.
Office Action, mailed Feb. 26, 2001, for commonly owned U.S. Appl. No. 09/305,228. 7 pages.
Response to Office Action filed Aug. 27, 2001, for commonly owned U.S. Appl. No. 09/305,228. 9 pages.
Office Action, mailed Oct. 18, 2001, for commonly owned U.S. Appl. No. 09/305,228. 12 pages.
Response to Office Action, filed Jan. 18, 2002, for commonly owned U.S. Appl. No. 09/305,228. 6 pages.
Office Action, mailed Mar. 1, 2002, for commonly owned U.S. Appl. No. 09/305,228. 3 pages.
Response to Office Action, filed Jul. 1, 2002, for commonly owned U.S. Appl. No. 09/305,228. 9 pages.
Office Action, mailed Apr. 9, 2002, for commonly owned U.S. Appl. No. 09/305,228. 3 pages.
Office Action, mailed Sep. 11, 2002, for commonly owned U.S. Appl. No. 09/305,228. 10 pages.
Response to Office Action filed Mar. 11, 2003, for commonly owned U.S. Appl. No. 09/305,228. 14 pages.
Office Action, mailed Jun. 4, 2003, for commonly owned U.S. Appl. No. 09/305,228. 12 pages.
Response to Office Action filed Oct. 6, 2003, for commonly owned U.S. Appl. No. 09/305,228. 7 pages.
Office Action, mailed Oct. 22, 2003, for commonly owned U.S. Appl. No. 09/305,228. 11 pages.
Response to Office Action filed Feb. 20, 2004, for commonly owned U.S. Appl. No. 09/305,228. 8 pages.
Office Action, mailed May 13, 2004, for commonly owned U.S. Appl. No. 09/305,228. 12 pages.
Office Action, mailed Nov. 16, 2004, for commonly owned U.S. Appl. No. 09/305,228. 3 pages.
Office Action, mailed Mar. 21, 2001, for commonly owned U.S. Appl. No. 09/305,816. 11 pages.
Response to Office Action, filed Sep. 21, 2001, for commonly owned U.S. Appl. No. 09/305,816. 4 pages.
Office Action, mailed Nov. 23, 2001 for commonly owned U.S. Appl. No. 09/305,816.10 pages.
Response to Office Action, filed Apr. 19, 2002, for commonly owned U.S. Appl. No. 09/305,816. 7 pages.
Office Action, Notice of Allowability, mailed May 3, 2002 for commonly owned U.S. Appl. No. 09/305,816. 9 pages.
Office Action, mailed Aug. 13, 2001, for commonly owned U.S. Appl. No. 09/305,817. 8 pages.
Response to Office Action, filed Feb. 12, 2002, for commonly owned U.S. Appl. No. 09/305,817. 14 pages.
Office Action, mailed Mar. 22, 2002, for commonly owned U.S. Appl. No. 09/305,817. 11 pages.
Response to Office Action, filed Oct. 9, 2002, for commonly owned U.S. Appl. No. 09/305,817. 14 pages.
Preliminary Amendment and Continued Prosecution Application mailed Aug. 22, 2002, for U.S. Appl. No. 09/305,817, filed May 4, 1999. 4 pages.
Office Action, mailed Dec. 20, 2002, for commonly owned U.S. Appl. No. 09/305,817. 17 pages.
Response to Office Action, filed Jun. 20, 2003, for commonly owned U.S. Appl. No. 09/305,817. 23 pages.
Office Action, mailed Jul. 22, 2003, for commonly owned U.S. Appl. No. 09/305,817. 16 pages. 11 pages.
Office Action, mailed Apr. 6, 2004, for commonly owned U.S. Appl. No. 09/305,817. 2 pages.
Office Action, mailed Mar. 14, 2001, for commonly owned U.S. Appl. No. 09/305,331. 11 pages.
Response to Office Action, filed Sep. 14, 2001, for commonly owned U.S. Appl. No. 09/305,331.10 pages.
Office Action, mailed Dec. 3, 2001, for commonly owned U.S. Appl. No. 09/305,331.10 pages.
Office Action, mailed Aug. 14, 2002, for commonly owned U.S. Appl. No. 09/305,331. 15 pages.
Response to Office Action, filed Nov. 14, 2002, for commonly owned U.S. Appl. No. 09/305,331. 13 pages.
Office Action, mailed Dec. 20, 2002, for commonly owned U.S. Appl. No. 09/305,331. 14 pages.
Response to Office Action, filed Feb. 20, 2003, for commonly owned U.S. Appl. No. 09/305,331. 7 pages.

Office Action, mailed Mar. 4, 2003, for commonly owned U.S. Appl. No. 09/305,331. 3 pages.
Request for Continued Examination dated Apr. 28, 2003, for U.S. Appl. No. 09/305,331, filed May 4, 1999. 2 pages.
Office Action, mailed Jun. 30, 2003, for commonly owned U.S. Appl. No. 09/305,331. 15 pages.
Response to Office Action, filed Sep. 22, 2003, for commonly owned U.S. Appl. No. 09/305,331. 6 pages.
Office Action, mailed Dec. 3, 2003, for commonly owned U.S. Appl. No. 09/305,331.2 pages. 2 pages.
Response to Office Action, filed Jan. 5, 2004, for commonly owned U.S. Appl. No. 09/305,331. 8 pages.
Response to Office Action, filed Feb. 2, 2004, for commonly owned U.S. Appl. No. 09/305,331. 8 pages.
Notice of Allowability mailed Oct. 27, 2004, for U.S. Appl. No. 09/305,331, filed May 4, 1999. 9 pages.
Examiner Interview Summary mailed Oct. 27, 2008, for U.S. Appl. No. 09/305,234, filed May 4, 1999. 2 pages.
Response to Office Action, filed Dec. 1, 2008, for U.S. Appl. No. 09/305,234, filed May 4, 1999. 22 pages.
Response to Office Action, filed Jan. 8, 2008, for U.S. Appl. No. 11/017,086, filed Dec. 20, 2004. 17 pages.
Advisory Action mailed Feb. 2, 2009, for U.S. Appl. No. 11/017,086, filed Dec. 20, 2004. 2 pages.
Request for Continued Examination dated Feb. 10, 2009, for U.S. Appl. No. 11/017,086, filed Dec. 20, 2004.2 pages.
U.S. Office Action mailed Mar. 3, 2009, for U.S. Appl. No. 11/017,086, filed Dec. 20, 2004. 26 pages.
USPTO Communication mailed Mar. 12, 2009, for U.S. Appl. No. 11/017,086, filed Dec. 20, 2004. 2 pages.
U.S. Patent 7,013,284 Re-Examination Request Application No. 90/010,201, filed Jun. 19, 2008. 128 pages.
Mar. 11, 2002 Amendment after Office Action mailed Oct. 18, 2001, for commonly owned U.S. Appl. No. 09/305,228, filed May 4, 1999. 16 pages.
Continued Prosecution Application (CPA) Request dated Apr. 18, 2002, for commonly owned U.S. Appl. No. 09/305,228, filed May 4, 1999. 2 pages.
Office Action mailed May 9, 2001, for commonly owned U.S. Appl. No. 09/305,234, filed May 4, 1999.4 pages.
Nov. 27, 2001 Response to Office Action mailed May 9, 2001, for commonly owned U.S. Appl. No. 09/305,234, filed May 4, 1999. 9 pages.
Office Action mailed Feb. 7, 2002, for commonly owned U.S. Appl. No. 09/305,234, filed May 4, 1999. 4 pages.
Mar. 6, 2002 Response to Office Action mailed Feb. 7, 2002, for commonly owned U.S. Appl. No. 09/305,234, filed May 4, 1999. 2 pages.
Office Action mailed Jun. 3, 2002, for commonly owned U.S. Appl. No. 09/305,234, filed May 4, 1999. 6 pages.
Sep. 3, 2002, Amendment in response to Office Action mailed Jun. 3, 2002, for commonly owned U.S. Appl. No. 09/305,234, filed May 4, 1999. 5 pages.
Advisory Action mailed Sep. 17, 2002, for commonly owned U.S. Appl. No. 09/305,234, filed May 4, 1999. 3 pages.
Filing of Continued Prosecution Application dated Nov. 4, 2002, for commonly owned U.S. Appl. No. 09/305,234, filed May 4, 1999. 2 pages.
Office Action mailed Nov. 26, 2002, for commonly owned U.S. Appl. No. 09/305,234, filed May 4, 1999. 4 pages.
Mar. 4, 2003 Response to Office Action mailed Nov. 26, 2002, for U.S. Appl. No. 09/305,234, filed May 4, 1999. 13 pages.
Office Action mailed May 21, 2003, for U.S. Appl. No. 09/305,234, filed May 4, 1999. 6 pages. 6 pages.
Sep. 22, 2003 Amendment in Response to Office Action mailed May 21, 2003, for U.S. Appl. No. 09/305,234, filed May 4, 1999. 10 pages.
Advisory Action mailed Oct. 28, 2003, for U.S. Appl. No. 09/305,234, filed May 4, 1999.2 pages.
Request for Continued Examination dated Oct. 21, 2003, for U.S. Appl. No. 09/305,234, filed May 4, 1999. 2 pages.
Office Action mailed Nov. 17, 2003, for U.S. Appl. No. 09/305,234, filed May 4, 1999. 5 pages.
Feb. 17, 2004 Response to Office Action mailed Nov. 17, 2003, for U.S. Appl. No. 09/305,234, filed May 4, 1999. 11 pages.
Office Action mailed May 4, 2004, for U.S. Appl. No. 09/305,234, filed May 4, 1999. 6 pages.
Jul. 6, 2004 Amendment in Response to Office Action mailed May 4, 2004, for U.S. Appl. No. 09/305,234, filed May 4, 1999. 9 pages.
Advisory Action mailed Aug. 31, 2004, for U.S. Appl. No. 09/305,234, filed May 4, 1999. 3 pages.
Advisory Action mailed Sep. 14, 2004, for U.S. Appl. No. 09/305,234, filed May 4, 1999. 3 pages.
Request for Continued Examination dated Sep. 7, 2004, for U.S. Appl. No. 09/305,234, filed May 4, 1999. 2 pages.
Office Action mailed Nov. 3, 2004, for U.S. Appl. No. 09/305,234, filed May 4, 1999. 6 pages.
May 5, 2005 Amendment and Response to Office Action dated Nov. 11, 2004, for U.S. Appl. No. 09/305,234, filed May 4, 1999. 13 pages.
Notice of Informal or Non-Responsive Amendment mailed Jul. 26, 2005, for U.S. Appl. No. 09/305,234, filed May 4, 1999. 2 pages.
Aug. 24, 2005 Response to Office Action mailed Jul. 26, 2005, for U.S. Appl. No. 09/305,234, filed May 4, 1999. 8 pages.
Office Action mailed Nov. 17, 2005, for U.S. Appl. No. 09/305,234, filed May 4, 1999. 6 pages.
Jan. 17, 2006 Amendment after Final Rejection mailed Nov. 17, 2005, for U.S. Appl. No. 09/305,234, filed May 4, 1999. 14 pages.
Advisory Action mailed Feb. 9, 2006, for U.S. Appl. No. 09/305,234, filed May 4, 1999. 3 pages.
Examiner Interview Summary mailed Mar. 30, 2006, for U.S. Appl. No. 09/305,234, filed May 4, 1999.4 pages.
Mar. 29, 2006 Amendment after Final Rejection mailed Nov. 17, 2005, for U.S. Appl. No. 09/305,234, filed May 4, 1999. 12 pages.
Ex Parte Quayle Action mailed Apr. 12, 2006, for U.S. Appl. No. 09/305,234, filed May 4, 1999.4 pages.
May 18, 2006 Amendment and Response to Ex Parte Quayle Action mailed Apr. 12, 2006, for U.S. Appl. No. 09/305,234, filed May 4, 1999. 5 pages.
Notice of Informal or Non-Responsive Amendment mailed Jun. 1, 2006, for U.S. Appl. No. 09/305,234, filed May 4, 1999. 2 pages.
Jun. 16, 2006 Response after Ex Parte Quayle Action mailed Apr. 12, 2006, for U.S. Appl. No. 09/305,234, filed May 4, 1999. 4 pages.
Ex Parte Quayle Action mailed May 18, 2007, for U.S. Appl. No. 09/305,234, filed May 4, 1999. 3 pages.
Jun. 25, 2007 Response After Ex Parte Quayle Action mailed May 18, 2007, for U.S. Appl. No. 09/305,234, filed May 4, 1999. 10 pages.
Apr. 10, 2008 Request for Continued Examination, for U.S. Appl. No. 09/305,234, filed May 4, 1999.2 pages.
Notice of Allowance mailed Apr. 30, 2008, for U.S. Appl. No. 09/305,234, filed May 4, 1999.4 pages.
Issue Notification dated Jun. 25, 2008, for U.S. Appl. No. 09/305,234, filed May 4, 1999. 1 page.
Jul. 3, 2008 Request for Continued Examination, for U.S. Appl. No. 09/305,234, filed May 4, 1999. 2 pages.
Notice of Withdrawal from Issue mailed Jul. 8, 2008, for commonly owned U.S. Appl. No. 09/305,234, filed May 4, 1999. 1 page.
Office Action mailed Aug. 1, 2008, for U.S. Appl. No. 09/305,234, filed May 4, 1999. 6 pages.
Examiner's Amendment mailed Aug. 12, 2009, for U.S. Appl. No. 09/305,234, filed May 4, 1999. 7 pages.
Notice of Allowance mailed Sep. 3, 2009, for U.S. Appl. No. 09/305,234, filed May 4, 1999. 10 pages.
Request for Ex Parte Reexamination, including exhibits H, I, J, and K, dated Nov. 10, 2009, for U.S. Appl. No. 09/305,234, filed May 4, 1999 and later assigned Application No. 90/010,735. 831 pages.
Report on the Filing or Determination of an Action Regarding a Patent or Trademark mailed Dec. 16, 2009, for commonly owned U.S. Appl. No. 09/305,234, filed May 4, 1999. 1 page.
Order Granting Ex Parte Reexamination mailed Jan. 7, 2010, for U.S. Appl. No. 09/305,234, filed May 4, 1999 and later assigned Application No. 90/010,735. 17 pages.
Determination of Re-Exam mailed Aug. 1, 2008, for U.S. Re-Examination No. 90/010,201, filed Jun. 19, 2008. 12 pages.
Office Action mailed Jul. 17, 2009, for U.S. Re-Examination No. 90/010,201, filed Jun. 19, 2008. 28 pages.

Examiner Interview Summary Record dated Sep. 17, 2009, for U.S. Re-Examination No. 90/010,201, filed Jun. 19, 2008. 3 pages.
Sep. 17, 2009 Response to Office Action mailed Jul. 17, 2009, for U.S. Re-Examination No. 90/010,201, filed Jun. 19, 2008. 49 pages.
Sep. 17, 2009, Affidavits, Declarations and/or Exhibits filed, for U.S. Re-Examination No. 90/010,201, filed Jun. 19, 2008. 201 pages.
May 31, 2002 Amendment and Request for Reconsideration after Office Action mailed Dec. 3, 2001, for commonly owned U.S. Appl. No. 09/305,331. 17 pages.
Second Request for Ex Parte Reexamination, including exhibits I, J, K, L, M, N, O, P, and Q, dated Oct. 9, 2009, for commonly owned U.S. Appl. No. 09/305,331 and later assigned Application No. 90/010,713. 974 pages.
Order Granting Ex Parte Reexamination mailed Dec. 17, 2009, for commonly owned U.S. Appl. No. 09/305,331 and later assigned Application No. 90/010,713. 15 pages.
Preliminary Amendment filed Dec. 20, 2004, for commonly owned U.S. Appl. No. 11/017,086, filed Dec. 20, 2004. 9 pages.
Office Action mailed Sep. 23, 2005, for commonly owned U.S. Appl. No. 11/017,086, filed Dec. 20, 2004. 22 pages.
Jan. 23, 2006 Response to Office Action mailed Sep. 23, 2005, for commonly owned U.S. Appl. No. 11/017,086, filed Dec. 20, 2004. 19 pages.
Office Action mailed Apr. 18, 2006, for commonly owned U.S. Appl. No. 11/017,086, filed Dec. 20, 2004. 24 pages.
Notice of Appeal filed Sep. 15, 2006, for U.S. Appl. No. 11/017,086, filed Dec. 20, 2004. 1 page.
Feb. 14, 2007 Amendment and Request for Continued Examination, for commonly owned U.S. Appl. No. 11/017,086, filed Dec. 20, 2004. 18 pages.
Office Action mailed Mar. 22, 2007, for commonly owned U.S. Appl. No. 11/017,086, filed Dec. 20, 2004. 21 pages.
Aug. 17, 2007 Response to Office Action mailed Mar. 22, 2007, for commonly owned U.S. Appl. No. 11/017,086, filed Dec. 20, 2004. 16 pages.
May 2, 2008 Request for Continued Examination, for commonly owned U.S. Appl. No. 11/017,086, filed Dec. 20, 2004. 2 pages.
Office Action mailed Aug. 11, 2008, for commonly owned U.S. Appl. No. 11/017,086, filed Dec. 20, 2004. 23 pages.
Office Action Jul. 21, 2009, for commonly owned U.S. Appl. No. 11/017,086, filed Dec. 20, 2004. 24 pages.
Notice of Abandonment mailed Mar. 24, 2010, for commonly owned U.S. Appl. No. 11/017,086, filed Dec. 20, 2004. 3 pages.
Decision Merging Proceedings Granted, mailed Feb. 26, 2010, for commonly owned U.S. Reexamination No. 90/010,201, filed Jun. 19, 2008. 3 pages.
Mar. 26, 2010 Amendment and Response to Office Action dated Feb. 26, 2010, for commonly owned U.S. Reexamination No. 90/010,201, filed Jun. 19, 2008. 11 pages.
Decision Merging Proceedings Granted, mailed Feb. 26, 2010, for commonly owned U.S. Reexamination No. 90/010,713, filed Oct. 9, 2009. 3 pages.
Mar. 26, 2010 Amendment and Response to Office Action dated Feb. 26, 2010, for commonly owned U.S. Reexamination No. 90/010,713, filed Oct. 9, 2009. 11 pages.
Preliminary Amendment dated Jan. 21, 2010, for commonly owned U.S. Appl. No. 12/691,515, filed Jan. 21, 2010. 3 pages.
Examiner Interview Summary Record dated Jul. 13, 2010, for merged Reeaxmination Nos. 90/010,201 and 90/010,713 regarding commonly owned U.S. Patent No. 7,013,284. 41 pages.
Patent Owner's Statement of the Interview Under 37 C.F.R. 1.560(b) dated Jul. 30, 2010 for merged Reexamination Nos. 90/010,201 and 90/010,713 regarding commonly owned U.S. Patent No. 7,013,284. 17 pages.
Supplemental Response dated Aug. 27, 2010, for merged Reexamination Nos. 90/010,201 and 90/010,713 regarding commonly owned U.S. Patent No. 7,013,284. 63 pages.
U.S. Office Action mailed Oct. 1, 2010, for merged Reexamination Nos. 90/010,201 and 90/010,713 regarding commonly owned U.S. Patent No. 7,013,284. 40 pages.
U.S. Office Action mailed Sep. 24, 2010, for Reexamination No. 90/010,735 regarding commonly owned U.S. Patent No. 7,617,240. 18 pages.

U.S. Patent 7,013,284 Re-Examination Request Application No. 90/011,484, filed Feb. 10, 2011. 90 pages.
Exhibit D—Archived description of the Diamond product from Applied Systems, published at least by Jul. 15, 1997, filed in U.S. Patent 7,013,284 Re-Examination Request Application No. 90/011,484, filed Feb. 10, 2011. 8 pages.
Exhibit I—Claim Interpretations, filed in U.S. Patent 7,013,284 Re-Examination Request Application No. 90/011,484, filed Feb. 10, 2011. 18 pages.
Exhibit J—Claims Charts for Claims 1-40 based on Flores and Abbruzzese under 35 U.S.C. § 103, filed in U.S. Patent 7,013,284 Re-Examination Request Application No. 90/011,484, filed Feb. 10, 2011. 207 pages.
Exhibit K—Claim Chart for Claims 1-40 based on Flores, Diamond and Abbruzzese under 35 U.S.C. § 103, filed in U.S. Patent 7,013,284 Re-Examination Request Application No. 90/011,484, filed Feb. 10, 2011. 186 pages.
Exhibit L—Claim Chart for Claims 1-40 based on Flores, Borghesi, and Abbruzzese under 35 U.S.C. § 103, filed in U.S. Patent 7,013,284 Re-Examination Request Application No. 90/011,484, filed Feb. 10, 2011. 181 pages.
Exhibit M—Claim Chart for Claims 1-40 based on Lynn and Abbruzzese under 35 U.S.C. § 103, filed in U.S. Patent 7,013,284 Re-Examination Request Application No. 90/011,484, filed Feb. 10, 2011. 138 pages.
Exhibit N—Claim Chart for Charts 1-40 based on Schutzman and Abbruzzese under 35 U.S.C. § 103, filed in U.S. Patent 7,013,284 Re-Examination Request Application No. 90/011,484, filed Feb. 10, 2011. 119 pages.
Exhibit O—Claim Chart for Charts 1-40 based on Caruso and Abbruzzese under 35 U.S.C. § 103, filed in U.S. Patent 7,013,284 Re-Examination Request Application No. 90/011,484, filed Feb. 10, 2011. 102 pages.
Exhibit P—Action Finishes 1995 with Strong Dec. Sales, PR Newswire, Jan. 1996, filed in U.S. Patent 7,013,284 Re-Examination Request Application No. 90/011,484, filed Feb. 10, 2011. 3 pages.
U.S. Office Action mailed on Nov. 9, 2010, for commonly owned U.S. Appl. No. 12/691,515, filed Jan. 21, 2010. 10 pages.
Examiner Interview Summary mailed Dec. 15, 2010, for merged Reexamination Nos. 90/010,201 and 90/010,713 regarding commonly owned U.S. Patent No. 7,013,284. 56 pages.
Patent Owner's Response with Appendices dated Jan. 3, 2011, for merged Reexamination Nos. 90/010,201 and 90/010,713 regarding commonly owned U.S. Patent No. 7,013,284.
Examiner Interview Summary mailed Dec. 15, 2010, for Reexamination No. 90/010,735 regarding commonly owned U.S. Patent No. 7,617,240. 6 pages.
Patent Owner's Response dated Dec. 27, 2010, for Reexamination No. 90/010,735 regarding commonly owned U.S. Patent No. 7,617,240.
Final Office Action mailed Feb. 4, 2011 for Reexamination No. 90/010,735 regarding commonly owned U.S. Patent No. 7,617,240. 22 pages.
Notice of Allowance mailed Feb. 7, 2011 for U.S. Appl. No. 11/264,115, filed Nov. 1, 2005. 24 pages.
Interview Summary dated Mar. 3, 2011 in Reexamination (Control No. 90/010,735) filed Nov. 10, 2009, for commonly owned U.S. Patent No. 7,617,240. 49 pages.
Order Granting Re-Examination (Control No. 90/011,484) dated Mar. 4, 2011, for commonly owned U.S. Patent No. 7,013,284. 15 pages.
Issue Fee Payment dated Mar. 1, 2011, for commonly owned U.S. Appl. No. 11/264,115, filed Nov. 1, 2005.
Response to Non-Final Office Action dated Nov. 9, 2010, for commonly owned U.S. Appl. No. 12/691,515, filed May 6, 2011. 6 pages.
Office Action dated Jan. 24, 2007, for commonly owned U.S. Appl. No. 10/434,827, filed May 9, 2003. 40 pages.
Office Action dated May 31, 2007, for commonly owned U.S. Appl. No. 10/434,827, filed May 9, 2003. 20 pages.
Patent Owner's Response with Appendices dated May 4, 2011, for Reexamination No. 90/010,735 regarding commonly owned U.S. Patent No. 7,617,240. 55 pages.

Appendix AA—Declaration of John A. Pierce dated May 3, 2011, and Accompanying exhibits, filed with Patent Owner's Response of May 4, 2011, in Reexamination No. 90/010,735 regarding commonly owned U.S. Patent No. 7,617,240. 8 pages.
Appendix BB—Therese Rutkowski, "Keeping the Promise: Insurance Network News Executive Strategies for Technology Management" Feb. 1, 2002, filed with Patent Owner's Response of May 4, 2011, in Reexamination No. 90/010,735 regarding commonly owned U.S. Patent No. 7,617,240. 3 pages.
Appendix CC—"Affirmative Insurance Selects Accenture Claims Solution for its Transformation Program" Sep. 13, 2007, filed with Patent Owner's Response of May 4, 2011, in Reexamination No. 90/010,735 regarding commonly owned U.S. Patent No. 7,617,240. 4 pages.
Appendix DD—"Accenture Claim Components Solution Version 6.0 Implemented At OneBeacon" Jul. 10, 2007, filed with Patent Owner's Response of May 4, 2011, in Reexamination No. 90/010,735 regarding commonly owned U.S. Patent No. 7,617,240. 4 pages.
Appendix EE—"Kemper Insurance Selects Accenture's Claim Components Software" May 14, 2002, filed with Patent Owner's Response of May 4, 2011, in Reexamination No. 90/010,735 regarding commonly owned U.S. Patent No. 7,617,240. 4 pages.
Appendix Z—Celent, "Claim Systems Vendors: North American P/C Insurance 2011" Jan. 2011, filed with Patent Owner's Response of May 4, 2011, in Reexamination No. 90/010,735 regarding commonly owned U.S. Patent No. 7,617,240. 143 pages.
Patent Owner's Petition to Expunge the Request for Reexamination and Vacate the Filing Date and Order Granting Reexamination dated May 4, 2011, for Reexamination No. 90/011,484 regarding commonly owned U.S. Patent No. 7,013,284. 6 pages.
Appendix A—Declaration of Michael Ian Shamos, Ph.D., J.D. dated Dec. 27, 2010 and Associated Exhibit, in Patent Owner's Response dated Dec. 27, 2010, filed in Reexamination No. 90/010,735 regarding commonly owned U.S. Patent No. 7,617,240. 52 pages.
Appendix B—Declaration of W. Michael Flaherty dated Dec. 17, 2010 and Associated Exhibit 1, in Patent Owner's Response dated Dec. 27, 2010 filed in Reexamination No. 90/010,735 regarding commonly owned U.S. Patent No. 7,617,240. 15 pages.
Appendix C—Declaration of W. Michael Flaherty dated Aug. 27, 2010 from Co Pending Reexamination Control Nos. 90/010,201 & 90/010,713 Involving Commonly Owned U.S. Patent No. 7,013,284 and Associated Exhibit, in Patent Owner's Response dated Dec. 27, 2010, filed in Reexamination No. 90/010,735 regarding commonly owned U.S. Patent No. 7,617,240. 16 pages.
Appendix D—Declaration of George Victor Guyan Pursuant to 37 C.F.R. § 1.132 dated Dec. 23, 2010, in Patent Owner's Response dated Dec. 27, 2010, filed in Reexamination No. 90/010,735 regarding commonly owned U.S. Patent No. 7,617,240. 4 pages.
Advisory Action issued May 27, 2011, for Reexamination No. 90/010,735 regarding commonly owned U.S. Patent No. 7,617,240. 4 pages.
Accenture's Amended Complaint for Patent Infringement, Trade Secret Misappropriation, and related State Law Claims filed Nov. 13, 2008, in lawsuit asserting U.S. Patent No. 7,013,284 B2, captioned *Accenture Global Services GmbH, et al.* v. *Guidewire Software, Inc.*, D. Del. Dec. 17, 2007.17 pages.
Accenture's Second Amended Complaint for Patent Infringement, Trade Secret Misappropriation, and related State Law Claims filed Dec. 17, 2008, in lawsuit asserting U.S. Patent No. 7,013,284 B2, captioned *Accenture Global Services GmbH, et al.* v. *Guidewire Software, Inc.*, D. Del. Dec. 18, 2007. 19 pages.
Guidewire's Answer to Second Amended Complaint filed Jan. 9, 2009, in lawsuit asserting U.S. Patent No. 7,013,284 B2, captioned *Accenture Global Services GmbH, et al.* v. *Guidewire Software, Inc.*, D. Del. Dec. 18, 2007. 19 pages.
Accenture's Reply to Guidewire's Counterclaims with Defenses filed Mar. 25, 2008, in lawsuit asserting U.S. Patent No. 7,013,284 B2, captioned *Accenture Global Services GmbH, et al.* v. *Guidewire Software, Inc.*, D. Del. Dec. 18, 2007. 13 pages.
Accenture's Reply to Guidewire's Counterclaims with Defenses to Accenture's Second Amended Complaint filed Jan. 29, 2009, in lawsuit asserting U.S. Patent No. 7,013,284 B2, captioned *Accenture Global Services GmbH, et al.* v. *Guidewire Software, Inc.*, D. Del. Dec. 18, 2007. 9 pages.
Memorandum Opinion filed Jul. 1, 2009, in lawsuit asserting U.S. Patent No. 7,013,284 B2, captioned *Accenture Global Services GmbH, et al.* v. *Guidewire Software, Inc.*, D. Del. Dec. 18, 2007. 11 pages.
Accenture's Reply to Guidewire's Amended Counterclaims with Defenses to Accenture's Second Amended Complaint filed Aug. 6, 2009, in lawsuit asserting U.S. Patent No. 7,013,284 B2, captioned *Accenture Global Services GmbH, et al.* v. *Guidewire Software, Inc.*, D. Del. Dec. 18, 2007. 14 pages.
Joint Claim Construction Statement filed Sep. 29, 2009, in lawsuit asserting U.S. Patent No. 7,013,284 B2, captioned *Accenture Global Services GmbH, et al.* v. *Guidewire Software, Inc.*, D. Del. Dec. 18, 2007. 7 pages.
Joint Claim Construction Appendix vol. III of III Exhibits 3-4 filed Oct. 2, 2009, in lawsuit asserting U.S. Patent No. 7,013,284 B2, captioned *Accenture Global Services GmbH, et al.* v. *Guidewire Software, Inc.*, D. Del. Dec. 18, 2007. 219 pages.
Accenture's Opening Claim Construction Brief filed Oct. 2, 2009, in lawsuit asserting U.S. Patent No. 7,013,284 B2, captioned *Accenture Global Services GmbH, et al.* v. *Guidewire Software, Inc.*, D. Del. Dec. 18, 2007. 31 pages.
Declaration of Diana Luo in Support of Plaintiffs Accenture Global Services GmbH and Accenture LLP's Opening Claim Construction Brief filed Oct. 5, 2009, in lawsuit asserting U.S. Patent No. 7,013,284 B2, captioned *Accenture Global Services GmbH, et al.* v. *Guidewire Software, Inc.*, D. Del. Dec. 18, 2007. 5 pages.
Guidewire's Answering Claim Construction Brief filed on Oct. 30, 2009, in lawsuit asserting U.S. Patent No. 7,013,284 B2, captioned *Accenture Global Services GmbH, et al.* v. *Guidewire Software, Inc.*, D. Del. Dec. 18, 2007. 49 pages.
Declaration of Diana Luo in Support of Accenture's Claim Construction Answering Brief filed Nov. 5, 2009, in lawsuit asserting U.S. Patent No. 7,013,284 B2, captioned *Accenture Global Services GmbH, et al.* v. *Guidewire Software, Inc.*, D. Del. Dec. 18, 2007. 8 pages.
Accenture's Claim Construction Answering Brief filed Nov. 5, 2009, in lawsuit asserting U.S. Patent No. 7,013,284 B2, captioned *Accenture Global Services GmbH, et al.* v. *Guidewire Software, Inc.*, D. Del. Dec. 18, 2007. 25 pages.
Defendant Guidewire's Opening Claim Construction Brief filed Nov. 6, 2009, in lawsuit asserting U.S. Patent No. 7,013,284 B2, captioned *Accenture Global Services GmbH, et al.* v. *Guidewire Software, Inc.*, D. Del. Dec. 18, 2007. 30 pages.
Defendant Guidewire Software Inc.'s Objections and Response to Plaintiff Accenture's First Set of Interrogatories, Aug. 22, 2008, in lawsuit asserting U.S. Patent No. 7,013,284 B2, captioned *Accenture Global Services GmbH, et al.* v. *Guidewire Software, Inc.*, D. Del. Dec. 18, 2007. pp. 1, 5-7 and 16.
Complaint for Patent Infringement filed Nov. 10, 2009, in lawsuit asserting U.S. Patent No. 7,617,240, captioned *Accenture Global Services GmbH, et al.* v. *Guidewire Software, Inc.*, D. Del. Nov. 10, 2009. 6 pages.
Defendant Guidewire's Answer and Counterclaims to Accenture's Complaint for Patent Infringement filed Nov. 30, 2009, in lawsuit asserting U.S. Patent No. 7,617,240, captioned *Accenture Global Services GmbH, et al.* v. *Guidewire Software, Inc.*, D. Del. Nov. 10, 2009. 9 pages.
Memorandum Order filed Mar. 5, 2010, in lawsuit asserting U.S. Patent No. 7,013,284 B2, captioned *Accenture Global Services GmbH, et al.* v. *Guidewire Software, Inc.*, D. Del. Dec. 18, 2007. 7 pages.
Accenture's Responses to Interrogatory No. 14, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007.
Accenture's Responses to Interrogatory No. 16, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007.

Memorandum Order denying without Prejudice and to be re-filed after the Supreme Court issues its ruling in *Bilski* v. *Doll*, 129 S. Ct. 2735 (U.S. 2009), filed Feb. 26, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 3 pages.

Memorandum Opinion, filed Mar. 5, 2010, filed in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 43 pages.

Opening Brief in Support re Motion for Summary Judgment (Partial) That the '284 Patent is Invalid as Indefinite, filed Dec. 16, 2009, in lawsuit asserting U.S. Patent No. 7,013,284 B2, captioned *Accenture Global Services GmbH, et al.* v. *Guidewire Software, Inc.*,Case No. 07cv826, D. Del. Dec. 18, 2007. 21 pages.

Opening Brief in Support re Motion for Summary Judgment (Partial) That the '284 Patent is Invalid as Claiming Unpatentable Subject Matter, filed Dec. 16, 2009, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 15 pages.

Redacted version of Opening Brief in Support of Motion for Summary Judgment (Partial) of Invalidity of '284 Patent because of an On-Sale Bar, filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 31 pages.

Redacted version of Opening Brief in Support of Motion for Summary Judgment(Partial) of filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 75 pages.

Redacted version of Opening Brief in Support of Motion for Summary Judgment (Partial) Regarding Statute of Limitations, filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 14 pages.

Redacted Version of Opening Brief in Support, of Motion for Summary Judgment That the '284 Patent is Invalid as Anticipated or, in the Alternative, Obvious, filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 46 pages.

Plaintiffs' Brief in Opposition to Defendant's Motion for Partial Summary Judgment of Invalidity of the '284 Patent as Claiming Unpatentable Subject Matter, filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 23 pages.

Redacted version of Appendix, vol. 1 of 12, filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 202 pages.

Redacted version of Appendix, (vol. 2 of 12—Exhibits 26-38), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 34 pages.

Redacted version of Appendix, (vol. 3 of 12—Exhibits 39-58), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 44 pages.

Redacted version of Appendix, (vol. 4 of 12—Exhibits 59-64), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 39 pages.

Redacted version of Appendix, (vol. 5 of 12—Exhibits 65-99), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 195 pages.

Redacted version of Appendix, (vol. 6 of 12—Exhibits 100-129), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 427 pages.

Redacted version of Appendix, (vol. 7 of 12—Exhibits 130-154), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 467 pages.

Redacted version of Appendix, (vol. 8 of 12—Exhibits 155-161), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 330 pages.

Redacted version of Appendix, (vol. 9 of 12—Exhibits 162-164), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 13 pages.

Redacted version of Appendix, (vol. 10 of 12—Exhibits 165-170), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 18 pages.

Redacted version of Appendix, (vol. 11 of 12—Exhibit 171), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 13 pages.

Redacted version of Appendix, (vol. 12 of 12—Exhibits 172-183), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 80 pages.

Redacted version of Appendix, Corrected vol. 12 (Exhibits 172-183), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 80 pages.

Redacted version of Declaration of W. Michael Flaherty in Support of Plaintiffs Briefs in Opposition to Defendants' Motions for Summary Judgment, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 6 pages.

Redacted version of Declaration of Diana Luo in Support of Plaintiffs Briefs in Opposition to Defendants' Motions for Partial Summary Judgment, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 68 pages.

Redacted Version of Answering Brief in Opposition to Defendant's Motion for Partial Summary Judgment of Invalidity for Indefiniteness of the '284 Patent, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 22 pages.

Redacted Version of Declaration of Michael Ian Shamos in Support of Plaintiffs' Brief in Opposition to Defendants Motion for Partial Summary Judgment, filed Jan. 20, 2010, in lawsuit asserting U.S. Patent No. 7,013,284 B2, captioned *Accenture Global Services GmbH, et al.* v. *Guidewire Software, Inc.*, D. Del. Dec. 18, 2007. 6 pages.

Redacted version of Answering Brief in Opposition to Defendant's Motion for Partial Summary Judgment of Invalidity of the '284 Patent as Anticipated or, in the alternative, Obvious, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 36 pages.

Redacted version of Answering Brief in Opposition to Defendant's Motion for Partial Summary Judgment of Invalidity of '284 Patent Because of an On-Sale Bar, filed Jan. 20, 2010, in lawsuit asserting U.S. Patent No. 7,013,284 B2, captioned *Accenture Global Services GmbH, et al.* v. *Guidewire Software, Inc.*, Case no. 07cv826, D. Del. Dec. 18, 2007. 51 pages.

Redacted version of Declaration of Ruchika Agrawal in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 33 pages.

Redacted version of Declaration of Michael Ian Shamos in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 26 pages.

Redacted version of Declaration of George Victor Guyan in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 7 pages.

Redacted version of Declaration of Jeffrey Wargin in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 8 pages.

Redacted version of Reply Brief re Motion for Summary Judgment (Partial) of Invalidity of '284 Patent because of an On-Sale Bar, filed Feb. 2, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 21 pages.

Redacted version of Reply Brief re Motion for Summary Judgment (Partial) That the '284 Patent is Invalid as Indefinite, filed Feb. 2, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 18 pages.

Redacted version of Reply Brief re Motion for Summary Judgment (Partial) that the '284 Patent is Invalid as claiming Unpatentable Subject Matter, filed Feb. 2, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 14 pages.

Redacted version of Reply Brief re Motion for Summary Judgment that the '284 is Invalid as Anticipated or , in the Alternative, Obvious, filed Feb. 2, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 13 pages.

Order denying Motion for Summary Judgment (Partial) denying Motion for Summary Judgment, denying Motion for Summary Judgment, denying Motion to Strike, denying Motion for Summary Judgment, denying Motion for Summary Judgment , re Memorandum Opinion, filed Mar. 5, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 2 pages.

Stipulation and Order to Amend Answer and Counterclaims filed Sep. 13, 2010, in lawsuit asserting U.S. Patent No. 7,617,240, captioned *Accenture Global Services GmbH, et al. v. Guidewire Software, Inc.*, Case No. 09cv848, D. Del. Nov. 10, 2009. 46 pages.

Guidewire's Supplemental Reply Brief in Support of its Motion for Partial Summary Judgment Regarding Invalidity of the '284 and '111 Patents as Claiming Unpatentable Subject Matter filed Aug. 26, 2010, *Accenture Global Services, Gmbh et al. v. Guidewire Software Inc.*, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 10 pages.

Accenture's Brief in Opposition to Guidewire's Supplemental Brief in Support of its Motion for Partial Summary Judgment of Invalidity as Claiming Unpatentable Subject Matter filed Oct. 15, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 15 pages.

Guidewire's Amended Answer and Counterclaims to Accenture's Complaint for Patent Infringement filed Nov. 2, 2010, in lawsuit asserting U.S. Patent No. 7,617,240, captioned *Accenture Global Services GmbH, et al. v. Guidewire Software, Inc.*, Case No. 09cv848, D. Del. Nov. 10, 2009. 17 pages.

Accenture's Opening Brief in Support of Motion to Strike Allegations in Defendant Guidewire's Amended Answer and Counterclaims filed Nov. 15, 2010, in lawsuit asserting U.S. Patent No. 7,617,240, captioned *Accenture Global Services GmbH, et al. v. Guidewire Software, Inc.*, Case No. 09cv848, D. Del. Nov. 10, 2009. 23 pages.

Plaintiffs Accenture Global Service GmbH and Accenture Llp's Reply to Guidewire's Amended Counterclaims to Accenture's Complaint for Infringement of the '240 Patent filed Nov. 15, 2010, in lawsuit asserting U.S. Patent No. 7,617,240, captioned Accenture Global Services GmbH, et al. v. Guidewire Software, Inc., Case No. 09cv848, D. Del. 11/10/09 (Dkt. No. 65). 8 pages.

Accenture Global Service's GmbH and Accenture LLP's Jan. 18, 2011 Response to Guidewire, Inc.'s Third Set of Interrogatories, in lawsuit asserting U.S. Patent No. 7,617,240, captioned *Accenture Global Services GmbH, et al. v. Guidewire Software, Inc.*, D. Del. Nov. 10, 2009, 8 pages.

Defendant Guidewire Software, Inc.'s Mar. 29, 2011 Redacted Supplemental Objections and Response to Accenture's Interrogatory No. 3, in lawsuit asserting U.S. Patent No. 7,617,240, captioned *Accenture Global Services GmbH, et al. v. Guidewire Software, Inc.*, D. Del. Nov. 10, 2009, No. 6., 24 pgs.

Exhibit C of Defendant Guidewire Software, Inc.'s Mar. 29, 2011 Redacted Supplemental Objections and Response to Accenture's Interrogatory No. 3 (I5) (Microsoft TODD, as cited in Mar. 14, 2001 and Dec. 3, 2001 Office Actions in 284 Patent File History)—Guidewire Invalidity Contentions Invalidity Claim Chart for '240 Patent, 19 pages.

Exhibit F of Defendant Guidewire Software, Inc.'s Mar. 29, 2011 Redacted Supplemental Objections and Response to Accenture's Interrogatory No. 3 (15) (Microsoft Access 97) — Guidewire Invalidity Contentions Invalidity Claim Chart for '240 Patent, 15 pages.

Exhibit G of Defendant Guidewire Software, Inc.'s Mar. 29, 2011 Redacted Supplemental Objections and Response to Accenture's Interrogatory No. 3 (I5) (109 Patent (Flores))—Guidewire Invalidity Contentions Invalidity Claim Chart for '240 Patent, 42 pages.

Exhibit H of Defendant Guidewire Software, Inc.'s Mar. 29, 2011 Redacted Supplemental Objections and Response to Accenture's Interrogatory No. 3 (I5) (764 Patent (Shutzman)—Guidewire Invalidity Contentions Invalidity Claim Chart for '240 Patent, 73 pages.

Exhibit J of Defendant Guidewire Software, Inc.'s Mar. 29, 2011 Redacted Supplemental Objections and Response to Accenture's Interrogatory No. 3 (I5) (169 Patent (Borgheshi)—Guidewire Invalidity Contentions Invalidity Claim Chart for '240 Patent, 39 pages.

Exhibit K of Defendant Guidewire Software, Inc.'s Mar. 29, 2011 Redacted Supplemental Objections and Response to Accenture's Interrogatory No. 3 (I5) (`247 Patent (Lau))—Guidewire Invalidity Contentions Invalidity Claim Chart for '240 Patent, 25 pages.

Exhibit L of Defendant Guidewire Software, Inc.'s Mar. 29, 2011 Redacted Supplemental Objections and Response to Accenture's Interrogatory No. 3 (I5) (740 Patent (Lynn)—Guidewire Invalidity Contentions Invalidity Claim Chart for '240 Patent, 44 pages.

Exhibit M of Defendant Guidewire Software, Inc.'s Mar. 29, 2011 Redacted Supplemental Objections and Response to Accenture's Interrogatory No. 3 (I5) (271 Patent (Caruso))—Guidewire Invalidity Contentions Invalidity Claim Chart for '240 Patent, 39 pages.

Exhibit O of Defendant Guidewire Software, Inc.'s Mar. 29, 2011 Redacted Supplemental Objections and Response to Accenture's Interrogatory No. 3 (I5) (Project Salsa)—Guidewire Invalidity Contentions Invalidity Claim Chart for '240 Patent, 44 pages.

Defendant Guidewire Software, Inc.'s Feb. 28, 2011 Supplemental Objections and Response to Accenture's Interrogatory No. 4, in lawsuit asserting U.S. Patent No. 7,617,240, captioned *Accenture Global Services GmbH, et al. v. Guidewire Software, Inc.*, D. Del. Nov. 10, 2009, No. 6., 6 pgs.

Accenture Global Services Gmbh, and Accenture LLP's Supplemental Response to Interrogatories Nos. 7 and 8, dated Mar. 11, 2011, in lawsuit asserting U.S. Patent No. 7,617,240, captioned *Accenture Global Services GmbH, et al. v. Guidewire Software, Inc.*, D. Del. Nov. 10, 2009, 15 pgs.

Exhibit F of Accenture Global Services Gmbh, and Accenture LLP's Supplemental Response to Interrogatories Nos. 7 and 8 (I17)—Rebuttal of Guidewire's Invalidity Assertions Against '240 Patent Based on Access 97, 22 pgs.

Exhibit G of Accenture Global Services GMBH, and Accenture LLP's Supplemental Response to Interrogatories Nos. 7 and 8 (I17)—Rebuttal of Guidewire's Invalidity Assertions Against '240 Patent Based on '109 Patent (Flores), 22 pgs.

Exhibit H of Accenture Global Services GMBH, and Accenture LLP's Supplemental Response to Interrogatories Nos. 7 and 8 (I17)—Rebuttal of Guidewire's Invalidity Assertions Against '240 Patent Based on '764 Patent (Schutzman), 27 pgs.

Exhibit J of Accenture Global Services GMBH, and Accenture LLP's Supplemental Response to Interrogatories Nos. 7 and 8 (I17)—Rebuttal of Guidewire's Invalidity Assertions Against '240 Patent Based on '169 Patent (Borghesi), 27 pgs.

Exhibit K of Accenture Global Services GMBH, and Accenture LLP's Supplemental Response to Interrogatories Nos. 7 and 8 (I17)—Rebuttal of Guidewire's Invalidity Assertions Against '240 Patent Based '247 Patent (Lau), 37 pgs.

Exhibit L of Accenture Global Services GMBH, and Accenture LLP's Supplemental Response to Interrogatories Nos. 7 and 8 (I17)—Rebuttal of Guidewire's Invalidity Assertions Against '240 Patent Based on '740 Patent (Lynn), 27 pgs.

Exhibit M of Accenture Global Services GMBH, and Accenture LLP's Supplemental Response to Interrogatories Nos. 7 and 8 (I17)—Rebuttal of Guidewire's Invalidity Assertions Against '240 Patent Based on '271 Patent (Caruso), 33 pgs.

Exhibit N of Accenture Global Services GMBH, and Accenture LLP's Supplemental Response to Interrogatories Nos. 7 and 8 (I17)—Rebuttal of Guidewire's Invalidity Assertions Against '240 Patent Based on Agarwal, 22 pgs.

Accenture Global Services GMBH, Accenture LLP's and Guidewire Software, Inc.'s Joint Claim Construction Statement and Joint Claim Construction Chart—Exhibit A filed Apr. 11, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009, 6 pages.

Accenture's Opening Claim Construction Brief, filed Apr. 25, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 22 pages.

Memorandum Opinion filed May 31, 2011, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 18 pages.

Guidewire's Answering Claim Construction Brief filed May 27, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 25 pages.

Declaration of Clement S. Roberts in Support of Guidewire Inc.'s Answering Claim Construction Brief filed May 27, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 3 pages.

Exhibit 3—Accenture Newsroom, "Accenture Unveils Enhanced Property and Casualty Insurance Software Platforms", http://newsroom.accenture.com/article_display.cfm?article_id=5212, in Support of Guidewire Inc.'s Answering Claim Construction Brief filed May 27, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 4 pages.

Exhibit 4—"Segment" definition, http://www.merriam-webster.com/dictionary/segment, in Support of Guidewire Inc.'s Answering Claim Construction Brief filed May 27, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 3 pages.

Diamond Personal Auto, Applied Systems, Date Unknown. Deposition Exhibit 123, 12 pages.

The Diamond System—Overview and Features. http://web.archive.org/web/19981201192832/www.appliedsystems.com/Diamond/overview.html. Printed from the Internet May 31, 2009. Deposition Exhibit 141, p. 1.

Freedom's Claim Station, The Freedom Group, 1999. Deposition Exhibit 151, 14 pages.

"The Claims Workstation", The Freedom Group, 1997. Deposition Exhibit 154, 4 pages.

"AAA Missouri Implements Claims Management System", Case Study—The Freedom Group, 1998. Deposition Exhibit 156. 2 pages.

"Higher Customer Satisfaction. Lower Leakage. With Freedom's Claims Workstation." The Freedom Group, 1998. Deposition Exhibit 157, 4 pages.

Fawley, "Arbella Mutual Insurance Company Adds Freedom's Claims Workstation", The Freedom Group, Apr. 2, 1998. Deposition Exhibit 158, 2 pages.

Fawley, "Permanent General Assurance Corporation Adds Freedom's Claims Workstation", The Freedom Group, Dec. 29, 1998. Deposition Exhibit 159, 2 pages.

"AAA Missouri Implements Claims Management System", Date Unknown. Deposition Exhibit 160, 1 page.

Fawley, "The Concord Group Insurance Companies Go 'Live' with Freedom's Claims WorkStation", The Freedom Group, Feb. 1, 1999. Deposition Exhibit 161, 2 pages.

"Claims Workstation", USPTO Trademark Electronic Search System (TESS), printed from United States Patent and Trademark Office website Apr. 10, 2009. Deposition Exhibit 163, 2 pages.

Publically available documents taken from the Internet Archive on the Diamond System—http://web.archive.org/web/19970619183517/www.appliedsystems.com/compsys.htm, circa 1997, 12 pages.

Publically available documents taken from the Internet Archive on the Claims Workstation—web.archive.org/web/19971008183730/www.freedomgroup.com/tfgclmws.htm, circa 1997, 3 pages.

Publically available documents taken from the Internet Archive on the Pyramid—web.archive.org/web/19981212032130/http://www.pyramidservices.com, circa 1998, 37 pages.

* cited by examiner

COMPONENT BASED INFORMATION LINKING DURING CLAIM PROCESSING

PRIORITY

This application is a continuation of U.S. application Ser. No. 09/305,146, filed May 4, 1999, of which disclosure is hereby incorporated by reference herein in its entirety.

FIELD OF THE INVENTION

The present invention relates to information management and more particularly to linking information during insurance claim processing utilizing a computer system.

BACKGROUND OF THE INVENTION

Computers have become a necessity in life today. They appear in nearly every office and household worldwide. A representative hardware environment is depicted in prior art FIG. 1, which illustrates a typical hardware configuration of a workstation having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system.

Object oriented programming (OOP) has become increasingly used to develop complex applications. As OOP moves toward the mainstream of software design Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, the logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

SUMMARY OF THE INVENTION

A computer program is provided for developing component based software capable of linking insurance-related information. The program includes a data component that stores, retrieves and manipulates data utilizing a plurality of functions. Also provided is a client component that includes an adapter component that transmits and receives data to/from the data component. The client component also includes a business component that serves as a data cache and includes logic for manipulating the data. A controller component is also included which is adapted to handle events generated by a user utilizing the business component to cache data and the adapter component to ultimately persist data to a data repository. In use, the client component is provided with insurance-related information concerning an individual and an event. The user is then able to input information concerning the involvement of the individual in the event. In addition, the user is able to link the individual to the event. Finally, the linked information concerning the individual, the event and the involvement of the individual in the event are displayed.

DESCRIPTION OF THE DRAWINGS

The foregoing and other objects, aspects and advantages are better understood from the following detailed description of a preferred embodiment of the invention with reference to the drawings, in which.

Prior Art

DISCLOSURE OF THE INVENTION

Figure 1:
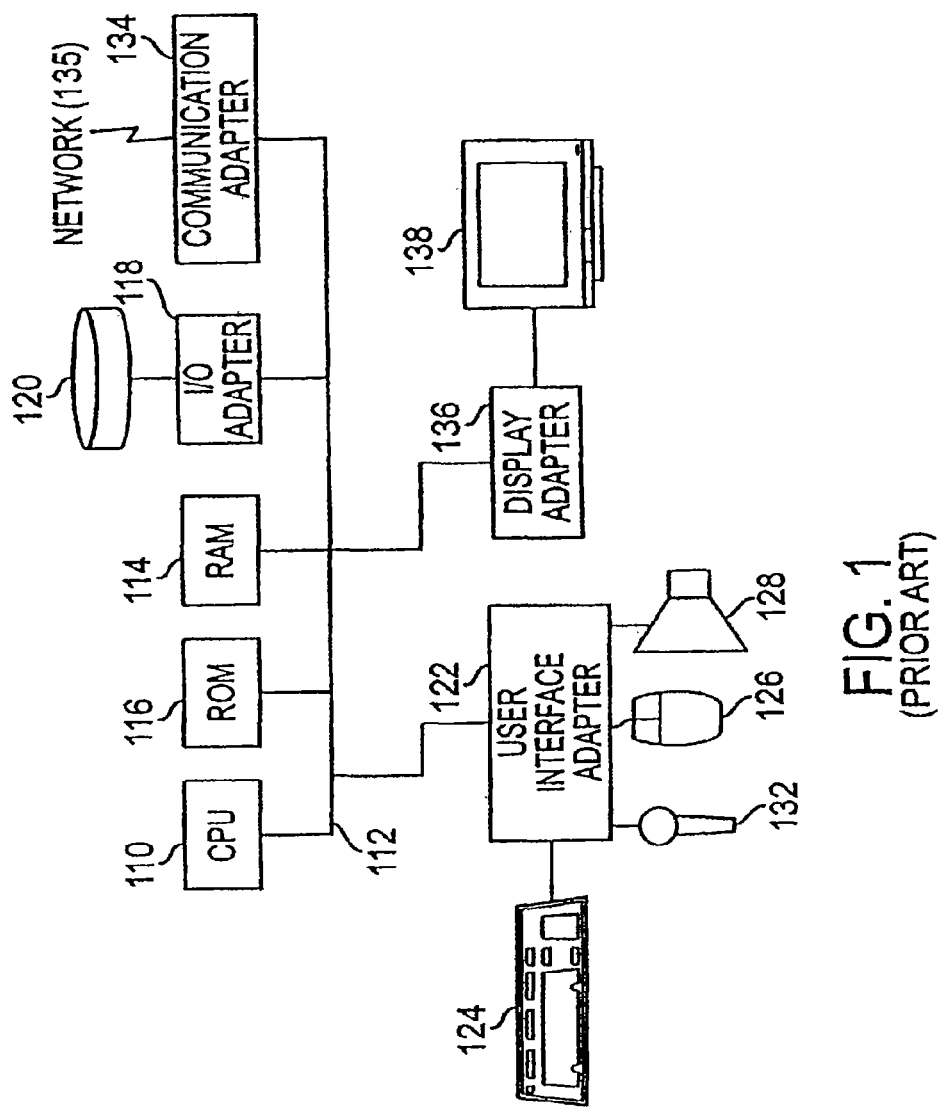
FIG. 1 is a schematic diagram of the present invention.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

DETAILED DESCRIPTION

Figure 2A:
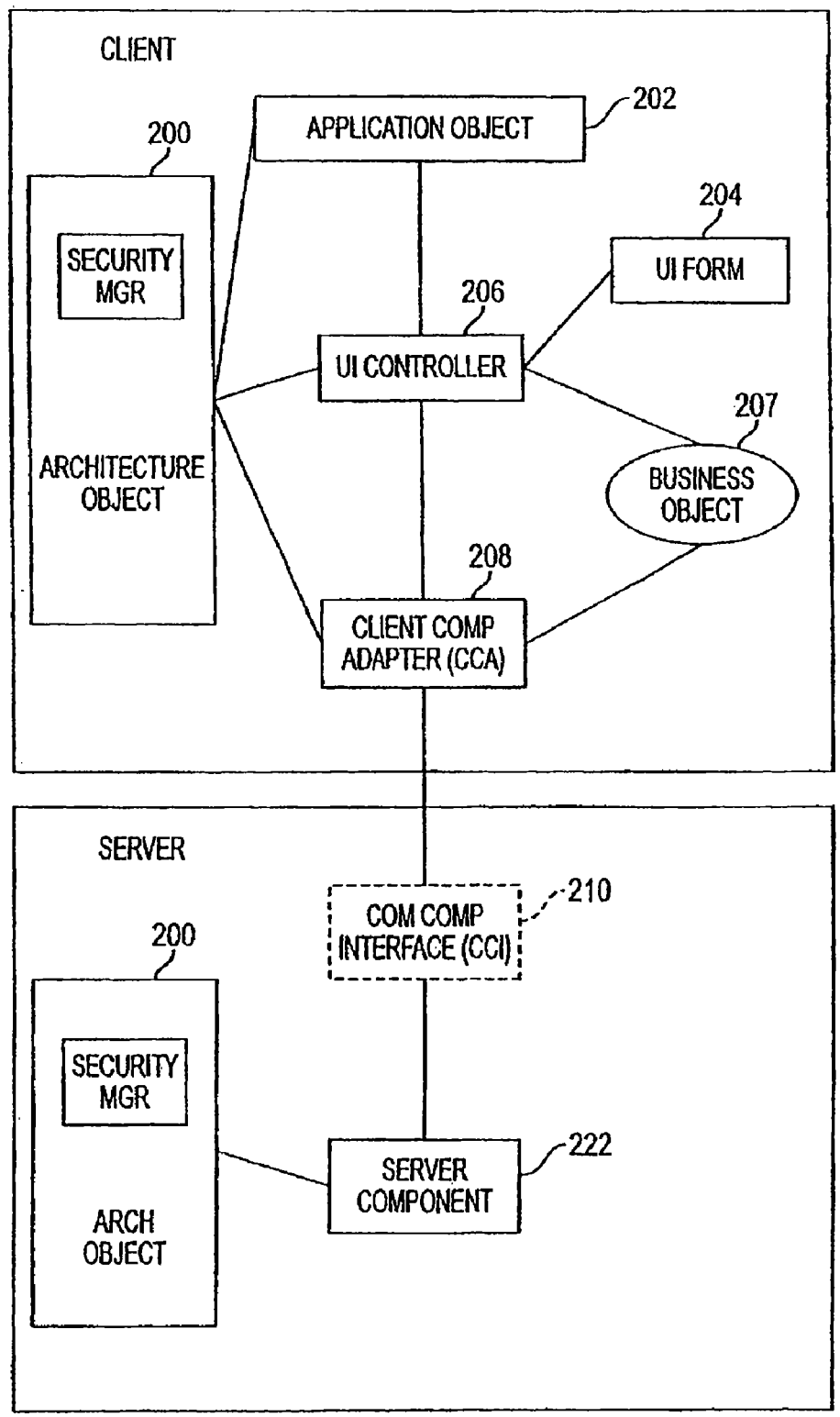
FIG. 2A is block diagram of one embodiment of the present invention.

One embodiment of the present invention is a server based framework utilizing component based architecture. Referring to FIG. 2A, one embodiment of the present invention includes an Architecture Object 200, an Application Object 202, a User Interface Form 204, a User Interface Controller 206, a Client Component Adapter 208, a COM Component Interface 210, and a Server Component 222.

Figure 2B:
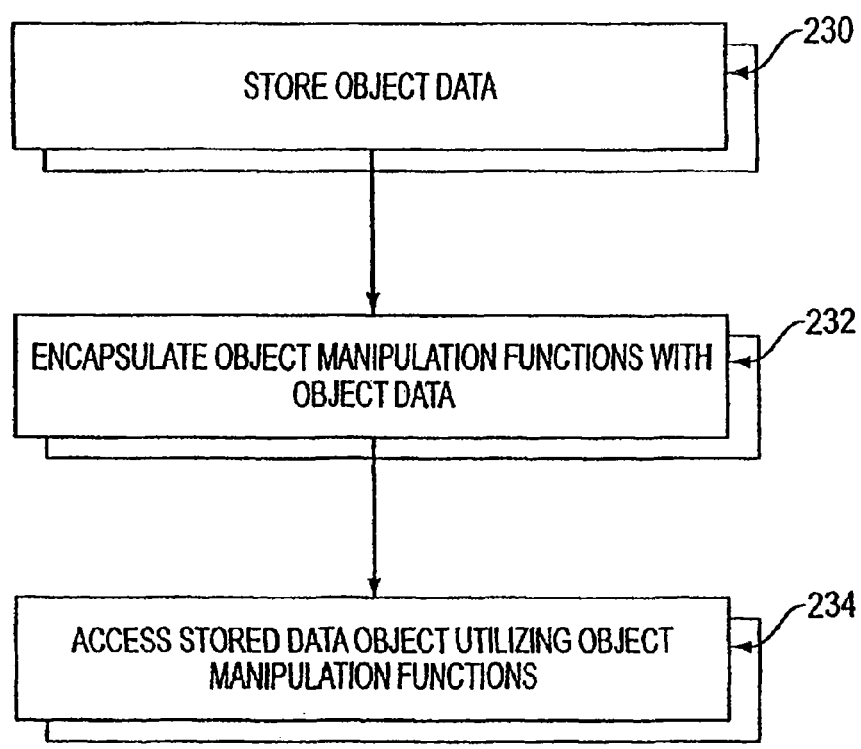
FIG. 2B is a flowchart showing how components generally operate in accordance with one embodiment of the present invention.

In general, the components of the present invention operate as shown in FIG. 2B. In step 230, data is stored in an object of the component. In step 232, functions which manipulate the object are encapsulated with the object data. Later, in step 234, the stored object data can be manipulated by other components utilizing the functions of step 232.

Architecture Object

The Architecture Object 200 provides an easy-to-use object model that masks the complexity of the architecture on the client. The Architecture Object 200 provides purely technical services and does not contain any business logic or functional code. It is used on the client as the single point of access to all architecture services.

On the server side, the Architecture Object 200 is supplemented by a set of global functions contained in standard VB modules The Architecture Object 200 is responsible for providing all client architecture services (i.e., codes table access, error logging, etc.), and a single point of entry for architecture services. The Architecture Object 200 is also responsible for allowing the architecture to exist as an autonomous unit, thus allowing internal changes to be made to the architecture with minimal impact to application.

The Architecture Object 200 provides a code manager, client profile, text manager, ID manager, registry manager, log manager, error manager, and a security manager. The codes manager reads codes from a local database on the client, marshals the codes into objects, and makes them available to the application. The client profile provides information about the current logged-in user. The text manager provides various text manipulation services such as search and replace. The ID manager generates unique IDs and timestamps. The registry manager encapsulates access to the system registry. The log manager writes error or informational messages to the message log. The error manager provides an easy way to save and re-raise an error. And the security manager determines whether or not the current user is authorized to perform certain actions.

Application Object

The Application Object 202 has a method to initiate each business operation in the application. It uses late binding to instantiate target UI controllers in order to provide autonomy between windows. This allows different controllers to use the Application Object 202 without statically linking to each and every UI controller in the application.

When opening a UI controller, the Application Object 202 calls the architecture initialization, class initialization, and form initialization member functions.

The Application Object 202 keeps a list of every active window, so that it can shut down the application in the event of an error. When a window closes, it tells the Application Object 202, and is removed from the Application Object's 202 list of active windows.

The Application Object 202 is responsible for instantiating each UI Controller 206, passing data/business context to the target UI Controller 206, and invoking standard services such as initialize controller, initializing Form and Initialize Architecture. The Application Object 202 also keeps track of which windows are active so that it can coordinate the shutdown process.

UI Form

The UI form's 204 primary responsibility is to forward important events to its controller 206. It remains mostly unintelligent and contains as little logic as possible. Most event handlers on the form simply delegate the work by calling methods on the form's controller 206.

The UI form 204 never enables or disables its own controls, but ask its controller 206 to do it instead. Logic is included on the UI form 204 only when it involves very simple field masking or minor visual details.

The UI form 204 presents an easy-to-use, graphical interface to the user and informs its controller 206 of important user actions. The UI form 204 may also provide basic data validation (e.g., data type validation) through input masking. In addition, the UI form is responsible for intelligently resizing itself, launching context-sensitive help, and unload itself.

User Interface Controller

Every UI Controller 206 includes a set of standard methods for initialization, enabling and disabling controls on its UI form 204, validating data on the form, getting data from the UI form 204, and unloading the UI form 204.

UI Controllers 206 contain the majority of logic to manipulate Business Objects 207 and manage the appearance of its UI form 204. If its form is not read-only, the UI Controller 206 also tracks whether or not data on the UI form 204 has changed, so as to avoid unnecessary database writes when the user decides to save. In addition, controllers of auxiliary windows (like the File-Save dialog box in Microsoft Word), keep track of their calling UI controller 206 so that they can notify it when they are ready to close.

Figure 2C:
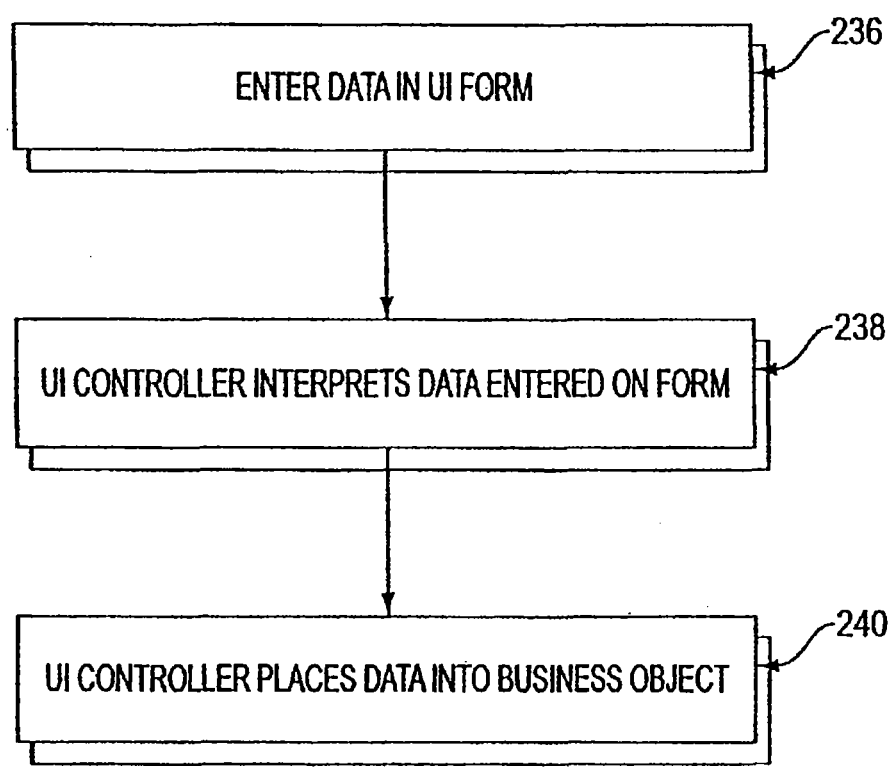
FIG. 2C is a flowchart showing how the UI Controller operates in accordance with one embodiment of the present invention.

FIG. 2C is a flowchart showing how the UI Controller operates in one embodiment of the present invention. In step 236, data is entered in a UI form by a user. In step 238, the UI controller interprets the data entered into the UI form. In step 240, the UI controller places the appropriate data into a Business Object to be utilized and retrieved later.

A UI Controller 206 defines a Logical Unit of Work (LUW). If an LUW involves more than one UI Controller 206, the LUW is implemented as a separate object.

The UI Controller 206 is responsible for handling events generated by the user interacting with the UI form 204 and providing complex field validation and cross field validation within a Logical Unit of Work. The UI Controller 206 also contains the logic to interact with business objects 207, and creates new business objects 207 when necessary. Finally, the UI Controller 206 interacts with Client Component Adapters 208 to add, retrieve, modify, or delete business objects 207, and handles all client-side errors.

Business Objects

The Business Object's (BO) 207 primary functionality is to act as a data holder, allowing data to be shared across User Interface Controllers 206 using an object-based programming model.

BOs 207 perform validation on their attributes as they are being set to maintain the integrity of the information they contain. BOs 207 also expose methods other than accessors to manipulate their data, such as methods to change the life cycle state of a BO 207 or to derive the value of a calculated attribute.

In many cases, a BO 207 will have its own table in the database and its own window for viewing or editing operations.

Business Objects 207 contain information about a single business entity and maintain the integrity of that information. The BO 207 encapsulates business rules that pertain to that single business entity and maintains relationships with other business objects (e.g., a claim contains a collection of supplements). Finally, the BO 207 provides additional properties relating to the status of the information it contains (such as whether that information has changed or not), provides validation of new data when necessary, and calculates attributes that are derived from other attributes (such as Full Name, which is derived from First Name, Middle Initial, and Last Name).

Client Component Adapters

Client Component Adapters (CCAs) 208 are responsible for retrieving, adding, updating, and deleting business objects in the database. CCAs 208 hide the storage format and location of data from the UI controller 206. The UI controller 206 does not care about where or how objects are stored, since this is taken care of by the CCA 208.

The CCA 208 marshals data contained in recordsets returned by the server into business objects 207. CCAs 208 masks all remote requests from UI Controller 206 to a specific component, and act as a "hook" for services such as data compression, and data encryption.

COM Component Interface

A COM Component Interface (CCI) 210 is a "contract" for services provided by a component. By "implementing" an interface (CCI) 210, a component is promising to provide all the services defined by the CCI 20.

The CCI 210 is not a physical entity (which is why it is depicted with a dotted line). It's only reason for existence is to define the way a component appears to other objects. It includes the signatures or headers of all the public properties or methods that a component will provide.

To implement a CCI 210, a server component exposes a set of specially named methods, one for each method defined on the interface. These methods should do nothing except delegate the request to a private method on the component which will do the real work.

The CCI 210 defines a set of related services provided by a component. The CCI allows any component to "hide" behind the interface to perform the services defined by the interface by "implementing" the interface.

Server Component

Server components 222 are course grained and transaction oriented. They are designed for maximum efficiency.

Server Components 222 encapsulate all access to the database, and define business transaction boundaries. In addition, Server Components 222 are responsible for ensuring that business rules are honored during data access operations.

A Server Component 222 performs data access operations on behalf of CCAs 208 or other components and participates in transactions spanning server components 222 by communicating with other server components 222. The Server Component 222 is accessible by multiple front end personalities (e.g., Active Server Pages), and contains business logic designed to maintain the integrity of data in the database.

Figure 2D:
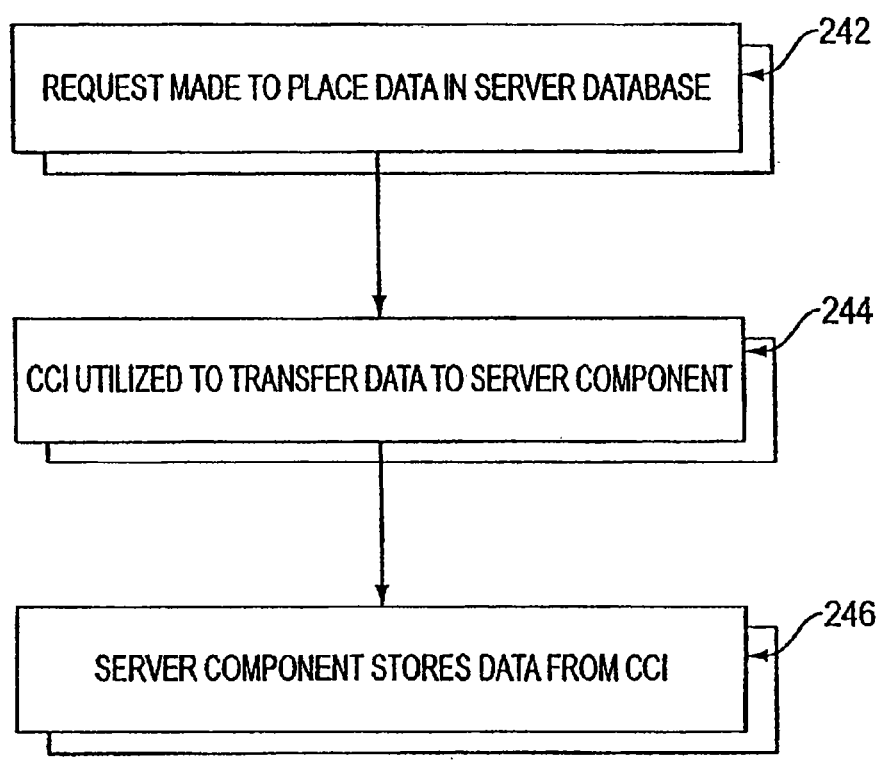
FIG. 2D is a flowchart showing the interactions between the CCA, the CCI, and the Server Component in accordance with one embodiment of the present invention.

FIG. 2D is a flowchart showing the interactions between the CCA, the CCI, and the Server Component in accordance with one embodiment of the present invention. In step 242, a request is made to place client created data on the server database. In step 244, the data is transferred to the server component 222 utilizing a CCI 210. In step 246, the server component 222 stores the data in the server database.

Business Rule Placement

Overview

The distribution of business rules across tiers of the application directly affects the robustness and performance of the system as a whole. Business rules can be categorized into the following sections: Relationships, Calculations, and Business Events.

Relationships between Business Objects

Business Objects 207 are responsible for knowing other business objects 207 with which they are associated.

Relationships between BOs 207 are built by the CCA 208 during the marshaling process. For example, when a CCA 208 builds a claim BO 207, it will also build the collection of supplements if necessary.

Calculated Business Data

Business rules involving calculations based on business object 207 attributes are coded in the business objects 207 themselves. Participant Full Name is a good example of a calculated attribute. Rather than force the controllers to concatenate the first name, middle initial, and last name every time they wanted to display the full name, a calculated attribute that performs this logic is exposed on the business object. In this way, the code to compose the full name only has to be written once and can be used by many controllers 206.

Another example of a calculated attribute is the display date of a repeating task. When a task with a repeat rule is completed, a new display date must be determined. This display date is calculated based on the date the task was completed, and the frequency of repetition defined by the repeat rule. Putting the logic to compute the new display date into the Task BO 207 ensures that it is coded only once.

Responses to Business Events

Business rules that relate to system events and involve no user interaction are enforced on the server components.

Completion of a task is a major event in the system. When a task is completed, the system first ensures that the performer completing the task is added to the claim. Then, after the task is marked complete in the database, it is checked to see if the task has a repeat rule. If so, another task is created and added to the database. Finally, the event component is notified, because the Task Engine may need to react to the task completion.

Consider the scenario if the logic to enforce this rule were placed on the UI controller 206.

The controller 206 calls the Performer Component to see if the performer completing the task has been added to the claim. If the performer has not been added to the claim, then the controller 206 calls the performer component again to add them.

Next, the controller 206 calls the Task Component to mark the task complete in the database. If the task has a repeat rule, the controller 206 computes the date the task is to be redisplayed and calls the Task Component again to add a new task. Lastly, the controller 206 calls the Event Component to notify the Task Engine of the task completion.

The above implementation requires five network round trips in its worst case. In addition, any other controller 206 or server component 222 that wants to complete a task must code this logic all over again. Enforcing this rule in the task server component 222 reduces the number of network round trips and eliminates the need to code the logic more than once.

Responses to User Events

All responses to user events are coordinated by the controller 206. The controller 206 is responsible for actions such as enabling or disabling controls on its form, requesting authorization from the security component, or making calls to the CCA 208.

Authorization

All logic for granting authorization is encapsulated inside the security component. Controllers 206 and components 222 must ask the security component if the current user is authorized to execute certain business operations in the system. The security component will answer yes or no according to some predefined security logic.

| Summary | | |
|---|---|---|
| Type of Business Rule | Example | Responsibility |
| Maintaining relationships between BOs | Claim keeps a collection of supplements | Business Objects |
| Building relationships between BOs | CCA builds the claim's collection of supplements | CCAs |
| Calculated Business Data | Participant calculates its full name | Business Objects |
| Responses to Business Events | Task Component collaborates with other components | Components |
| Requesting Authorization | Task Library controller asks the security component if the current user is allowed to access Task Library | Controllers and Components |
| Granting Authorization | Security component determines whether or not the current user can access Task Library | Security Component |

Window Processing Framework

The Default Window Framework provides default window processing for each window contained within the system. This default processing aides the developer in developing robust, maintainable UIs, standardizes common processes (such as form initialization) and facilitates smooth integration with architecture services.

Figure 3:
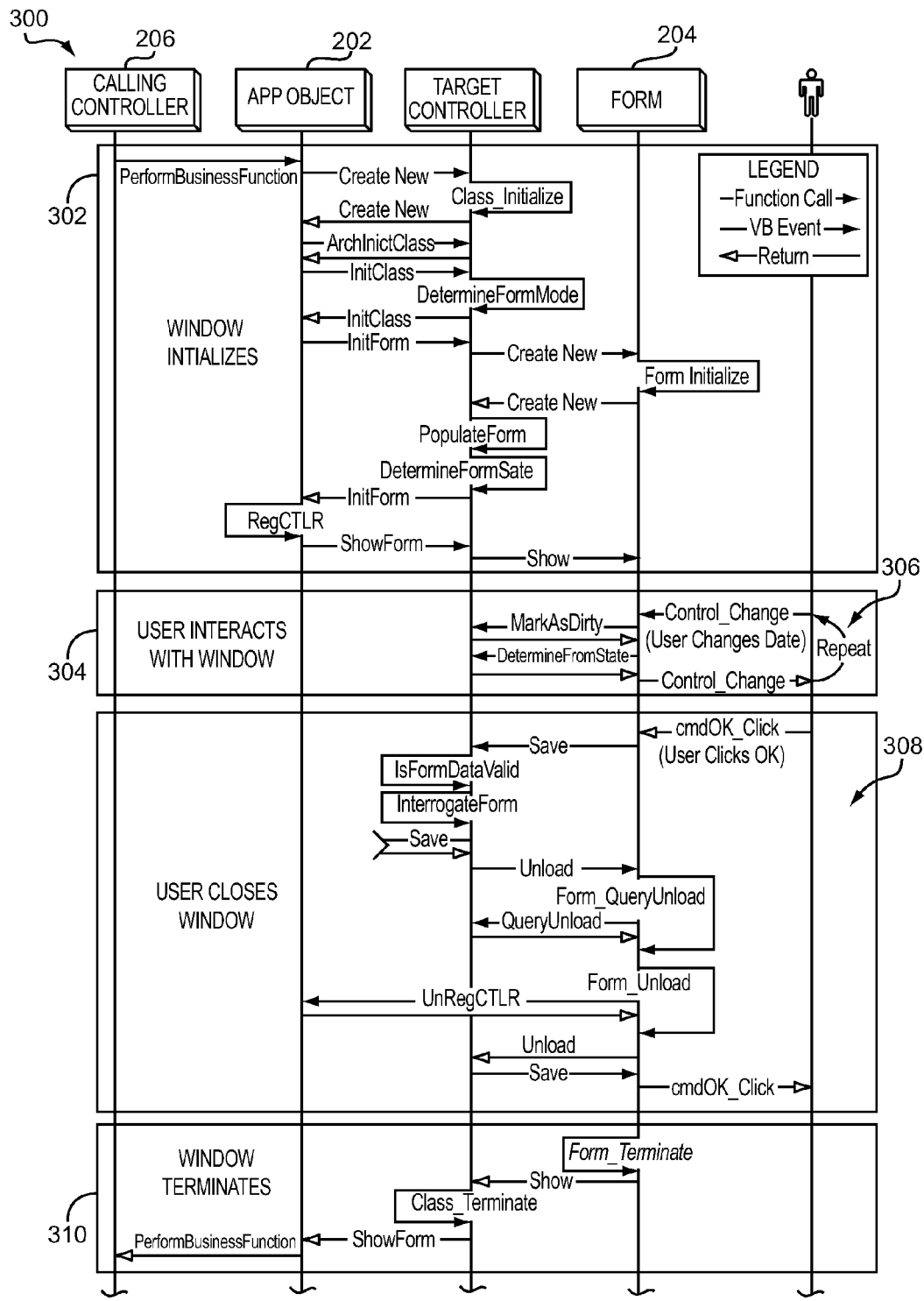
FIG. 3 shows the life cycle of a typical User Interface and the standard methods that are part of the Window Processing Framework.

FIG. 3 shows the life cycle of a typical User Interface and the standard methods that are part of the Window Processing Framework 300.

The Window Processing Framework 300 encompasses the following:

Window Initialization 302;
Window Save Processing 304;
Window Control State Management 306;
Window Data Validation 308;
Window Shutdown Processing 310.

Window Initialization Processing 302: After creating a controller 206 for the desired window, the App object 202 calls a set of standard initialization functions on the controller 206 before the form 204 is displayed to the user. Standardizing these functions makes the UIs more homogeneous throughout the application, while promoting good functional decomposition.

Window Save Processing 304: Any time a user updates any form text or adds an item to a ListBox, the UI Controller 206 marks the form as "dirty". This allows the UI controller 206 to determine whether data has changed when the form closes and prompt the user to commit or lose their changes.

Window Control State Management 306: Enabling and disabling controls and menu options is a very complex part of building a UI. The logic that modifies the state of controls is encapsulated in a single place for maintainability.

Window Data Validation 308: Whenever data changes on a form, validation rules can be broken. The controller is able to detect those changes, validate the data, and prompt the user to correct invalid entries.

Window Shutdown Processing 310: The Window Shutdown framework provides a clear termination path for each UI in the event of an error. This reduces the chance of memory leaks, and General Protection failures.

Benefits

Standardized Processing: Standardizing the window processing increases the homogeneity of the application. This ensures that all windows within the application behave in a consistent manner for the end users, making the application easier to use. It also shortens the learning curve for developers and increases maintainability, since all windows are coded in a consistent manner.

Simplified Development: Developers can leverage the best practices documented in the window processing framework to make effective design and coding decisions. In addition, a shell provides some "canned" code that gives developers a head start during the coding effort.

Layered Architecture: Because several architecture modules provide standardized processing to each application window, the core logic can be changed for every system window by simply making modifications to a single procedure.

Window Initialization 302

To open a new window, the App Object 202 creates the target window's controller 206 and calls a series of methods on the controller 206 to initialize it. The calling of these methods, ArchInitClass, InitClass, InitForm, and ShowForm, is illustrated below.

ArchInitClass

The main purpose of the ArchInitClass function is to tell the target controller 206 who is calling it. The App Object 202 "does the introductions" by passing the target controller 206 a reference to itself and a reference to the calling controller 206. In addition, it serves as a hook into the controller 206 for adding architecture functionality in the future.

```
Public Sub ArchInitClass(objApp As Object, objCallingCTLR As
Object)
    ' remember who called me
    Set m_objApp = objApp
    Set m_objCallingCTLR = objCallingCTLR
End Sub
```

InitClass

This function provides a way for the App Object 202 to give the target controller 206 any data it needs to do its processing. It is at this point that the target controller 206 can determine what "mode" it is in. Typical form modes include, add mode, edit mode, and view mode. If the window is in add mode, it creates a new BO 207 of the appropriate type in this method.

```
Public Sub InitClass(colPrevSelection As CArchCollection)
    If colPrevSelection Is Nothing Then
        ' no accounts were previously selected
        Set m_colPrevSelection = New CArchCollection
        Set m_colNewSelection = New CArchCollection
    Else
        ' some accounts may have already been selected
        Set m_colPrevSelection = colPrevSelection
        Set m_colNewSelection = colPrevSelection.Clone( )
    End If
    Set m_colResults = New CArchCollection
    DetermineFormMode( )
End Sub
```

InitForm

The InitForm procedure of each controller 206 coordinates any initialization of the form 204 before it is displayed. Because initialization is often a multi-step process, InitForm creates the window and then delegates the majority of the initialization logic to helper methods that each have a single purpose, in order to follow the rules of good functional decomposition. For example, the logic to determine a form's 204 state based on user actions and relevant security restrictions and move to that state is encapsulated in the DetermineFormState method.

```
Public Sub InitForm( )
    ' create my form
    Set m_frmCurrentForm = New frmAccountSearch
    ' figure out the state of my form based on arguments I
received in InitClass and
    ' enable/disable the appropriate controls
    DetermineFormState( )
    ' fill my form with data
    PopulateForm( )
End Sub
```

PopulateForm

PopulateForm is a private method responsible for filling the form with data during initialization. It is called exactly once by the InitForm method. PopulateForm is used to fill combo boxes on a form 204, get the details of an object for an editing window, or display objects that have already been selected by the user, as in the following example.

```
Private Sub PopulateForm( )
    Dim acct As CAccount
    Dim item As GTListItem
    ' display any accounts already selected by the user
    ' create and add a ListItem for every Account in the
previous selection collection
    With frmCurrentForm.lvwResults.ListItems
        .Clear
        For Each acct In m_colPrevSelection
            Set item = .Add(, acct.Number, acct.Number)
            item.SubItems(1) = acct.Name
        Next
    End With
End Sub
```

ShowForm

The ShowForm method simply centers and displays the newly initialized form 204.

```
Public Sub ShowForm( )
    ' center my form
    frmCurrentForm.Move(Screen.Width – frmCurrentForm.Width) /
2,_
                    (Screen.Height – frmCurrentForm.Height)
/ 2
    ' display my form
    frmCurrentForm.Show vbModal
End Sub
```

Window Control State Management 306

It is often necessary to enable or disable controls on a form 204 in response to user actions. This section describes the patterns employed by the Component Based Architecture for MTS (CBAM) to manage this process effectively.

Form Mode

It is helpful to distinguish between form mode and form state. Form mode indicates the reason the form 204 has been invoked. Often, forms 204 are used for more than one purpose. A common example is the use of the same form to view, add, and edit a particular type of object, such as a task or a claim. In this case, the form's modes would include View, Add, and Update.

The modes of a form 204 are also used to comply with security restrictions based on the current user's access level. For example, Task Library is a window that limits access to task templates based on the current user's role. It might have a Librarian mode and a Non-Librarian mode to reflect the fact that a non-librarian user cannot be allowed to edit task templates. In this way, modes help to enforce the requirement that certain controls on the form 204 remain disabled unless the user has a certain access level.

It is not always necessary for a form 204 to have a mode; a form might be so simple that it would have only one mode—the default mode. In this case, even though it is not immediately necessary, it may be beneficial to make the form "mode-aware" so that it can be easily extended should the need arise.

Form State

A form 204 will have a number of different states for each mode, where a state is a unique combination of enabled/disabled, visible/invisible controls. When a form 204 moves to a different state, at least one control is enabled or disabled or modified in some way.

A key difference between form mode and form state is that mode is determined when the controller 206 is initialized and remains constant until the controller 206 terminates. State is determined when the window initializes, but is constantly being reevaluated in response to user actions.

Handling UI Events

When the value of a control on the form 204 changes, it is necessary to reevaluate the state of the controls on the form (whether or not they are enabled/disabled or visible/invisible, etc.). If changing the value of one control could cause the state of a second control to change, an event handler is written for the appropriate event of the first control.

The following table lists common controls and the events that are triggered when their value changes.

| Control | Event |
| --- | --- |
| TextBox | Change |
| ComboBox | Change |
| ListBox | Click |
| CheckBox | Click |
| Option Button | Click |

The event handler calls the DetermineFormState method on the controller 206.

Setting the State of Controls

It is essential for maintainability that the process of setting the state of controls be separate from the process for setting the values of those controls. The DetermineFormState method on the controller 206 forces this separation between setting the state of controls and setting their values.

DetermineFormState is the only method that modifies the state of any of the controls on the form 204. Because control state requirements are so complex and vary so widely, this is the only restriction made by the architecture framework.

If necessary, parameters are passed to the DetermineFormState function to act as "hints" or "clues" for determining the new state of the form 204. For complex forms, it is helpful to decompose the DetermineFormState function into a number of helper functions, each handling a group of related controls on the form or moving the form 204 to a different state.

Example

The Edit/Add/View Task Window has three modes: Edit, Add, and View. In Add mode, everything on the form is editable. Some details will stay disabled when in Edit mode, since they should be set only once when the task is added. In both Add and Edit modes, the repeat rule may be edited. Enabling editing of the repeat rule always disables the manual editing of the task's due and display dates. In View mode, only the Category combo box and Private checkbox are enabled.

```
` Edit/Add/View Task Form
Private Sub txtName_Change( )
    myController.DetermineFormState
End Sub
` Edit/Add/View Task Controller
Public Sub DetermineFormState( )
    On Error Goto ErrorHandler
    Select Case m_nFormMode
        ` In Edit Mode, enable only "editable" details and
Repeat Rule editing if necessary
        Case cmFormModeEdit
            EnableAddDetails False
            EnableEditDetails True
            EnableViewDetails True
```

-continued

```
        If m_frmCurrentForm.chkRepetetiveTask.Checked Then
            EnableEditRepeatRule True
            EnableEditDisplayDueDates False
        Else
            EnableEditRepeatRule False
            EnableEditDisplayDueDates True
        End If
        If m_nFormDirty Then EnableSave True Else
EnableSave False
        ` In Add Mode, enable all details and Repeat Rule
editing if necessary
        Case cmFormModeAdd
            EnableAddDetails True
            EnableEditDetails True
            EnableViewDetails True
            If m_frmCurrentForm.chkRepetetiveTask.Checked Then
                EnableEditRepeatRule True
                EnableEditDisplayDueDates False
            Else
                EnableEditRepeatRule False
                EnableEditDisplayDueDates True
            End If
            If m_nFormDirty Then EnableSave True Else
EnableSave False
        ` In View Mode, disable everything except a few
details
        Case cmFormModeView
            EnableAddDetails False
            EnableEditDetails False
            EnableViewDetails True
            EnableEditRepeatRule False
            EnableEditDisplayDueDates False
            EnableSave False
        Case Else
    End Select
    Exit Sub
ErrorHandler:
    ` error handling
End Sub
Edit/Add/View Task Controller
Private Sub EnableAddDetails(bYesNo As Boolean)
    On Error Goto ErrorHandler
    ` Enable or disable controls that should be available only
when the task is being added.
    With frmCurrentForm
        .Name.Enabled = bYesNo
        .Description.Enabled = bYesNo
        .Type.Enabled = bYesNo
        .Level.Enabled = bYesNo
        .Source.Enabled = bYesNo
    End With
    Exit Sub
ErrorHandler:
    ` error handling logic
End Sub
```

Window Data Validation 308

Window data validation is the process by which data on the window is examined for errors, inconsistencies, and proper formatting. It is important, for the sake of consistency, to implement this process similarly or identically in all windows of the application.

Types of Validation

Input Masking

Input masking is the first line of defense. It involves screening the data (usually character by character) as it is entered, to prevent the user from even entering invalid data. Input masking may be done programmatically or via a special masked text box, however the logic is always located on the form, and is invoked whenever a masked field changes.

Single-Field Range Checking

Single-field range checking determines the validity of the value of one field on the form by comparing it with a set of valid values. Single-field range checking may be done via a combo box, spin button, or programmatically on the form, and is invoked whenever the range-checked field changes.

Cross-Field Validation

Cross-field validation compares the values of two or more fields to determine if a validation rule is met or broken, and occurs just before saving (or searching). Cross-field validation may be done on the Controller 206 or the Business Object 207, however it is preferable to place the logic on the Business Object 207 when the validation logic can be shared by multiple Controllers 206.

Invalid data is caught and rejected as early as possible during the input process. Input masking and range checking provide the first line of defense, followed by cross-field validation when the window saves (or searches).

Single-Field Validation

All single-field validation is accomplished via some sort of input masking. Masks that are attached to textboxes are used to validate the type or format of data being entered. Combo boxes and spin buttons may also be used to limit the user to valid choices. If neither of these are sufficient, a small amount of logic may be placed on the form's event handler to perform the masking functionality, such as keeping a value below a certain threshold or keeping apostrophes out of a textbox.

Cross-Field Validation

When the user clicks OK or Save, the form calls the IsFormDataValid on the controller to perform cross-field validation (e.g., verifying that a start date is less than an end date). If the business object 207 contains validation rules, the controller 206 may call a method on the business object 207 to make sure those rules are not violated.

If invalid data is detected by the controller 206, it will notify the user with a message box and, if possible, the indicate which field or fields are in error. Under no circumstances will the window perform validation when the user is trying to cancel.

Example

```
` Generic Edit Form
Private Sub cmdOK_Click( )
    On Error Goto ErrorHandler
    ` shut down if my data is valid.
    ` saving/canceling will occur in my controller's
QueryUnload function
    If IsFormDataValid Then Unload Me
    Exit Sub
ErrorHandler:
    Err.Raise Err.Number
End Sub
Public Function IsFormDataValid( ) As Boolean
    On Error Goto ErrorHandler
    ` assume success
    IsFormDataValid = True
    ` evaluate all validation rules
    With frmCurrentForm
        ` make sure start date is earlier than end date
        If .txtStartDate.Text > .txtEndDate.Text Then
            IsFormDataValid = False
            MsgBox cmMsgInvalidEndDate
            .txtEndDate.SetFocus
        ElseIf ...
            ` more validation rules
        End If
    End With
    Exit Function
```

-continued

```
ErrorHandler:
    error handling logic
End Function
```

Window Save Processing 304

Window "Save Processing" involves tracking changes to data on a form 204 and responding to save and cancel events initiated by the user.

Tracking Changes to Form Data

Each window within the CBAM application contains a field within its corresponding control object known as the dirty flag. The dirty flag is set to True whenever an end user modifies data within the window. This field is interrogated by the UI Controller 206 to determine when a user should be prompted on Cancel or if a remote procedure should be invoked upon window close.

The application shell provides standard processing for each window containing an OK or Save button.

Saving

The default Save processing is implemented within the UI Controller 206 as follows:

The UI Controller is Notified that the OK button has been clicked. Then the controller 206 checks its Dirty Flag. If flag is dirty, the controller 206 calls the InterrogateForm method to retrieve data from the form 204 and calls a server component 222 to store the business object 207 in the database. If the Dirty Flag is not set, then no save is necessary. The window is then closed.

Canceling

When the user cancels a window, the UI Controller 206 immediately examines the Dirty Flag. If the flag is set to true, the user is prompted that their changes will be lost if they decide to close the window.

Once prompted, the user can elect to continue to close the window and lose their changes or decide not to close and continue working.

Window Shutdown Processing 310

In the event of an error, it is sometimes necessary to shutdown a window or to terminate the entire application. It is critical that all windows follow the shutdown process in order to avoid the GPFs commonly associated with terminating incorrectly. Following is how the window/application is shutdown.

Shutdown Scope

The scope of the shutdown is as small as possible. If an error occurs in a controller 206 that does not affect the rest of the application, only that window is shut down. If an error occurs that threatens the entire application, there is a way to quickly close every open window in the application. The window shutdown strategy is able to accommodate both types of shutdowns.

Shutdown

In order to know what windows must be shut down, the architecture tracks which windows are open. Whenever the App Object 202 creates a controller 206, it calls its RegCTLR function to add the controller 206 to a collection of open controllers. Likewise, whenever a window closes, it tells the App Object 202 that it is closing by calling the App Object's 202 UnRegCTLR function, and the App Object 202 removes the closing controller 206 from its collection. In the case of an error, the App Object 202 loops through its collection of open controllers, telling each controller to "quiesce" or shutdown immediately.

GeneralErrorHandler

The GeneralErrorHandler is a method in MArch.bas that acts as the point of entry into the architecture's error handling mechanism. A component or a controller will call the GeneralErrorHandler when they encounter any type of unexpected or unknown error. The general error handler will return a value indicating what the component or controller should do: (1) resume on the line that triggered the error (2) resume on the statement after the line that triggered the error (3) exit the function (4) quiesce (5) shutdown the entire application.

```
ErrorHandler:
    Select Case CStr(Err.Number)
        ` handle a search with no result error
        Case cmErrNoClaimTreeData
            MsgBox cmMsgNoResultsQuery, vbInformation
            frmCurrentForm.StatusBar.Panels(1) =
cmNoResultsQuery
            'Sets mouse pointer back to default
            frmCurrentForm.MousePointer = vbDefault
        Case Else
            Dim nResumeCode As Integer
            nResumeCode =
GeneralErrorHandler(objApp.objArch.AsMsgStruct, cmController, cmClassName,
cmMethodName)
            Select Case CStr(nResumeCode)
                Case cmErrorResume
                    Resume
                Case cmErrorResumeNext
                    Resume Next
                Case cmErrorExit
                    Exit Sub
                Case cmErrorQuiesce
                    Quiesce
                Case Else
                    objApp.Shutdown
            End Select
    End Select
End Sub
```

In order to prevent recursive calls the GeneralErrorHandler keeps a collection of controllers that are in the process of shutting down. If it is called twice in a row by the same controller 206, it is able to detect and short-circuit the loop. When the controller 206 finally does terminate, it calls the UnRegisterError function to let the GeneralErrorHandler know that it has shut down and removed from the collection of controllers.

Shutdown Process

After being told what to do by the GeneralErrorHandler, the controller 206 in error may try to execute the statement that caused the error, proceed as if nothing happened, exit the current function, call its Quiesce function to shut itself down, or call the Shutdown method on the App Object 202 to shut the entire application down.

Additional Standard Methods

Searching

Controllers 206 that manage search windows have a public method named Find<Noun>s where <Noun> is the type of object being searched for. This method is called in the event handler for the Find Now button.

Saving

Any controller 206 that manages an edit window has a public method called Save that saves changes the user makes to the data on the form 204. This method is called by the event handlers for both the Save and OK buttons (when/if the OK button needs to save changes before closing).

Closing

A VB window is closed by the user in several ways: via the control-box in upper left corner, the X button in upper right corner, or the Close button. When the form closes, the only method that will always be called, regardless of the way in which the close was initiated, is the form's 204 QueryUnload event handler.

Because of this, there cannot be a standard Close method. Any processing that must occur when a window closes is to be done in the QueryUnload method on the controller 206 (which is called by the form's QueryUnload event handler).

The VB statement, Unload Me, appears in the Close button's event handler to manually initiate the unloading process. In this way, the Close button mimics the functionality of the control box and the X button, so that the closing process is handled the same way every time, regardless of how the user triggered the close. The OK button's event handler also executes the Unload Me statement, but calls the Save method on the controller first to save any pending changes.

Business Objects

Business Objects 207 are responsible for containing data, maintaining the integrity of that data, and exposing functions that make the data easy to manipulate. Whenever logic pertains to a single BO 207 it is a candidate to be placed on that BO. This ensures that it will not be coded once for each controller 206 that needs it. Following are some standard examples of business object logic.

Business Logic

Managing Life Cycle State

Overview

The "state" of a business object 207 is the set of all its attributes. Life cycle state refers only to a single attribute (or a small group of attributes) that determine where the BO 207 is in its life cycle. For example, the life cycle states of a Task are Open, Completed, Cleared, or Error. Business objectives usually involve moving a BO toward its final state (i.e., Completed for a Task, Closed for a Supplement, etc.).

Often, there are restrictions on a BO's movement through its life cycle. For example, a Task may only move to the Error state after first being Completed or Cleared. BOs provide a mechanism to ensure that they do not violate life cycle restrictions when they move from state to state.

Approach

A BO 207 has a method to move to each one of its different life cycle states. Rather than simply exposing a public variable containing the life cycle state of the task, the BO exposes methods, such as Task.Clear( ) Task.Complete( ) and Task.MarkInError( ) that move the task a new state. This approach prevents the task from containing an invalid value for life cycle state, and makes it obvious what the life cycle states of a task are.

Example

```
` CTask Business Object
Public Sub MarkInError( )
    On Error Goto ErrorHandler
    Select Case m_nLifeCycleState
        ` move to error only if I've already been completed or cleared
        Case cmTaskCompleted, cmTaskCleared
            m_nLifeCycleState = cmTaskInError
        ` otherwise, raise an error
        Case Else
            Err.Raise cmErrInvalidLifeCycleState
    End Select
    Exit Sub
ErrorHandler:
    Err.Raise Err.Number
End Sub
```

Business Logic

Operating on Groups of Business Objects

Overview

Sometimes, a BO 207 acts as a container for a group of other BOs. This happens when performing operations involving multiple BOs. For example, to close, a claim ensures that it has no open supplements or tasks. There might be a method on the claim BO—CanClose( )—that evaluates the business rules restricting the closing of a claim and return true or false. Another situation might involve retrieving the open tasks for a claim. The claim can loop through its collection of tasks, asking each task if it is open and, if so, adding it to a temporary collection which is returned to the caller.

Example

```
` Claim Business Object
` Error handling omitted for clarity
Public Function CanClose( ) As Boolean
    CanClose = HasOpenTasks( ) And HasOpenSupplements( )
End Function
Public Function HasOpenTasks( ) As Boolean
    ` assume that I have open tasks
    HasOpenTasks = True
    ` loop through all my tasks and exit if I find one that is open
    Dim task As CTask
    For Each task In m_colTasks
        If task.IsOpen( ) Then Exit Function
    Next task
    ` I must not have any open tasks
    HasOpenTasks = False
End Function
Public Function HasOpenSupplements( ) As Boolean
    ` assume that I have open supplements
    HasOpenSupplements = True
    ` loop through all my supplements and exit if I find one that is open
    Dim supp As CSupplement
    For Each supp In m_colSupplements
        If supp.IsOpen( ) Then Exit Function
    Next supp
    HasOpenSupplements = False
End Function
Public Function GetOpenTasks( ) As Collection
    Dim task As CTask
    Dim colOpenTasks As Collection
```

```
    For Each task In m_colTasks
        If task.IsOpen( ) Then colOpenTasks.Add task, task.Id
    Next task
    Set GetOpenTasks = colOpenTasks
End Function
```

Business Object Structures

Overview

When a BO 207 is added or updated, it sends all of its attributes down to a server component 222 to write to the database. Instead of explicitly referring to each attribute in the parameter list of the functions on the CCA 208 and server component 222, all the attributes are sent in a single variant array. This array is also known as a structure.

Approach

Each editable BO 207 has a method named AsStruct that takes the object's member variables and puts them in a variant array. The CCA 208 calls this method on a BO 207 before it sends the BO 207 down to the server component 222 to be added or updated. The reason that this is necessary is that, although object references can be passed by value over the network, the objects themselves cannot. Only basic data types like Integer and String can be sent by value to a server component 222. A VB enumeration is used to name the slots of the structure, so that the server component 222 can use a symbolic name to access elements in the array instead of an index. Note that this is generally used only when performing adds or full updates on a business object 207.

In a few cases, there is a reason to re-instantiate the BO 207 on the server side. The FromStruct method does exactly the opposite of the AsStruct method and initializes the BO 207 from a variant array. The size of the structure passed as a parameter to FromStruct is checked to increase the certainty that it is a valid structure.

When a BO 207 contains a reference to another BO 207, the AsStruct method stores the primary key of the referenced BO 207. For example, the Task structure contains a PerformerId, not the performer BO 207 that is referenced by the task. When the FromStruct method encounters the PerformerId in the task structure, it instantiates a new performer BO and fills in the ID, leaving the rest of the performer BO empty.

Example

```
` CTask Business Object
  ` enumeration of all task attributes
Public Enum TaskAttributes
    cmTaskId
    cmTaskName
    :
    cmTaskDescription
End Enum
` all task attributes declarations here
` all setter and getter functions here
Public Function AsStruct( ) As CTask
    On Error Goto ErrorHandler
    ` create and fill structure
    Dim vStruct(cmTaskNumOfAttributes − 1) As Variant
    vStruct(cmTaskId) = m_vId
    vStruct(cmTaskName) = m_sName
    vStruct(cmTaskPerformerId) = m_vPerformerId
    :
    vStruct(cmTaskDescription) = m_sDescription
    AsStruct = vStruct
    Exit Function
ErrorHandler:
    Err.Raise Err.Number
End Function
Public Sub FromStruct(vStruct As Variant)
    On Error Goto ErrorHandler
    ` check size of vStruct
    If Ubound(vStruct) <> (cmTaskNumOfAttributes − 1) Then
    Err.Raise cmErrInvalidParameters
    ` update my values from the structure
    m_vId = vStruct(cmTaskId)
    m_sName = vStruct(cmTaskName)
    m_vPerformer.Id = vStruct(cmTaskPerformerId)
    :
    m_sDescription = vStruct(cmTaskDescription)
    Exit Sub
ErrorHandler:
    Err.Raise Err.Number
End Sub
```

Cloning Business Objects

Overview

Often a copy of a business object 207 is made. Cloning is a way to implement this kind of functionality by encapsulating the copying process in the BO 207 itself. Controllers 206 that need to make tentative changes to a business object 207 simply ask the original BO 207 for a clone and make changes to the clone. If the user decides to save the changes, the controller 206 ask the original BO to update itself from the changes made to the clone.

Approach

Each BO 207 has a Clone method to return a shallow copy of itself. A shallow copy is a copy that doesn't include copies of the other objects that the BO 207 refers to, but only a copy of a reference to those objects. For example, to clone a task, it does not give the clone a brand new claim object; it gives the clone a new reference to the existing claim object. Collections are the only exception to this rule—they are always copied completely since they contain references to other BOs.

Each BO 207 also has an UpdateFromClone method to allow it "merge" a clone back in to itself by changing its attributes to match the changes made to the clone.

Example

```
` CTask Business Object
Public Function Clone( ) As CTask
    On Error Goto ErrorHandler
    ` create clone object
    Dim tskClone As CTask
    Set tskClone = New CTask
    ` fill clone with my data
    With tskClone
        .Id = m_vId
        .Name = m_sName
        .PerformerId = m_vPerformerId
        Set .Performer = m_prfPerformer
        :
        .Description = m_sDescription
    End With
    Set Clone = tskClone
    Exit Function
ErrorHandler:
    Err.Raise Err.Number
```

```
End Function
Public Sub UpdateFromClone(tskClone As CTask)
    On Error Goto ErrorHandler
        ` set my values equal to the clone's values
        With tskClone
            m_vId = .ID
            m_sName = .Name
            m_vPerformerId = .PerformerId
            Set m_prfPerformer = .Performer
            :
            m_sDescription = .Description
        End With
    Exit Sub
ErrorHandler:
    Err.Raise Err.Number
End Sub
```

Half-Baked Business Objects

Overview

BOs 207 occasionally are filled only half-full for performance reasons. This is done for queries involving multiple tables that return large data sets. Using half-baked BOs 207 can be an error prone process, so it is essential that the half-baking of BOs are carefully managed and contained.

In most applications, there are two kinds of windows—search windows and edit/detail windows. Search windows are the only windows that half-bake BOs 207. Generally, half-baking only is a problem when a detail window expecting a fully-baked BO receives a half-baked BO from a search window.

Approach

Detail windows refresh the BOs 207 they are passed by the search windows, regardless of whether or not they were already fully-baked. This addresses the problems associated with passing half-baked BOs and also helps ensure that the BO 207 is up-to-date.

This approach requires another type of method (besides Get, Add, Update, and Delete) on the CCA 208: a Refresh method. This method is very similar to a Get method (in fact, it calls the same method on the server component) but is unique because it refreshes the data in objects that are already created. The detail window's controller 206 calls the appropriate CCA 208 passing the BO 207 to be refreshed, and may assume that, when control returns from the CCA 208, the BO 207 will be up-to-date and fully-baked.

This is may not be necessary if two windows are very closely related. If the first window is the only window that ever opens the second, it is necessary for the second window to refresh the BO 207 passed by the first window if it knows that the BO 207 is baked fully enough to be used.

CCAs

CCAs 208 are responsible for transforming data from row and columns in a recordset to business objects 207, and for executing calls to server components 222 on behalf of controllers 206.

Retrieving Business Objects

Overview

After asking a component to retrieve data, the CCA 208 marshals the data returned by the component into business objects 207 that are used by the UI Controller 206.

Approach

The marshaling process is as follows:

CCAs 208 call GetRows on the recordset to get a copy of its data in a variant array in order to release the recordset as soon as possible. A method exist to coordinate the marshaling of each recordset returned by the component.

Only one recordset is coordinated in the marshaling process of a single method. A method exist to build a BO from a single row of a recordset. This method is called once for each row in the recordset by the marshaling coordination method.

Example

```
Task CCA
Public Function GetAllTasks( ) As Collection
    On Error Goto ErrorHandler
        ` call a helper method to retrieve tasks
        Dim vRows As Variant
        vRows = RetrieveAllTasks
        Dim i As Integer
        Dim task As CTask
        Dim colTasks As Collection
        Set colTasks = New Collection
        ` vRows is dimmed as column, row. Loop til I run out of
rows.
        For i = 0 To Ubound(vRows, 2)
            ` build BO using helper method
            Set task = BuildTaskFromRow(vRows, i)
            ` add to collection with ID as the key
            colTasks.Add task, task.Id
        Next i
        Set MarshalTasks = colTasks
    Exit Function
ErrorHandler:
    Err.Raise Err.Number
End Function
Private Function RetrieveAllTasks( ) As Variant
    On Error Goto ErrorHandler
        ` call my component and get a recordset full of all tasks
        Dim rs As ADOR.Recordset
        Set rs = tskComp.GetAllTasks( )
        ` get data in variant array from the recordset
        GetAllTasks = rs.GetRows
        ` release the recordset ASAP
        rs.Close
        Set rs = Nothing
    Exit Function
ErrorHandler:
    Err.Raise Err.Number
End Function
Private Function BuildTaskFromRow(vRows As Variant,
nCurrentRow As Integer, _
                    Optional task As CTask) As
CTask
    On Error Goto ErrorHandler
        ` create task if it wasn't passed
        If task Is Nothing Then Set task = New CTask
        ` fill task with data
        With task
            .Id = vRows(0, nCurrentRow)
            .Name = vRows(1, nCurrentRow)
            .PerformerId = vRows(2, nCurrentRow)
            :
            .Description = vRows(32, nCurrentRow)
        End With
        Set BuildTaskFromRow = task
    Exit Function
ErrorHandler:
    Err.Raise Err.Number
End Function
```

Refreshing Business Objects

Overview

The logic to refresh BOs 207 is very similar to the logic to create them in the first place. A "refresh" method is very similar to a "get" method, but must use BOs 207 that already exist when carrying out the marshalling process.

Example

```
` Task CCA
Public Sub RefreshTask(task As CTask)
   On Error Goto ErrorHandler
   ` call a helper method to retrieve tasks
   Dim vRow As Variant
   vRow = RetrieveTaskWithId(task.Id)
   BuildTaskFromRow vRow, i, task
   Exit Sub
ErrorHandler:
   Err.Raise Err.Number
End Sub
Private Function RetrieveTaskWithId(vId As Variant) As Variant
   On Error Goto ErrorHandler
   ` call my component and get a recordset full of all tasks
   Dim rs As ADOR.Recordset
   Set rs = tskComp.GetTaskWithId(vId)
   ` get data in variant array from the recordset
   RetrieveTaskWithId = rs.GetRows
   ` release the recordset ASAP
   rs.Close
   Set rs = Nothing
   Exit Function
ErrorHandler:
   Err.Raise Err.Number
End Function
```

Adding Business Objects

Overview

Controllers 206 are responsible for creating and populating new BOs 207. To add a BO 207 to the database, the controller 206 must call the CCA 208, passing the business object 207 to be added. The CCA 208 calls the AsStruct method on the BO 207, and pass the BO structure down to the component to be saved. It then updates the BO 207 with the ID and timestamp generated by the server. Note the method on the CCA 208 just updates the BO 207.

Example

```
` Task CCA
Public Sub AddTask(task As CTask)
   On Error Goto ErrorHandler
   ` call component to add task passing a task structure
   Dim vIdAndTimestamp As Variant
   vIdAndTimestamp = tskComp.AddTask(task.AsStruct( ))
   ` update ID and Timestamp on task
   task.Id = vIdAndTimestamp(0)
   task.TimeStamp = vIdAndTimestamp(1)
   Exit Sub
ErrorHandler:
   Err.Raise Err.Number
End Sub
```

Updating Business Objects

Overview

The update process is very similar to the add process. The only difference is that the server component only returns a timestamp, since the BO already has an ID.

Example

```
` Task CCA
Public Sub UpdateTask(task As CTask)
   On Error Goto ErrorHandler
   ` call component to update task passing a task structure
   Dim lTimeStamp As Long
   lTimeStamp = tskComp.AddTask(task.AsStruct( ))
   ` update Timestamp on task
   task.TimeStamp = lTimeStamp
   Exit Sub
ErrorHandler:
   Err.Raise Err.Number
End Sub
```

Deleting Business Objects

Deleting Overview

Like the add and the update methods, delete methods take a business object 207 as a parameter and do not have a return value. The delete method does not modify the object 207 it is deleting since that object will soon be discarded.

Example

```
` Task CCA
Public Sub DeleteTask(task As CTask)
   On Error Goto ErrorHandler
   ` call component to update task passing a the ID and Timestamp
   tskComp.DeleteTask task.Id, task.TimeStamp
   Exit Sub
ErrorHandler:
   Err.Raise Err.Number
End Sub
```

Server Component

Server components 222 have two purposes: enforcing business rules and carrying out data access operations. They are designed to avoid duplicating logic between functions.

Designing for Reuse

Enforcing Encapsulation

Each server component 222 encapsulates a single database table or a set of closely related database tables. As much as possible, server components 222 select or modify data from a single table. A component occasionally selects from a table that is "owned" or encapsulated by another component in order to use a join (for efficiency reasons). A server component 222 often collaborates with other server components to complete a business transaction.

Partitioning Logic Between Multiple Classes

If the component becomes very large, it is split into more than one class. When this occurs, it is divided into two classes—one for business rules and one for data access. The business rules class implements the component's interface and utilizes the data access class to modify data as needed.

Example

```
Private Function MarkTaskInError(vMsg As Variant, _
                                 vTaskId As Variant, _
                                 lTimestamp As Variant, _
                                 sReason As String) As Long
    On Error GoTo ErrorHandler
    Const cmMethodName = "MarkTaskInError"
    ` set the SQL statement
    Dim sSQL As String
    sSQL = cmSQLMarkTaskInError
    ` get a new timestamp
    Dim lNewTimeStamp As Long
    lNewTimeStamp = GetTimeStamp( )
    ` create and fill a collection of arguments to be merged
with
    ` the SQL by the ExecuteQuery method
    Dim colArgs As CCollection
    Set colArgs = New CCollection
    With colArgs
        .Add lNewTimeStamp
        .Add cmDBBooleanTrue
        .Add sReason
        .Add vTaskId
        .Add lTimestamp
    End With
    ` run the SQL and set my return value
    ExecuteQuery vMsg, cmUpdate, sSQL, colArguments:=colArgs
    MarkTaskInError = lNewTimeStamp
    ` tell MTS I'm done
    GetObjectContext.SetComplete
    Exit Function
ErrorHandler:
    ` do error handling here
End Function
```

Error Handling

General Information

With the exception of "Class_Initialize", "Class_Terminate", and methods called within an error handler, every function or subroutine has a user defined 'On Error GoTo' statement. The first line in each procedure is: On Error GoTo ErrorHandler. A line near the end of the procedure is given a label "ErrorHandler". (Note that because line labels in VB 5.0 have procedure scope, each procedure can have a line labeled "ErrorHandler"). The ErrorHandler label is preceded by a Exit Sub or Exit Function statement to avoid executing the error handling code when there is no error.

Errors are handled differently based on the module's level within the application (i.e., user interface modules are responsible for displaying error messages to the user).

All modules take advantage of technical architecture to log messages. Client modules that already have a reference to the architecture call the Log Manager object directly. Because server modules do not usually have a reference to the architecture, they use the LogMessage( ) global function complied into each server component.

Any errors that are raised within a server component 222 are handled by the calling UI controller 206. This ensures that the user is appropriately notified of the error and that business errors are not translated to unhandled fatal errors.

All unexpected errors are handled by a general error handler function at the global Architecture module in order to always gracefully shut-down the application.

Server Component Errors

The error handler for each service module contains a Case statement to check for all anticipated errors. If the error is not a recoverable error, the logic to handle it is first tell MTS about the error by calling GetObjectContext.SetAbort( ). Next, the global LogMessage( ) function is called to log the short description intended for level one support personnel. Then the LogMessage( ) function is called a second time to log the detailed description of the error for upper level support personnel. Finally, the error is re-raised, so that the calling function will know the operation failed.

A default Case condition is coded to handle any unexpected errors. This logs the VB generated error then raises it. A code sample is provided below:

Following is an example of how error handling in the task component is implemented when an attempt is made to reassign a task to a performer that doesn't exist. Executing SQL to reassign a task to a non-existent performer generates a referential integrity violation error, which is trapped in this error handler:

```
` Class Declarations
Private Const cmClassName = "CTaskComp"
Public Sub ReassignTask(...)
    On Error GoTo ErrorHandler
    Private Const cmMethodName = "ReassignTask"
    Private Const cmErrReassignTask = "Could not reassign
task."
    :
    ` logic to reassign a task
    :
    GetObjectContext.SetComplete
    Exit Sub
ErrorHandler:
    Dim sShortDescr As String
    sShortDescr = cmErrReassignTask
    ` log short description as warning
    LogMessage vMsg, Err.Number, cmSeverityWarning,
cmClassName, cmMethodName, sShortDescr
    Dim sLongDescr As String
    Select Case Err.Number
        Case cmErrRefIntegrityViolation
            GetObjectContext.SetAbort
            sLongDescr = "Referential integrity violation -
tried " _
                & "to reassign task to a non-existant
performer. " _
                & "Association ID: " & sAssnId _
                & "Association Type: " & sAssnType _
                & "Old Performer Id: " & sOldPerformerId _
                & "New Performer Id: " & sNewPerformerId
            ` log long description as severe
            LogMessage vMsg, Err.Number, cmSeveritySevere,
cmClassName, cmMethodName, _
                sLongDescr
            Err.Raise Err.Number
        :
        ` more error handling
        :
        Case Else
            ` let architecture handle unanticipated error
            Dim nResumeCode As Integer
            nResumeCode = GeneralErrorHandler(vMsg, cmServer,
cmClassName, cmMethodName)
            Select Case nResumeCode
                Case cmErrorResume
                    Resume
```

```
        Case cmErrorResumeNext
            Resume Next
        Case cmErrorExit
            Exit Sub
        Case Else
            GetObjectContext.Abort
            Err.Raise Err.Number
        End Select
    End Select
End Sub
```

CCAs, CCIs, Business Objects, and Forms

All CCI's, CCA's, Business Objects, and Forms raise any error that is generated. A code sample is provided below:

```
Sub SubName( )
    On Error GoTo ErrorHandler
    <the procedure's code here>
    .........
    Exit Sub
ErrorHandler:
    Err.Raise Err.Number
End Sub
```

User Interface Controller Errors

The user interface controllers 206 handle any errors generated and passed up from the lower levels of the application. UI modules are responsible for handling whatever errors might be raised by server components 222 by displaying a message box to the user.

Any error generated in the UI's is also displayed to the user in a dialog box. Any error initiated on the client is logged using the LogMessage( ) procedure. Errors initiated on the server will already have been logged and therefore do not need to be logged again.

All unexpected errors are trapped by a general error method at the global architecture module. Depending on the value returned from this function, the controller may resume on the statement that triggered the error, resume on the next statement, call its Quiesce function to shut itself down, or call a Shutdown method on the application object to shutdown the entire application.

No errors are raised from this level of the application, since controllers handle all errors. A code sample of a controller error handler is provided below:

```
`Class Constants
Private Const cmClassName As String = "<ComponentName>"
Sub SubName( )
    On Error GoTo ErrorHandler
    Const cmMethodName As String = "<MethodName>"
    :
    :
    <the procedure's code here>
    :
    :
    Exit Sub
ErrorHandler:
    Select Case CStr(Err.Number)
        Case ...
            `display the error to the user
            perform any necessary logic
```

```
            Exit Sub (or Resume, or Resume Next)
        :
        :
        Case Else
            Dim nResumeCode As Integer
            nResumeCode = GeneralErrorHandler(vMsg,
cmController, cmClassName, cmMethodName)
            Select Case CStr(nResumeCode)
                Case cmErrorResume
                    Resume
                Case cmErrorResumeNext
                    Resume Next
                Case cmErrorExit
                    Exit Sub
                Case cmErrorQuiesce
                    Quiesce
                Case Else
                    objApp.SHUTDOWN
            End Select
    End Select
End Sub
```

Localization

The CBAM application is constructed so that it can be localized for different languages and countries with a minimum effort or conversion.

Requirements and Scope

The CBAM architecture provides support for certain localization features:
Localizable Resource Repository;
Flexible User Interface Design;
Date Format Localization; and
Exposure of Windows Operation System Localization Features.

| Localization Approach Checklist | | | |
|---|---|---|---|
| Localization Feature | Supported via Architecture Service | Supported via Architecture API's | Best Practices and Assumptions* |
| Language Code (Locale Identifier) | ✓ | | |
| Time Zones | | | ✓ |
| Date/Time | | ✓ | ✓ |
| Name | | | ✓ |
| Telephone Numbers | | | ✓ |
| Functions to Avoid | | | ✓ |
| Weights and Measures | | | ✓ |
| Money | | | ✓ |
| Addresses/Address Hierarchies | | | ✓ |
| Menus, Icons, Labels/Identifiers on Windows | | | ✓ |
| Messages/Dialogs | ✓ | | |
| String Functions, Sort Order and String Comparison | ✓ | | |
| Code Tables | ✓ | | |
| Drop-Down Lists | ✓ | | |
| Form & Correspondence Templates | | | ✓ |
| Online and Printed Documentation | | | ✓ |
| Database (DB2) | | | ✓ |

-continued

| Localization Approach Checklist | | | |
|---|---|---|---|
| Localization Feature | Supported via Architecture Service | Supported via Architecture API's | Best Practices and Assumptions* |
| 3rd Party Controls | | | ✓ |
| Miscellaneous | | | ✓ |

Localizable Literals Repository

The CBAM application has an infrastructure to support multiple languages. The architecture acts as a centralized literals repository via its Codes Table Approach.

The Codes Tables have localization in mind. Each row in the codes table contains an associated language identifier. Via the language identifier, any given code can support values of any language.

Flexible Interface 400

Figure 4:
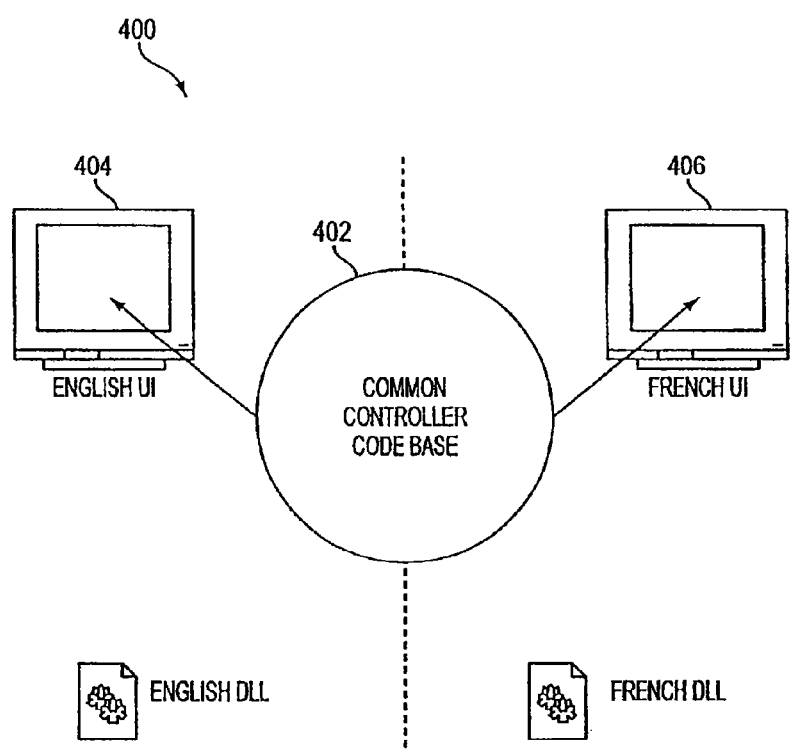
FIG. 4 is an illustration showing how different languages are repainted and recompiled.

Flexible user interface 400 and code makes customization easy. The FIG. 4 illustrates how different languages are repainted and recompiled. For example, both a English UI 404, and a French UI 406 are easily accommodated. This entails minimal effort because both UIs share the same core code base 402. Updates to the UIs are merely be a superficial change.

Generic graphics are used and overcrowding is avoided to create a user interface which is easy to localize.

Data Localization

Language localization settings affect the way dates are displayed on UI's (user interfaces). The default system display format is different for different Language/Countries. For Example:
   English (United States) displays "mm/dd/yy" (e.g., "05/16/1998")
   English (United Kingdom) displays "dd/mm/yy" (e.g., "16/05/98").

The present inventions UT's employ a number of third-party date controls including Sheridan Calendar Widgets (from Sheridan Software) which allow developers to set pre-defined input masks for dates (via the controls' Property Pages; the property in this case is "Mask").

Although the Mask property can be manipulated, the default setting is preferably accepted (the default setting for Mask is "0—System Default"; it is set at design time). Accepting the default system settings eliminates the need to code for multiple locales (with some possible exceptions), does not interfere with intrinsic Visual Basic functions such as DateAdd, and allows dates to be formatted as strings for use in SQL.

The test program illustrated below shows how a date using the English (United Kingdom) default system date format is reformatted to a user-defined format (in this case, a string constant for use with DB2 SQL statements):

```
Const cmDB2DateAndTime = "mm-dd-yyyy-h.mm.ss"
Private Sub cmdConvToDB2_Click( )
   Dim sDB2Date As String
   sDB2Date = Format$(SSDateCombo1.Date,
      cmDB2DateAndTime)
   txtDB2String.Text = sDB2Date
End Sub
```

Leverage Windows Operation System

The CBAM architecture exposes interface methods on the RegistryService object to access locale specific values which are set from the control panel.

The architecture exposes an API from the RegistryService object which allows access to all of the information available in the control panel. Shown below is the signature of the API:

GetRegionalInfo(Info As RegionalInfo) As String
      Where RegionalInfo can be any of the values in the table below:

| RegionalInfo Values | | | |
|---|---|---|---|
| CmLanguageId | CmDTDateSeparator | cmDayLongNameMonday | cmMonthLongNameJan |
| CmLanguageLocalized | CmDTTimeSeparator | cmDayLongNameTuesday | cmMonthLongNameFeb |
| CmLanguageEnglish | CmDTShortDateFormat | cmDayLongNameWednesday | cmMonthLongNameMar |
| CmLanguageAbbr | CmLDTongDateFormat | cmDayLongNameThursday | cmMonthLongNameApr |
| CmLanguageNative | CmDTTimeFormat | cmDayLongNameFriday | cmMonthLongNameMay |
| CmCountryId | CmDTDateFormatOrdering | cmDayLongNameSaturday | cmMonthLongNameJun |
| CmCountryLocalized | CmDTLongDateOrdering | cmDayLongNameSunday | cmMonthLongNameJul |
| CmCountryEnglish | CmDTTimeFormatSpecifier | cmDayAbbrNameMonday | cmMonthLongNameAug |
| CmCountryAbbr | CmDTCenturyFormatSpecifier | cmDayAbbrNameTuesday | cmMonthLongNameSep |
| CmCountryNative | CmDTTimeWithLeadingZeros | cmDayAbbrNameWednesday | cmMonthLongNameOct |
| CmLanguageDefaultId | CmDTDayWithLeadingZeros | cmDayAbbrNameThursday | cmMonthLongNameNov |
| CmCountryDefaultId | CmDTMonthWithLeadingZeros | cmDayAbbrNameFriday | cmMonthLongNameDec |
| | CmDTDesignatorAM | cmDayAbbrNameSaturday | cmMonthAbbrNameJan |
| | CmDTDesignatorPM | cmDayAbbrNameSunday | cmMonthAbbrNameFeb |
| | | | cmMonthAbbrNameMar |
| | | | cmMonthAbbrNameApr |
| | | | cmMonthAbbrNameMay |
| | | | cmMonthAbbrNameJun |
| | | | cmMonthAbbrNameJul |
| | | | cmMonthAbbrNameAug |
| | | | cmMonthAbbrNameSep |
| | | | cmMonthAbbrNameOct |
| | | | cmMonthAbbrNameNov |
| | | | cmMonthAbbrNameDec |

Get RegionalInfo Example:

```
Private Sub Command1_Click( )
    MsgBox "This is the language id for English: " & _
    GetRegionalInfo(cmLanguageId)
End Sub
```

Logical Unit of Work

The Logical Unit of Work (LUW) pattern enables separation of concern between UI Controllers 206 and business logic.

Overview

Normally, when a user opens a window, makes changes, and clicks OK or Save, a server component 222 is called to execute a transaction that will save the user's changes to the database. Because of this, it can be said that the window defines the boundary of the transaction, since the transaction is committed when the window closes.

The LUW pattern is useful when database transactions span windows. For example, a user begins editing data on one window and then, without saving, opens another window and begins editing data on that window, the save process involves multiple windows. Neither window controller 206 can manage the saving process, since data from both windows must be saved as an part of an indivisible unit of work. Instead, a LUW object is introduced to manage the saving process.

The LUW acts as a sort of "shopping bag". When a controller 206 modifies a business object 207, it puts it in the bag to be paid for (saved) later. It might give the bag to another controller 206 to finish the shopping (modify more objects), and then to a third controller who pays (asks the LUW to initiate the save).

Approach

Controllers 206 may have different levels of LUW "awareness":

Requires New: always creates a new LUW;
Requires: requires an LUW, and creates a new LUW only if one is not passed by the calling controller;
Requires Existing: requires an LUW, but does not create a new LUW if one is not passed by the calling controller. Raises an error if no LUW is passed; and
Not Supported: is not capable of using an LUW.

Controllers 206 that always require a new LUW create that LUW in their ArchInitClass function during initialization. They may choose whether or not to involve other windows in their LUW. If it is desirable for another window to be involved in an existing LUW, the controller 206 that owns the LUW passes a reference to that LUW when it calls the App Object 202 to open the second window. Controllers 206 that require an LUW or require an existing LUW accept the LUW as a parameter in the ArchInitClass function.

LUWs contain all the necessary logic to persist their "contents"—the modified BOs 207. They handle calling methods on the CCA 208 and updating the BOs 207 with new IDs and/or timestamps.

Architecture API Hierarchy

Following is an overview of the architecture object model, including a description of each method and the parameters it accepts. Additional sections address the concepts behind specific areas (code caching, message logging, and data access) in more detail.

Arch Object

Figure 5:
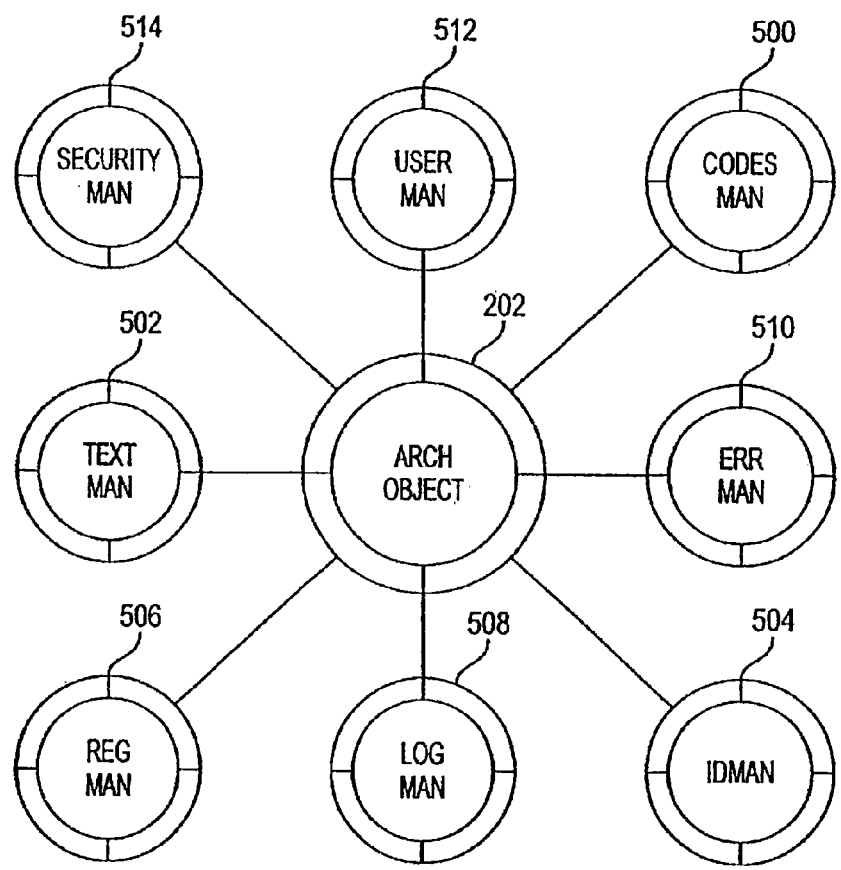
FIG. 5 is a block diagram of an Architecture Object.

FIG. 5 depicts the current properties on the Arch Object 200.

The following are APIs located on the Arch Object 200 which return either a retrieved or created instance of an object which implements the following interfaces:

CodesMan( ) 500;
TextMan( ) 502;
IdMan( ) 504;
RegMan( ) 506;
LogMan( ) 508;
ErrMan( ) 510;
UserMan( ) 512; and
SecurityMan( ) 514.

AsMsgStruct( )

This method on the Arch Object returns a variant structure to pass along a remote message.

```
Syntax:
    Public Function AsMsgStruct( ) As Variant
    End Function
Example:
    Dim vMsg As Variant
    vMsg = objArch.AsMsgStruct
```

CodesMan

The following are APIs located on the interface of the Arch Object 200 named CodesMan 500:

CheckCacheFreshness( );
FillControl(ctlControl, nCategory, nFillType, [nCodeStatus], [colAssignedCodes]);
FilterCodes(colAllCodes, nCodeStatus);
GetCategoryCodes(nCategory);
GetCodeObject(nCategory, sCode);
GetResourceString(lStringId);
GetServerDate( );
RefreshCache( )
RemoveValidDates(sCode, colPassedInAssignedCodes); and
SetServerDate(dtServerDate).
CheaCacheFreshness( )

Checks whether the cache has expired, if so refresh.

```
Syntax:
    Private Sub CheckCacheFreshness( )
    End Sub
Example:
    CheckCacheFreshness
```

FillControl( )

This API is used to fill listboxes or comboboxes with values from a list of CodeDecodes. Returns a collection for subsequent lookups to Code objects used to fill controls.

```
Syntax:
    Public Function FillControl(ctlControl As Object,
    nCategory As CodeDecodeCats, nFillType As CodeDecodeLengths,
    Optional nCodeStatus As CodeDecodeFilters = cmValidCodes,
    Optional colAssignedCodes As CCollection) As CCollection
    End Function
```

-continued

```
Parameters:
ctlControl:     A reference to a passed in listbox or combobox.
nCategory:      The integer based constant which classified these
CodeDecodes from others.    Several of the valid constants include:
        cmCatTaskType = 1
        cmCatSource
        cmCatTaskStatus
nFillType: The attribute of the CodeDecode which you want to fill.
Several of the valid values include:
        cmCode
        cmShortDecode
        cmLongDecode
nCodeStatus: Optional value which filters the Code Decodes according
to their Effective and Expiration dates.    Several of the valid
constants include:
        cmAllCodes      Pending + Valid + Expired Codes
        cmPendingCodes  Codes whose effective date is greater
                        than the current date
        cmValidCodes    Not Pending or Expired Codes
colAssignedCodes:   Used when filling a control which should fill
and include assigned values.
Example:
    `Declare an instance variable for States collection on object
    Private colStates As CCollection
    `Call FillControll API, and set local collection inst var to collection of
    codes which were used to fill the controll.   This collection will be
    used for subsequent lookups.
    Set colStates = objArch.CodesMan.FillControl
    (frmCurrentForm.cboStates, cmCatStates, cmLongDecode)
```

FilterCodes( )

Returns a collection of code/decodes that are filtered using their effective and expiration dates based on which nCodeStatus is passed from the fillcontrol method.

```
Syntax:
    Private Function FilterCodes(colAllCodes As CCollection,
    nCodeStatus As CodeDecodeFilters) As CCollection
    End Function
Parameters:
    colAllCodes:
    nCodeStatus:
Example:
    Set colFilteredCodes = FilterCodes(colCodes, nCodeStatus)
```

GetCategoryCodes( )

Returns a collection of CCode objects given a valid category

```
Syntax:
    Public Function GetCategoryCodes(nCategory As CodeDecodeCats)
    As CCollection
    End Function
Parameters:
    nCategory:  The integer based constant which classified these
    CodeDecodes from others.
Example:
    Dim colMyStates As CCollection
    Set colMyStates = objArch.CodesMan.GetCategoryCodes
    (cmCatStates)
    `Below shows an example of looking up the Code value for the
    currently selected state.
    With frmCurrentForm.cboStates
```

-continued

```
        If .ListIndex > −1 Then
        Dim objCode As CCode
            Set objCode =  colStates(.ItemData(.ListIndex))
            sStateCode = objCode.Code
        End If
        End With
```

GetCodeObject( )

Returns a valid CCode object given a specific category and code.

```
Syntax:
    Public Function GetCodeObject(nCategory As CodeDecodeCats,
    sCode As String) As CCode
    End Function
Parameters:
    nCategory:  The integer based constant which classified these
    CodeDecodes from others.
    `sCode:  A string indicating the Code attribute of the CodeDecode
    object.
Example:
    frmCurrentForm.lblState = objArch.CodesMan.GetCodeObject
    (cmCatStates, "IL").LongDecode
```

GetResourceString( )

Returns a string from the resource file given a specific string ID.

```
Syntax:
    Private Function GetResourceString(lStringId As Long) As String
    End Function
Parameters:
    lStringId:   The id associated with the string in the resource file.
Example:
    sMsg = arch.CodesMan.GetResourceString(CLng(vMessage))
```

GetServerDate( )

Returns the date from the server.

```
Syntax:
    Private Function GetServerDate( ) As Date
    End Function
Example:
    SetServerDate CCA.GetServerDate
```

Refresh Cache( )

Refreshes all of the code objects in the cache.

```
Syntax:
    Private Sub RefreshCache( )
    End Sub
Example:
    m_Cache.RefreshCache
```

RemoveValidCodes( )

Removes all valid codes from the passed in assigned codes collection, which is used to see which codes are assigned and not valid.

```
Syntax:
    Private Sub RemoveValidCodes(sCode As String,
    colPassedInAssignedCodes As CCollection)
    End Sub
Parameters:
    sCode:   Name of code
    colPassedInAssignedCodes:   Codes already in use.
Example:
    RemoveValidCodes codCode.Code, colPassedInAssignedCodes
```

SetServerDate( )

Sets the server date.

```
Syntax:
    Private Sub SetServerDate(dtServerDate As Date)
    End Sub
Parameters:
    dtServerDate:   Date of Server.
Example:
    SetServerDate CCA.GetServerDate
```

TextMan

The following are APIs located on the interface of the Arch Object 200 named TextMan 502.

PairUpAposts( );

PairUpAmps( ); and

MergeParms( ).

PairUpAposts( )

Pairs up apostrophes in the passed string.

```
Syntax:
    Public Function PairUpAposts(sOriginalString As String) As String
    End Function
Parameters:
    sOriginalString: string passed in by the caller
Example:
    Dim sString As String
    sString = objArch.TextMan.PairUpAposts("This is Monika's string")
    `expected return: sString = "This is Monika''s string"
```

PairUpAmps( )

Pairs up ampersands in the passed string.

```
Syntax:
    Public Function PairUpAmps(sOriginalString As String) As String
    End Function
Parameters:
    sOriginalString: string passed in by the caller
Example:
    Dim sString As String
    sString = objArch.TextMan.PairUpAmps("Forms&Corr")
    `expected return: sString = "Forms&&Corr"
```

MergeParms( )

Merges string with the passed parameters collection.

```
Syntax:
    Public Function MergeParms(sString As String, colParms
    As CCollection) As String
    End Function
Parameters:
    sOriginalString: string passed in by the caller
    colParms As Ccollection: collection of the parameters passed in
    by the caller
Example:
    Dim sString As String
    sString = objArch.TextMan.MergeParms(sString, colParms)
```

IdMan

The following are APIs located on the interface of the Arch Object 200 named IdMan 504:

GetGUID( );

GetSequenceID( );

GetTimeStamp( );

GetTrackingNbr( ); and

GetUniqueId( ).

GetGUID( )

```
Syntax:
    Public Function GetGUID( )
    End Function
Example:
    Dim vNewGuid As Variant
    vNewGuid = objArch.IdMan.GetGUID
```

GetSequenceId( )

```
Syntax:
    Public Function GetSequenceId(sTemplateType As CounterName)
    As String
    End Function
Parameters:
    sTemplateType:The string specifying the template requesting a
    sequence id
            (i.e. cmCountFC = Forms & Corr)
Example:
    frmCurrentForm.txtTemplateNumber =
    objArch.IdMan.GetSequenceId(cmCountFC)
```

GetTimeStamp( )

```
Syntax:
    Public Function GetTimeStamp( )
    End Function
Example:
    Dim nNewTimeStamp As Long
    nNewTimeStamp = objArch.IdMan.GetTimeStamp
```

GetTrackingNbr( )

```
Syntax:
    Public Function GetTrackingNbr( )
    End Function
Example:
    Set objTechArch = New CTechArch
    sUniqueTrackNum = objTechArch.IdMan.GetTrackingNbr
```

GetUniqueId( )

```
Syntax:
    Public Function GetUniqueId( )
    End Function
Example:
    Dim vUid As Variant
    vNewUid = objArch.IdMan.GetUniqueId
```

RegMan

The following are APIs located on the interface of the Arch Object 200 named RegMan 506:
GetCacheLife( );
GetClientDSN( );
GetComputerName( );
GetDefaultAndValidate( )
GetFCArchiveDirectory( )
GetFCDistributionDirectory( )
GetFCMasterDirectory( );
GetFCUserDirectory( );
GetFCWorkingDirectory( );
GetHelpPath( );
GetLocalInfo( );
GetLogLevel( );
GetRegionalInfo( );
GetRegValue( );
GetServerDSN( );
GetSetting( );
GetTimerLogLevel( );
GetTimerLogPath( ); and
GetUseLocalCodes( ).
GetCacheLife( )

```
Syntax:
    Public Function GetCacheLife( ) As String
    End Function
Example:
    Dim s As String
    s = objArch.RegMan.GetCacheLife
```

GetClientDSN( )

```
Syntax:
    Public Function GetClientDSN( ) As String
    End Function
Example:
    Dim s As String
    s = objArch.RegMan.GetClientDSN
```

GetComputerName( )

```
Syntax:
    Public Function GetComputerName( ) As String
    End Function
Example:
    Dim s As String
    s = objArch.RegMan.GetComputerName
```

GetDefaultAndValidate( )

```
Syntax:
    Private Function GetDefaultAndValidate(sKey As String) As String
    End Function
Parameters:
    sKey: The key within the registry of which the user is requesting
    (i.e.: Help Path)
Example:
    Dim sDefault As String
    sDefault = objArch.RegMan.GetDefaultAndValidate(sKey)
```

GetFCArchiveDirectory( )

```
Syntax:
    Public Function GetFCArchiveDirectory( ) As String
    End Function
Example:
    Dim s As String
    s = objArch.RegMan.GetFCArchiveDirectory
```

GetFCDistributionDirectory( )

```
Syntax:
    Public Function GetFCDistributionDirectory( ) As String
    End Function
Example:
    Dim s As String
    s = objArch.RegMan.GetFCDistributionDirectory
```

GetFCMasterDirectory( )

```
Syntax:
    Public Function GetFCMasterDirectory( ) As String
    End Function
Example:
    Dim s As String
    s =objArch.RegMan.GetFCMasterDirectory
```

GetFCUserDirectory( )

```
Syntax:
    Public Function GetFCUserDirectory( ) As String
    End Function
Example:
    Dim s As String
    s = objArch.RegMan.GetFCUserDirectory
```

GetFCWorkingDirectory( )

```
Syntax:
    Public Function GetFCWorkingDirectory( ) As String
    End Function
Example:
    Dim s As String
    s = objArch.RegMan.GetFCWorkingDirectory
```

GetHelpPath( )

```
Syntax:
    Public Function GetHelpPath( ) As String
    End Function
Example:
    Dim s As String
    s = objArch.RegMan.GetHelpPath
```

GetLocalInfo( )

```
Syntax:
    Public Function GetLocalInfo( ) As String
    End Function
Example:
    Dim s As String
    s = objArch.RegMan.GetLocalInfo
```

GetLogLevel( )

```
Syntax:
    Public Function GetLogLevel( ) As String
    End Function
Example:
    Dim s As String
    s = objArch.RegMan.GetLogLevel
```

GetRegionalInfo( )

Allows access to all locale specific values which are set from control panel.

```
Syntax:
    Public Function GetRegionalInfo(Info As RegionalInfo) As String
    End Function
Parameters:
    Info: string containing the regional information. Several of the valid
    constants include:
        cmLanguageId = &H1            ' language id
        cmLanguageLocalized = &H2     ' localized name of language
        cmLanguageEnglish = &H1001    ' English name of language
        cmLanguageAbbr = &H3          ' abbreviated language name
        cmLanguageNative = &H4        ' native name of language
Example:
    Dim s As String
    s = objArch.RegMan.GetRegionalInfo
```

GetRegValue( )

```
Syntax:
    Public Function GetRegValue( ) As String
    End Function
Example:
    Dim s As String
    s = objArch.RegMan.GetRegValue
```

GetServerDSN( )

```
Syntax:
    Public Function GetServerDSN( ) As String
    End Function
Example:
    Dim s As String
    s = objArch.RegMan.GetServerDSN
```

GetSetting( )

Get setting from the registry.

```
Syntax:
    Public Function GetSetting(sKey As String) As String
    End Function
Parameters:
    sKey:   The key within the registry of which the user is requesting
            (i.e.: Help Path)
Parameters:
    GetHelpPath = GetSetting(cmRegHelpPathKey)
```

GetTimerLogLevel( )

```
Syntax:
    Public Function GetTimerLogLevel( ) As String
    End Function
Example:
    Dim s As String
    s = objArch.RegMan.GetTimerLogLevel
```

GetTimerLogPath( )

```
Syntax:
    Public Function GetTimerLogPath( ) As String
    End Function
Example:
    Dim s As String
    s = objArch.RegMan.GetTimerLogPath
```

GetUseLocalCodes( )

```
Syntax:
    Public Function GetUseLocalCodes( ) As String
    End Function
Example:
    Dim s As String
    s = objArch.RegMan.GetUseLocalCodes
```

LPSTRToVBString( )

Extracts a VB string from a buffer containing a null terminated string.

```
Syntax:
    Private Function LPSTRToVBString$(ByVal s$)
    End Function
```

LogMan

The following are APIs located on the interface of the Arch Object 200 named LogMan 508:
LogMessage( );
WriteToDatabase( ); and
WriteToLocalLog( ).
LogMessage( )

Used to log the message. This function will determine where the message should be logged, if at all, based on its severity and the vMsg's log level.

```
Syntax:
    Public Sub LogMessage(vMsg As Variant, _
                lSeverity As Long, _
                sClassName As String, _
                sMethodName As String, _
                sVersion As String, _
                lErrorNum As Long, _
                Optional sText As String = vbNullString)
    End Sub
Parameters:
    vMsg: the standard architecture message
    lSeverity: the severity of the message
    sClassName: the name of the class logging the message
    sMethodName: the name of the method logging the message
    sVersion: the version of the binary file (EXE or DLL) that contains
    the method logging message
    lErrorNum: the number of the current error
    sText: an optional parameter containing the text of the message.
    If omitted, the text will be looked up in a string file or the generic
    VB error
    description will be used
Example:
    If Err.Number <> 0 Then
        ` log message
        Arch.LogMan.LogMessage(vMsg, cmSeverityFatal,
    "COrganizationCTLR", "InitForm",
                    GetVersion( ), Err.Number, Err.Description)
        ` re-raise the error
        Err-Raise Err.Number
    End If
```

WriteToDatabase( )

Used to log the message to the database on the server using the CLoggingComp. This function returns the TrackingId that is generated by the CLoggingObject.

```
Syntax:
    Private Sub WriteToDatabase(vMsg As Variant, msgToLog
    As CMessage)
    End Sub
Parameters:
    vMsg: the standard architecture message
    msgToLog: a parameter containing the text of the message.
Example:
    If msgToLog.IsLoggableAtLevel(m_lLocalLogLevel) Then
        WriteToDatabase vMsg, msgToLog
    End If
```

WriteToLocalLog( )

Used to log the message to either a flat file, in the case of Windows 95, or the NT Event Log, in the case of Windows NT.

```
Syntax:
    Private Sub WriteToLocalLog(msgToLog As CMessage)
    End Sub
Parameters:
    msgToLog: a parameter containing the text of the message.
Example:
    ErrorHandler:
        WriteToLocalLog msgToLog
    End Sub
```

ErrMan

The following are APIs located on the interface of the Arch Object 200 named ErrMan 510:
HandleError( );
RaiseOriginal( );
ResetError( ); and
Update( ).
HandleError( )

This method is passed through to the general error handler in MArch.bas

```
Syntax:
    Public Function HandleError(vMsg As Variant, nCompType As
    CompType, sClassName
    As String, sMethodName As String) As ErrResumeCodes
    End Sub
Parameters:
    vMsg:           General Architecture Information
    nCompType:      Contains tier information (Client or Server)
    sClassName:             Class which raised the error.
    sMethodName:            Method which raised the error.
```

RaiseOriginal( )

This method is used to Reset the error object and raise.

```
Syntax:
    Public Sub RaiseOriginal( )
    End Sub
Example:
    objArch.ErrMan.RaiseOriginal
```

ResetError( )

This method is used to reset attributes.

```
Syntax:
    Public Sub ResetError( )
    End Sub
Example:
    objArch.ErrMan.ResetError
```

Update( )

This method is used to update attributes to the values of VBs global Error object.

```
Syntax:
    Public Sub Update( )
    End Sub
Example:
    objArch.ErrMan.Update
```

UserMan

The following are APIs located on the interface of the Arch Object 200 named UserMan 512.
UserId;
EmployeeId;
EmployeeName;
EmployeeFirstName;
EmployeeLastName;
EmployeeMiddleInitial;
GetAuthorizedEmployees;

IsSuperOf( );
IsRelativeOf( ); and
IsInRole( ).
UserId( )

```
Syntax:
    Public Property Get UserId( ) As String
    End Property
Example:
    Dim sNewUserId As String
    sNewUserId = objArch.UserMan.userId
```

EmployeeId( )

```
Syntax:
    Public Property Get EmployeeId( ) As String
    End Property
Example:
    Dim sNewEmployeeId As String
    sNewEmployeeId = objArch.UserMan.EmployeeId
```

EmployeeName( )

```
Syntax:
    Public Property Get EmployeeName( ) As String
    End Property
Example:
    Dim sName As String
    sName = objArch.UserMan.EmployeeName
```

EmployeeFirstName( )

```
Syntax:
    Public Property Get EmployeeFirstName( ) As String
    End Property
Example:
    Dim sFName As String
    sFName = objArch.UserMan.EmployeeFirstName
```

EmployeeLastName( )

```
Syntax:
    Public Property Get EmployeeLastName( ) As String
    End Property
Example:
    Dim sLName As String
    sLName = objArch.UserMan.EmployeeLastName
```

EmployeeMiddleInitial( )

```
Syntax:
    Public Property Get EmployeeMiddleInitial( ) As String
    End Property
Example:
    Dim sMI As String
    sMI = objArch.UserMan.EmployeeMiddleInitial
```

GetAuthorizedEmployees( )

Creates a collection of user's supervisees from the dictionary and returns GetAuthorizedEmployees—collection of authorized employees

```
Syntax:
    Public Function GetAuthorizedEmployees( ) As CCollection
    End Function
Example:
    Dim colAuth As Collection
    colAuth = objArch.UserMan.GetAuthorizedEmployees
```

IsSuperOf( )

Checks if the current user is supervisor of the passed in user.

```
Syntax:
    Public Function IsSuperOf(sEmpId As String) As Boolean
    End Function
Parameters:
    sEmpId: string containing Employee ID number
Example:
    Dim bIsSuperOfMonika As Boolean
    bIsSuperOfMonika = objArch.UserMan.IsSuperOf("TS012345")
```

IsRelativeOf( )

Checks if the passed in user is relative of the current user.

```
Syntax:
    Public Function IsRelativeOf(sEmpId As String) As Boolean
    End Function
Parameters:
    sEmpId: string containing Employee ID number
Example:
    Dim bIsRelativeOfMonika As Boolean
    bIsRelativeOfMonika = objArch.UserMan.IsRelativeOf("TS012345")
```

IsInRole( )

Checks to see if the current user is in a certain role.

```
Syntax:
    Public Function IsInRole(sRole As String) As Boolean
    End Function
Parameters:
    sRole: string containing role
Example:
    Dim bIsInRoleTaskLibrarian As Boolean
    bIsInRoleTaskLibrarian = objArch.UserMan.IsInRole("TA")
```

SecurityMan

The following APIs are located on the interface of the Arch Object 200 named SecurityMan 514.
EvalClaimRules;
EvalFileNoteRules;
EvalFormsCorrRules;
EvalOrgRules;
EvalRunApplicationRules;
EvalRunEventProcRules;
EvalTaskTemplateRules;
EvalUserProfilesRules;
IsOperAuthorized;
GetUserId; and
OverrideUser.
EvalClaimRules( )

This API references business rules for Claim security checking and returns a boolean if rules are met.

Syntax:
    Private Function EvalClaimRules(lBasicOp As cmBasicOperations, vContextData As
    Variant) As Boolean
    End Function
Parameters:
    lBasicOp:    a basic operation the current user is wishing to perform (i.e.
    Delete)
    vContextData:    a variant array holding relevant business objects or other
    information.
Example:
    Select Case lOperation
    Case cmWorkOnClaim
        IsOperAuthorized =    EvalClaimRules(cmView, vContextData) And _
                              EvalClaimRules(cmEdit, vContextData)

EvalFileNoteRules( )

This API references business rules for FileNote security checking and returns a boolean if rules are met.

Syntax:
    Private Function EvalFileNoteRules(lBasicOp As cmBasicOperations,
    vContextData As Variant) As Boolean
    End Function
Parameters:
    lBasicOp:    a basic operation the current user is wishing to
    perform (i.e. Delete)
    vContextData:    a variant array holding relevant business objects or
    other information.
Example:
    Select Case lOperation
    Case cmDeleteFileNote
        IsOperAuthorized = EvalFileNoteRules(cmDelete,
            vContextData)

EvalFormsCorrRules( )

This API references business rules for Forms and Corr security checking and returns a boolean if rules are met.

Syntax:
    Private Function EvalFormsCorrRules(lBasicOp As
    cmBasicOperations) As Boolean
    End Function
Parameters:
    lBasicOp:    a basic operation the current user is wishing to perform
    (i.e. Delete)
Example:
    Select Case lOperation
    Case cmMaintainFormsCorr
        IsOperAuthorized =    EvalFormsCorrRules(cmEdit) And _
                              EvalFormsCorrRules(cmDelete) And _
                              EvalFormsCorrRules(cmAdd)

EvalOrgRules( )

This API references business rules for Event Processor security checking and returns a boolean if rules are met.

Syntax:
    Private Function EvalOrgRules(lBasicOp As cmBasicOperations)
    As Boolean
    End Function
Parameters:
    lBasicOp:    a basic operation the current user is wishing to perform
    (i.e. Delete)

-continued

Example:
    Select Case lOperation
    Case cmMaintainOrg
        IsOperAuthorized =    EvalOrgRules(cmAdd) And _
                              EvalOrgRules(cmEdit) And _
                              EvalOrgRules(cmDelete)

EvalRunApplicationRules( )

This API references business rules for running the application and returns a boolean if rules are met.

Syntax:
    Private Function EvalRunApplicationRules(lBasicOp As
    cmBasicOperations) As Boolean
    End Function
Parameters:
    lBasicOp:    a basic operation the current user is wishing to perform
    (i.e. Delete)
Example:
    Select Case lOperation
    Case cmRunApplication
        IsOperAuthorized = EvalRunApplicationRules(cmExecute)

EvalRunEventProcRules( )

This API references business rules for Event Processor security checking and returns a boolean if rules are met.

Syntax:
    Private Function EvalRunEventProcRules(lBasicOp As
    cmBasicOperations) As Boolean
    End Function
Parameters:
    lBasicOp:    a basic operation the current user is wishing to perform
    (i.e. Delete)
Example:
    Select Case lOperation
    Case cmRunEventProcessor
        IsOperAuthorized = EvalRunEventProcRules(cmExecute)

EvalTaskTemplateRules( )

This API references business rules for Task Template security checking and returns a boolean if rules are met.

Syntax:
    Private Function EvalTaskTemplateRules(lBasicOp As
    cmBasicOperations) As Boolean
    End Function -continued Parameters:
    lBasicOp:   a basic operation the current user is wishing to perform
    (i.e. Delete)
Example:
    Select Case lOperation
    Case cmMaintainTaskLibrary
        IsOperAuthorized =   EvalTaskTemplateRules(cmAdd) And _
                                EvalTaskTemplateRules(cmEdit) And _
                                EvalTaskTemplateRules(cmDelete)

EvalUserProfileRules( )

This API references business rules for Task Template security checking and returns a boolean if rules are met.

Syntax:
    Private Function EvalUserProfileRules(lBasicOp As
    cmBasicOperations, vContextData As Variant) As Boolean
    End Function
Parameters:
    lBasicOp:   a basic operation the current user is wishing to perform
    (i.e. Delete)
    vContextData:   a variant array holding relevant business objects or
    other information.
Example:
    Select Case lOperation
    Case cmIsRelativeOf
        IsOperAuthorized =   EvalUserProfileRules(cmView,
                                vContextData) And_
                                EvalUserProfileRules(cmAdd,
                                vContextData) And_
                                EvalUserProfileRules(cmEdit,
                                vContextData) And
                                EvalUserProfileRules(cmDelete,
                                vContextData)

GetUserId( )

Returns the login name/user id of the current user.

Syntax:
    Public Function GetUserId( ) As String
    End Function
Example:
    Dim sUserId as String
    sUserId = GetUserId IsOperAuthorized( )

This API references business rules and returns a boolean determining whether the user has security privileges to perform a certain operation.

Syntax:
    Public Function IsOperAuthorized(vMsg, as variant, nOperation
    as cmOperations, vContext As   Variant) As Boolean
    End Function
Parameters:
    vMsg: the standard architecture message
    nOperation:   an enumeration containing name of operation to be
    checked.
    vContext:   a variant array holding relevant business objects or other
    information.
Example:
    Dim bCanIDoThis As Boolean
    bCanIDoThis = objArch.SecurityMan.IsOperAuthorized(vMsg,
    aOperationName, vContext)
    TlbEditIcon.Enabled = bCanIDoThis OverrideUser( )

Re-initializes for a different user.

Syntax:
    Public Sub OverrideUser(Optional sUserId As String,Optional
    dictRoles As CDictionary, Optional dictSubs As CDictionary)
    End Function
Parameters:
    sUserId:
    dictRoles:
    dictSubs:
Example:
    Dim x As New CTechArch
        x.SecurityMan.OverrideUser "Everyone", New CDictionary,
        New CDictionary Codes Framework General Requirements Separate tables (CodesDecodes) are Created for storing the static values.

Only the references to codes/decodes are stored in business tables (e.g., Task) which utilize these values. This minimizes the size of the business tables, since storing a Code value takes much less storage space than its corresponding Decode value (e.g., For State, "AL" is stored in each table row instead of the string "Alabama").

CodeDecodes are stored locally on the client workstation in a local DBMS. On Application startup, a procedure to ensure the local tables are in sync with the central DBMS is performed.

Infrastructure Approach

Figure 6:
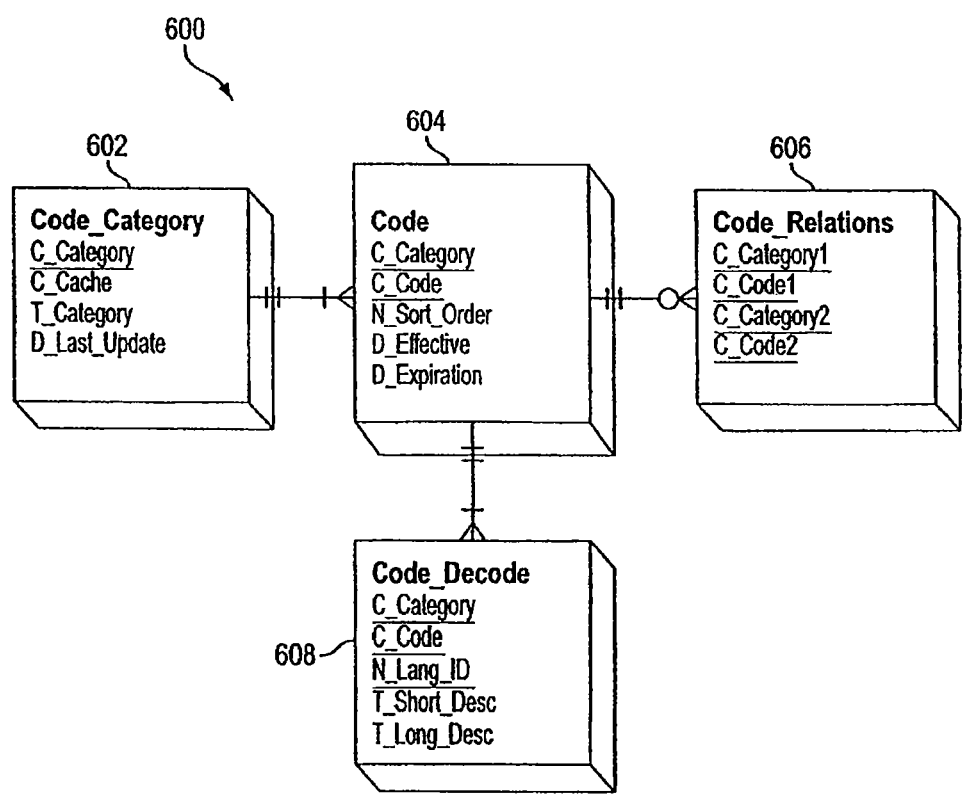
FIG. 6 is an illustration showing the physical layout of CodeDecode tables according to one embodiment of the present invention.

The present invention's Code Decode Infrastructure 600 Approach outlines the method of physically modeling codes tables. The model allows codes to be extended with no impact to the physical data model and/or application and architecture. FIG. 6 shows the physical layout of CodeDecode tables according to one embodiment of the present invention.

Infrastructure

The physical model of the CodeDecode infrastructure 600 does the following:

Supports relational functionality between CodeDecode objects;

Supports extensibility without modification to the DBMS or Application Architecture;

Provides a consistent approach for accessing all CodeDecode elements; and

Is easily maintainable.

These generic tables are able to handle new categories, and modification of relationships without a need to change the DBMS or CodeDecode Application Architecture.

Benefits of this model are extensibility and maintainability. This model allows for the modifications of code categories without any impact to the DBMS or the Application Architecture code. This model also requires fewer tables to maintain. In addition, only one method is necessary to access CodeDecodes.

Table Relationships and Field Descriptions:
  (pk) indicates a Primary Key
Code_Category 602
  C_Category (pk): The category number for a group
  C_Cache (currently not utilized): Can indicate whether the category should be cached in memory on the client machine
  T_Category: A text description of the category (e.g., Application Task Types, Claim Status, Days of Week)
  D_Last_Update: The date any data within the given category was last updated; this field is used in determining whether to update a category or categories on the local data base
  Relationships
  A one-to-many relationship with the table Code (i.e., one category can have multiple codes)
Code 604
  C_Category (pk): The category number for a group of codes
  C_Code (pk): A brief code identifier (up to ten characters; the current maximum length being used is five characters)
  D_Effective: A date field indicating the code's effective date
  D_Expiration: A date field indicating the code's expiration date (the default is Jan. 1, 2999)
  Relationships
  A many-to-one relationship with Code_Category 602 (described above)
  A one-to-many relationship with Code_Relations 606 (a given category-and-code combination can be related to multiple other category-and-code combinations)
Code_Relations 606
  C_Category1 (pk): The first category
  C_Code1 (pk): The first code
  C_Category2 (pk): The related category
  C_Code2 (pk): The related code
  Relationships
  A many-to-one relationship with the Code table (each category and code in the Code table can have multiple related category-code combinations)
Code_Decode 608
  C_Category (pk): The category number for a group of codes
  C_Code (pk): A brief code identifier (up to ten characters; the current maximum length being used is five characters)
  N_Lang_ID (pk): A value indicating the local language setting (as defined in a given machine's Regional Settings). For example, the value for English (United States) is stored as 0409. Use of this setting allows for the storage and selection of text code descriptions based on the language chosen
  T_Short_Desc: An abbreviated textual description of C_Code
  T_Long_Desc: A full-length textual description of C_Code—what the user will actually see (e.g., Close Supplement—Recovery, File Note, Workers Compensation)

Localization Support Approach

Enabling Localization
  Codes have support for multiple languages. The key to this feature is storing a language identifier along with each CodeDecode value. This Language field makes up a part of the compound key of the Code_Decode table. Each Code API lookup includes a system level call to retrieve the Language system variable. This value is used as part of the call to retrieve the values given the correct language.

Maintaining Language Localization Setting
  A link to the Language system environment variable to the language keys is stored on each CodeDecode. This value is modified at any time by the user simply by editing the regional settings User Interface available in the Microsoft Windows Control Panel folder.

Codes Expiration Approach

Handling Time Sensitive Codes becomes an issue when filling controls with a list of values. One objective is to only allow the user to view and select appropriate entries. The challenge lies in being able to expire Codes without adversely affecting the application. To achieve this, consideration is given to how each UI will decide which values are appropriate to show to the user given its current mode.
  The three most common UI modes that affect time sensitive codes are Add Mode, View Mode, and Edit Mode.

Add Mode
  In Add Mode, typically only valid codes are displayed to the user as selection options. Note that the constant, cmValidCodes, is the default and will still work the same even when this optional parameter is omitted.

```
Set colStates = objArch.CodesMan.FillControl(frmCurrentForm.cboStates,
cmCatStates,
    cmLongDecode, cmValidCodes)
```

View Mode
  In View Mode, the user is typically viewing results of historical data without direct ability to edit. Editing selected historical data launches another UI. Given this the controls are filled with valid and expired codes, or in other words, non-pending codes.

```
Set colStates = objArch.CodesMan.FillControl(frmCurrentForm.cboStates,
cmCatStates,
    cmLongDecode, cmNonPendingCodes)
```

Edit Mode
  In Edit Mode, changes are allowed to valid codes but also expired codes are displayed if already assigned to the entity.

```
Dim colAssignedCodes As New cCollection
colAssignedCodes.Add HistoricalAddress.State
Set colStates = objArch.CodesMan.FillControl(frmCurrentForm.cboStates,
cmCatStates,
    cmLongDecode, cmValidCodes, colAssignedCodes)
```

Updating Local CodeDecodes

Figure 7:
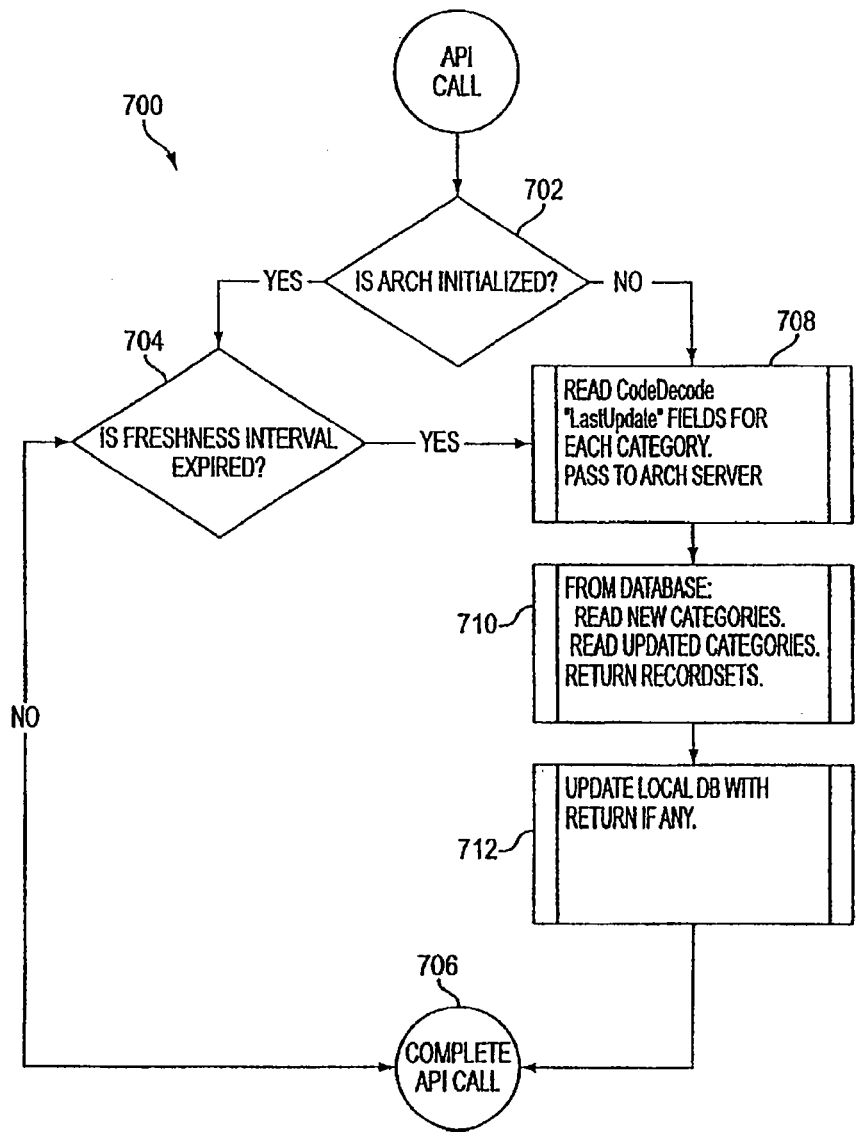
FIG. 7 is a logic diagram according to one embodiment of the present invention.

The Local CodeDecode tables are kept in sync with central storage of CodeDecodes. The architecture is responsible for making a check to see if there are any new or updated code decodes from the server on a regular basis. The architecture also, upon detection of new or modified CodeDecode categories, returns the associated data, and performs an update to the local database. FIG. 7 is a logic diagram for this process 700.

After an API call, a check is made to determine if the Arch is initialized 702. If it is a check is made to determine if the Freshness Interval has expired 704. If the Freshness Interval has not expired, the API call is complete 706. However, if either the Arch is not initialized or the Freshness Interval has expired, then the "LastUpdate" fields for each category are read from the CodeDecode and passed to the server 708. Then new and updated categories are read from the database 710. Finally the Local database is updated 712.

Code Access APIs

The following are APIs located on the interface of the Arch Object 200 named CodesMan 500.
GetCodeObject(nCategory, sCode);
GetCategoryCodes(nCategory);
FillControl(ctlControl, nCategory, nFillType, [nCodeStatus], [colAssignedCodes]).

GetCodeObject: Returns a valid CCode object given a specific category and code.

```
Syntax:
    GetCodeObject(nCategory, sCode)
Parameters:
    nCategory:  The integer based constant which classified these
                CodeDecodes from others.
    sCode:      A string indicating the Code attribute of the
                CodeDecode object.
Example:
    frmCurrentForm.lblState = objArch.CodesMan.GetCodeObject
(cmCatStates, "IL").LongDecode
```

GetCategoryCodes: Returns a collection of CCode objects given a valid category

```
Syntax:
    GetCategoryCodes(nCategory)
Parameters:
    nCategory:  The integer based constant which classified these
                CodeDecodes from others.
Example:
    Dim colMyStates As CCollection
    Set colMyStates = objArch.CodesMan.GetCategory(cmCatStates)
```

FillControl: This API is used to fill listboxes or comboboxes with values from a list of CodeDecodes. Returns a collection for subsequent lookups to Code objects used to fill controls.

```
Syntax:
    FillControl(ctlControl, nCategory, nFillType, [nCodeStatus],
        [colAssignedCodes])
Parameters:
    ctlControl:  A reference to a passed in listbox or combobox.
    nCategory:   The integer based constant which classified these
                 CodeDecodes from others.
    nFillType:   The attribute of the CodeDecode which you want to fill.
    Valid values include:
        cmCode
        cmShortDecode
        cmLongDecode
    nCodeStatus: Optional value which filters the Code Decodes
        according to their Effective and Expiration dates. Valid
        constants include the following:
        cmAllCodes          Pending + Valid + Expired Codes
        cmPendingCodes      Codes whose effective date is greater
                            than the current date
```

-continued

```
        cmValidCodes        Not Pending or Expired Codes
        cmExpiredCodes      Codes whose expired date is greater
                            than the current date
        cmNonPendingCodes   Valid + Expired Codes
        cmNonValidCodes     Pending + Expired Codes
        cmNonExpiredCodes   Pending + Valid Codes
    colAssignedCodes: Used when filling a control which should fill and
        include assigned values.
Example:
    'Declare an instance variable for States collection on object
    Private colStates As CCollection
    'Call FillControl API, and set local collection inst var to collection
    of codes which were used to fill the control. This collection will
    be used for subsequent lookups.
    Set colStates =
    objArch.CodesMan.FillControl(frmCurrentForm.cboStates,
    cmCatStates, cmLongDecode)
    'Below shows an example of looking up the Code value for the
    currently selected state.
    With frmCurrentForm.cboStates
        If   .ListIndex > -1 Then
            Dim objCode As CCode
            Set objCode =  colStates(.ItemData(.ListIndex))
            sStateCode = objCode.Code
        End If
    End With
```

Relational Codes Access APIs

Code objects returned via the "GetCodeObject" or "GetCategoryCodes" APIs can have relations to other code objects. This allows for functionality in which codes are associated to other individual code objects.

The APIs used to retrieve these values are similar to those on the CodesMan interface. The difference, however is that the methods are called on the Codes object rather that the CodesManager interface: Listed below again are the APIs.
GetCodeObject(nCategory, sCode);
GetCategoryCodes(nCategory);
FillControl(ctlControl, nCategory, nFillType, [nCodeStatus], [colAssignedCodes]).

Given below is some sample code to illustrate how these APIs are also called on Code objects.
GetCodeObject Example:

```
Dim objBondCode As CCode
Set objBondCode = objArch.CodesMan.GetCodeObject(cmCatLOB, "B")
Dim objSuretyCode As CCode
Set objSuretyCode = objBondCode.GetCodeObject(cmCatSupplement,
"B01")
```

GetCategory Example:

```
Dim objBondCode As CCode
Set objBondCode = objArch.CodesMan.GetCodeObject(cmCatLOB, "B")
Dim colSupplements As CCollection
Set colSupplements = objBondCode.GetCategory(cmCatSupplement)
```

FillControl Example:

```
Dim objBondCode As CCode
Set objBondCode =
objArch.CodesMan.GetCodeObject(cmCatLOB, "B")
Dim colSupplements As CCollection
```

```
        Set colSupplements =
          objBondCode.FillControl(frmForm.cboSupplements,
        cmCatSupplements,
          cmLongDecode)
```

Message Logging

The message logging architecture allows message logging in a safe and consistent manner. The interface to the message logging component is simple and consistent, allowing message logging on any processing tier. Both error and informational messages are logged to a centralized repository.

Abstracting the message logging approach allows the implementation to change without breaking existing code.

Best Practices

Messages are always logged by the architecture when an unrecoverable error occurs (i.e., the network goes down) and it is not explicitly handled. Message logging may be used on an as-needed basis to facilitate the diagnosis and fixing of SIRs. This sort of logging is especially useful at points of integration between classes and components. Messages logged for the purpose of debugging have a severity of Informational, so as not to be confused with legitimate error messages.

Usage

A message is logged by calling the LogMessage( ) function on the architecture.
Description of Parameters:
vMsg: the standard architecture message
lSeverity: the severity of the message
sClassName: the name of the class logging the message
sMethodName: the name of the method logging the message
sVersion: the version of the binary file (EXE or DLL) that contains the method logging the message
lErrorNum: the number of the current error
sText: an optional parameter containing the text of the message. If omitted, the text will be looked up in a string file or the generic VB error description will be used.
sText: an optional parameter containing the text of the message. If omitted, the text will be looked up in a string file or the generic VB error description will be used.
lLoggingOptions: an optional parameter containing a constant specifying where to log the message (i.e., passing cmLogToDBAndEventViewer to LogMessage will log the error to the database and the event viewer.)
Logging Levels
Before a message is logged, its severity is compared to the log level of the current machine. If the severity of the message is less than or equal to the log level, then the message is logged.
Valid values for the log level are defined as an enumeration in VB. They include:

| Value | Name | Description | Example |
|---|---|---|---|
| 0 | CmFatal | A critical condition that closes or threatens the entire system | Application Server crash |
| 1 | CmSevere | A condition that closes or threatens a major component of the entire system | Network failure |
| 2 | CmWarning | A warning that something in the system is wrong but it does not close or threaten to close the system | Optimistic locking error |
| 3 | CmInformational | Notification of a particular occurrence for logging and audit purposes | Developer debugging information |

Example

```
If Err.Number <> 0 Then
    ' log message
    Arch.LogMan.LogMessage(vMsg, cmSeverityFatal,
      "COrganizationCTLR",
"InitForm",
        GetVersion( ), Err.Number, Err.Description)
    ' re-raise the error
    Err.Raise Err.Number
End If
```

Database Log

The database log table is composed of the following fields:

| Field Name | Description |
|---|---|
| N_MSG_ID | Unique ID of the message |
| D_MSG | Date the message occurred |
| C_ERR_SEV | Severity of the error |
| N_USER_ID | Name of user when error occurred |
| N_MACH_ID | Name of the machine that the error occurred on |
| M_CLASS | Name of the class that the error occurred in |
| M_METHOD | Name of the method that the error occurred in |
| N_CMPNT_VER | Version of the binary file that the error occurred in |
| C_ERR | Number of the error |
| T_MSG | Text of the message |

Local Log

Messages are always logged to the application server's Event Log; however this is not necessarily true for the database as noted by the optional parameter passed to LogMessage, lLoggingOptions. An administrator with the appropriate access rights can connect to the MTS application server remotely and view its Event Log. Only one MTS package contains the Event Log Component, so that errors will all be written to the same application server Event Log.

Events logged via Visual Basic always have "VBRuntime" as the source. The Computer field is automatically populated with the name of the computer that is logging the event (i.e., the MTS application server) rather than the computer that generated the event (typically a client computer).

The same event details that are written to the database are formatted into a readable string and written to the log. The text "The VB Application identified by . . . . Logged:" is automatically added by VB; the text that follows contains the details of the message.

Data Access

All but a few exceptional cases use the "ExecuteQuery" API. This API covers singular database operations in which there exists a single input and a single output. Essentially should only exclude certain batch type operations.

The Data Access Framework serves the purposes of performance, consistency, and maintainability.

Performance

The "ExecuteQuery" method incorporates usage patterns for using ADO in an efficient manner. Examples of these patterns include utilization of disconnected recordsets, and explicitly declaring optional parameters which result in the best performance.

Consistency

This method provides a common interface for development of data access. Given a simple and stable data access interface, best practices can be developed and disseminated.

Maintainability

Since the method is located in a single location, it is very modularized and can be maintained with little impact to its callers.

Application servers often use the ActiveX Data Objects (ADO) data access interface. This allows for a simplified programming model as well as enabling the embodiments to utilize a variety of data sources.

The "ExecuteQuery" Method

Overview

The "ExecuteQuery" method should be used for most application SQL calls. This method encapsulates functionality for using ADO in a effective and efficient manner. This API applies to situations in which a single operation needs to be executed which returns a single recordset object.

Syntax
  Set obj = ExecuteQuery(vMsg, nTranType, sSQL, [nMaxRows], [adoTransConn], [args])

Parameters
  vMsg
    This parameter is the TechArch struct. This is used as a token for information capture such as performance metrics, error information, and security.
  nTranType
    An application defined constant which indicates which type of operation is being performed. Values for this parameter can be one of the following constants:
    cmSelect
    cmSelectLocal
    cmUpdate
    cmInsert
    cmDelete
  sSQL
    String containing the SQL code to be performed against the DBMS.
  nMaxRows (Optional)
    Integer value which represent the maximum number of records that the recordset of the current query will return.
  adoTransConn (Optional)
    An ADO Connection object. This is created and passed into execute query for operations which require ADO transactional control (see "Using Transactions" section)
  args (Optional)
    A list of parameters to be respectfully inserted into the SQL statement.

Implementation
  In one embodiment of the present invention the "ExecuteQuery" method resides within the MservArch.bas file. This file should be incorporated into all ServerComponent type projects. This will allow each server component access to this method.
  Note: Since this method is a public method in a "bas" module, it is globally available from anywhere in the project.

```
Public Function ExecuteQuery(vMsg As Variant, _
                nTranType As TranTypes, _
                sSQL As String, _
                Optional nMaxRows As Integer = 0, _
                Optional adoTransConn As ADODB.Connection, _
                Optional colArguments As CCollection) As Variant
    On Error GoTo ErrorHandler
    Const cmMethodName As String = "ExecuteQuery"
    StartTimeLogger vMsg, cmTimerIdDBTotal, cmClassName, cmMethodName
    'find out if this call is an isolate operation or
    'part of an ADO (not MTS) transaction
    Dim isAtomicTrans As Boolean
    isAtomicTrans = adoTransConn Is Nothing
    Dim nRecordsAffected As Integer
    Dim adoRS As New ADODB.Recordset
    Dim adoConn As ADODB.Connection
    Dim lAuxErrNumber As Long
    'open a new connection or keep using the passed in connection
    Set adoConn = IIf(isAtomicTrans, New ADODB.Connection, adoTransConn)
    If isAtomicTrans Then
        adoConn.Open cmODBC__Connect
        'ADO will wait indefinitely until the execution is complete during
performance
        testing
        #If IsPerfTest Then
            adoConn.CommandTimeout = 0
        #End If
```

```
        End If
        'Make sure date args are formatted for DB2 if appropriate
        If Not colArguments Is Nothing Then _
            Set colArguments = FormatArgsForDB2(colArguments)
        'merge the passed in arguments with the SQL string
        sSQL = MergeSQL(sSQL, colArguments)
        Debug. Print Time & ": " & sSQL
        'execute the SQL statement depending on the transaction type
        Select Case CStr(nTranType)
            Case cmSelect
                adoRS.MaxRecords = nMaxRows
                adoRS.CursorLocation = adUseClient
                adoRS.Open sSQL, adoConn, adOpenForwardOnly, adLockReadOnly, adCmdText
                Set adoRS.ActiveConnection = Nothing
                Set ExecuteQuery = adoRS
            Case cmSelectLocal
                adoRS.MaxRecords = nMaxRows
                adoRS.CursorLocation = adUseClient
                adoRS.Open sSQL, adoConn, adOpenStatic, adLockBatchOptimistic, adCmdText
                Set adoRS.ActiveConnection = Nothing
                Set ExecuteQuery = adoRS
            Case cmInsert
                Set adoRS = adoConn.Execute(sSQL, nRecordsAffected, adCmdText)
                If nRecordsAffected <= 0 Then Err.Raise cmErrQueryInsert
                Set adoRS = Nothing
                ExecuteQuery = nRecordsAffected
            Case cmUpdate, cmDelete
                Set adoRS = adoConn.Execute(sSQL, nRecordsAffected, adCmdText)
                If nRecordsAffected <= 0 Then Err.Raise cmErrOptimisticLock
                Set adoRS = Nothing
                ExecuteQuery = nRecordsAffected
            Case cmSpFileNote
                Set adoRS = adoConn.Execute(sSQL, nRecordsAffected, adCmdText)
                Set adoRS = Nothing
            Case Else
                Err.Raise cmErrInvalidParameters
        End Select
        StopTimeLogger vMsg, cmTimerIdDBTotal, cmClassName, cmMethodName
        Exit Function
ErrorHandler:
    Dim objArch As Object
    Set objArch = CreateObject("cmArch.CTechArch")
    Select Case CStr(Err)
        Case cmErrQueryInsert, cmErrOptimisticLock, cmErrInvalidParameters
            'Raise error
            Err.Raise Err
        Case cmErrDSNNotFound
            Dim sMsgText As String
            sMsgText = "Data Source Name not found." & vbCrLf & "( " & _
                CStr(objArch.RegMan.GetServerDSN) & " )"
            ' Create a new message log and log the message
            objArch.LogMan.LogMessage vMsg, cmSeverityFatal, cmClassName, cmMethodName,
                        GetVersion( ), cmErrDSNNotFound, sMsgText, cmLogToEventViewerOnly
            lAuxErrNumber = adoConn.Errors(0).NativeError 'The error code is stored since
                                    when closing the conection it will
                                    be lost
            If adoConn.State <> adStateClosed Then adoConn.Close
            Err.Raise cmErrDSNNotFound, , sMsgText
        Case Else
        ' Create a new message log and log the message
         objArch.LogMan.LogMessage vMsg, cmSeverityFatal, cmClassName, cmMethodName,
                        GetVersion( ), Err.Number, Err.Description, cmLogToEventViewerOnly
            lAuxErrNumber = adoConn.Errors(0).NativeError 'The error code is stored since
                                    when closing the conection it will
                                    be lost
            If adoConn.State <> adStateClosed Then adoConn.Close
            Err.Raise lAuxErrNumber
    End Select
End Function
```

Selecting Records

ExecuteQuery utilizes disconnected recordsets for "Select" type statements. This requires that the clients, particularly the CCA's contain a reference to ADOR, ActiveX Data Object Recordset. This DLL is a subset of the ADODB DLL. ADOR contains only the recordset object.

Using disconnected recordsets allows marshalling of recordset objects from sever to client. This performs much more efficiently than the variant array which is associated with using the "GetRows" API on the server. This performance gain is especially apparent when the application server is under load of a large number of concurrent users.

Sample from Client Component Adapter (CCA)

```
Dim vAns as Variant
Dim adoRS As ADOR.Recordset
Set adoRS = objServer.PerformSelect(vMsg, nId)
If objRS.EOF Then
    Set objRS = Nothing
    Exit Function
End If
vAns = adoRS.GetRows
Set adoRS = Nothing
'Marshall vAns into objects
...
```

Sample from Server Component

```
Private Const cmCustSQL = "Select * from Customer where id = ?"
Public Function PerformSelect(vMsg, nId) as Variant
    Dim colArgs as CCollection
    Set colArgs = New Ccollection
    colArgs.Add nId
    Set PerformSelect = ExecuteQuery(vMsg, cmSelect, sCustSQL, , ,colArgs)
End Function
```

Code Clip from ExecuteQuery (Select Section)

```
Case cmSelect
    adoRS.MaxRecords = nMaxRows
    adoRS.CursorLocation = adUseClient
    adoRS.Open sSQL, adoConn, adOpenForwardOnly,
        adLockReadOnly, adCmdText
    Set ExecuteQuery = adoRS
...
```

Inserting Records

Inserting records requires certain information pertaining to optimistic locking. On the server a unique value is requested to indicate the last time modified. This unique value is returned back to the requestor such that it can be used to later database operations.

Sample from Client Component Adapter (CCA)

```
Dim vNewTS as Variant
vNewTS = objServer.PerformInsert(vMsg, nId, sName)
'Set object's TimeStamp to vNewTS
```

Sample from Server Component

```
Private Const cmCustInsertSQL = "Insert Customer (nId, Name, LastUpdated)
Values(?, '?', ?)"
Public Function PerformInsert(vMsg, nId, sName) As Variant
    Dim lCurrTS as Long
    lCurrTS = GetTimeStamp
    Dim colArgs as CCollection
    Set colArgs = New Ccollection
    colArgs.Add nId
    colArgs.Add sName
    colArgs.Add lCurrTS
    ExecuteQuery(vMsg, cmInsert, sCustInsertSQL, , , colArgs)
    PerformInsert = lCurrTS
```

Code Clip from ExecuteQuery (Insert Section)

```
Case cmInsert
    Set adoRS = adoConn.Execute(sSQL, nRecordsAffected,
        adCmdText)
    If nRecordsAffected <= 0 Then Err.Raise cmErrQueryInsert
    Set adoRS = Nothing
    ExecuteQuery = nRecordsAffected
```

Updating Records

Updating records requires certain information pertaining to optimistic locking. On the server a unique value is requested to indicate the last time modified. Also the last read timestamp is used to validate, during the update, that the record has not been modified since last time read.

Sample from Client Component Adapter (CCA)

```
Dim vNewTS as Variant
vNewTS = objServer.PerformUpdate(vMsg, 1, 'Rick', 8907654)
'Set object's TimeStamp to vNewTS
```

Sample Code Clip from Server Component

```
Private Const cmCustUpdateSQL = _
"Update Customer Set Name = '?',
LastUpdated = ? " & _
"Where Id = ? " & _
"And LastUpdated = ? "
Public Function PerformUpdate(vMsg, nId, sName, lLastTS) As Variant
    Dim lCurrTS as Long
    lCurrTS = GetTimeStamp
    Dim colArgs as CCollection
    Set colArgs = New Ccollection
    colArgs.Add sName
    colArgs.Add lCurrTS
    colArgs.Add nId
    colArgs.Add lLastTS
    PerformUpdate = ExecuteQuery(vMsg, cmUpdate,
        sCustUpdateSQL, , , colArgs)
    PerformUpdate = lCurrTS
End Function
```

Code Clip from ExecuteQuery (Update Section)

```
Case cmUpdate
    Set adoRS = adoConn.Execute(sSQL, nRecordsAffected,
    adCmdText)
    If nRecordsAffected < 0 Then Err.Raise cmErrOptimisticLock
    ExecuteQuery = nRecordsAffected
```

Deleting Records

In deleting records the last read timestamp is used to validate, during the delete, that the record has not been modified since last time read.
Sample from Client Component Adapter (CCA)

```
Dim vAns as Variant
vAns = objServer.PerformDelete(vMsg, nId ,lLastTS)
```

Sample from Server Component

```
Private Const cmCustDeleteSQL = _
"Delete From Customer " & _
"Where Id = ? " & _
"And LastUpdated = ? "
Public Function PerformDelete(vMsg, nId lLastTS) As Variant
    Dim colArgs as CCollection
    Set colArgs = New Ccollection
    colArgs.Add nId
    colArgs.Add lLastTS
    PerformDelete = ExecuteQuery(vMsg, cmDelete,
    cmCustDeleteSQL)
Exit Function
```

Code Clip from ExecuteQuery (Delete Section)

```
Case cmDelete
    Set adoRS = adoConn.Execute(sSQL, nRecordsAffected,
    adCmdText)
    If nRecordsAffected < 0 Then Err.Raise cmErroptimisticLock
    ExecuteQuery = nRecordsAffected
```

Database Locking Framework

Database Locking ensures the integrity of the database in a multi-user environment. Locking prevents the common problem of lost updates from multiple users updating the same record.

Solution Options

Pessimistic Locking

This policy of locking allows the first user to have full access to the record while following users are denied access or have read only access until the record is unlocked. There are drawbacks to this method of locking. It is a method that is prone to deadlocks on the database as well poor performance when conflicts are encountered.

Optimistic Locking

The optimistic approach to record locking is based on the assumption that it is not normal processing for multiple users to both read and update records concurrently. This situation is treated as exceptional processing rather than normal processing. Locks are not actually placed on the database at read time. A timestamp mechanism is used at time of update or delete to ensure that another user has not modified or deleted the record since you last read the record.

A preferred embodiment of the present invention uses an optimistic locking approach to concurrency control. This ensures database integrity as well as the low overhead associated with this form of locking. Other benefits to this method are increased availability of records to multiple users, and a minimization of database deadlocks.

Table candidates for concurrency control are identified during the "Data Modeling Exercise". The only table which is updated concurrently is the Optimistic Locking mechanism. Once these are identified, the following is added to the application.

Add "N_Last_Updt" field to table in database;
Error Handling routines on those operations which modify or delete from this table; and
Display/Notification to user that the error has occurred.

Usage

The chart below describes the roles of the two basic types of components to enable optimistic locking.
Assumption: The optimistic locking field is of type Date and is named "N_Last_Updt"

|  | Client Components | Server Components |
| --- | --- | --- |
| Read Access | Store N_Last_Updt value in the business object for use in possible updates or deletes. | Retrieve data (Always including N_Last_Updt field). SELECT Id, FirstName, N_Last_Updt FROM Customer WHERE id = 10; |
| Inserts | Normal | Dim lCurrTS As Double lCurrTS = GetTimeStamp INSERT INTO Customer (Id, FirstName, N_Last_Updt) VALUES (1, "Rick", lCurrTS); Return new timestamp (lCurrTS) as well as new Id |
| Updates | Pass previously read timestamp to identify whether row was modified. This is in addition to a unique identifier and whatever data needs to be updated. Handle exception if record has been previously modified. Notify user of conflict. Rollback any changes. | Dim lCurrTS As Double lCurrTS = GetTimeStamp UPDATE Customer SET firstName = "Richard", N_Last_Updt = lCurrTS WHERE id = 1 AND LastUpdate = lastReadTimestamp; If no rows are affected, handle and propagate error back out to the client. |

-continued

| Client Components | Server Components |
| --- | --- |
| Deletes Pass previously read timestamp to identify whether row was modified. This is in addition to a unique identifier Handle exception if record has been previously modified. Notify user of conflict. Rollback any changes. | Return new timestamp (lCurrTS) DELETE Customer WHERE id = 1 AND N__Last__Updt = lastReadTimestamp; If no rows are affected, handle and propagate error back out to the client. |

Large Result Set

When retrieving records from a database, if the search criteria is too broad, the amount of data required to be retrieved from the database and passed across the network will affect user perceived performance. Windows requesting such data will be slow to paint and searches will be slow. The formation of the database queries is made such that a workable amount of data is retrieved. There are a few options for addressing the problems that occur from large result sets. The options are given below in order of preference.

Redesign the interface/controller to return smaller result sets. By designing the controllers that present the database queries intelligently, the queries that are presented to the database server do not return a result set that is large enough to affect user perceived performance. In essence, the potential to retrieve too many records indicates that the UIs and the controllers have been designed differently. An example of a well designed Search UI is one where the user is required to enter in a minimum search criteria to prevent an excessively large result set.

Have Scrollable Result Sets. The scrolling retrieval of a large result set is the incremental retrieval of a result subset repeated as many times as the user requests or until the entire result set is obtained. Results are retrieved by the Bounded Query Approach where the first record is determined by a where clause with calculated values.

Scrollable Result Set Client Requirements

Preferred UI
The preferred displays are as follows:
Returned results are displayed in a GreenTree List Box;
An action button with the label More . . . is provided for the user to obtain the remaining results;
The More button is enabled when the user has performed an initial search and there are still results to be retrieved;
The More button is disabled when there are no more results to retrieve;
The List Box and the Action button is contained within a group box to provide a visual association between the button and the List Box.

Bounded Query

Queries that are implemented with the limited result sets are sent to the server. The server implements the executeQuery method to retrieve the recordset as usual. Limited result queries have an order by clause that includes the business required sort order along with a sufficient number of columns to ensure that all rows can be uniquely identified. The recordset is limited by the nMaxRows variable passed from the client incremented to obtain the first row of the next result set. The return from the component is a recordset just the same as with a query that is not limited. The CCA 208 creates the objects and passes these back to the controller 206. The Controller 206 adds this returned collection of object to its collection of objects (an accumulation of previous results) and while doing so will performs the comparison of the last object to the first object of the next row. The values necessary to discriminate the two rows are added to the variant array that is necessary to pass to the component for the subsequent query.

The Controller 206 on the client retains the values for nMaxRows, the initial SQL statement, and array of values to discern between the last row of the previous query and the first row of the next query. The mechanism by which the controller 206 is aware that there are more records to retrieve is by checking the number of results is one greater than the max number of rows. To prevent the retrieval of records past the end of file, the controller 206 disables these functions on the UI. For example, a command button More on the UI, used to requested the data, is disabled when the number of objects returned is less than nMaxRows+1.

Application Responsibility

Server
The Server component is responsible for creating a collection of arguments and appending the SQL statement to add a where clause that will be able to discriminate between the last row of the previous query and the first row of the next.
CCA
The CCA 208 processes the recordset into objects as in non limited queries. The CCA 208 forwards the variant array passed from the Controller 206 to identify the limited results.
Controller
The controller 206 has the responsibility of disabling the More control when the end of file has been reached. The controller 206 populates the variant array (vKeys) with the values necessary to determine start of next query.

Example

A CCA 208 is coded for a user defined search which has the potential to return a sizable result set. The code example below implements the Bounded Query approach.
On the Server the developer codes the query as follows:

```
Public Function RetrieveBusinessObjects(vMsg As Variant,
ByVal sSql As String,
ByVal nMaxRows As Integer, Optional ByVal vKeys As Variant)
As Recordset
    On Error GoTo ErrorHandler
    'Declare local constants
    Const cmMethodName As String = "RetrieveBusinessObjects"
    'Declare local variables
```

```
-continued
    Dim cmClassName As String
    Dim colArgs As New CCollection
    'initialize instance variables
    cmClassName = "CSRSTestComp"
    'fill argument collection
    Set colArgs = ArgumentsForBusinessObject(vKeys , sSQL)
    'increment nMaxRows to obtain row for comparison
    nMaxRows = nMaxRows + 1
    'ExecuteQuery
        Set RetrieveBusinessObjects = ExecuteQuery(vMsg,
            cmSelectLocal, sQuery,
nMaxRows, , colArgs)
    'Tell MTS we're done
    GetObjectContext.SetComplete
    Exit Function
ErrorHandler:
    Select Case Err.Number
        Case Else
            Dim iResumeCode As Integer
            iResumeCode = GeneralErrorHandler(vMsg,
                cmServer, cmClassName,
cmMethodName)
            Select Case iResumeCode
                Case cmErrorResume
                    Resume
                Case cmErrorResumeNext
                    Resume Next
                Case cmErrorExit
                    Exit Function
                Case Else
                    GetObjectContext.SetAbort
                    Err.Raise Err.Number
            End Select
    End Select
End Function
```

To determine the additional where clause necessary to determine the starting point of the query, the following method is added:

```
Private Function ArgumentsForBusinessObject(vKeys As Variant,
sSql As string )
As CCollection
    Dim colArgs As Ccollection
    Const cmGreaterThanWhereString As String = " ? > ? "
    Const cmGreaterThanOrEqualWhereString As String =
" ? >= ? AND "
    ' initialize local variables
    Set colArgs = New Ccollection
    sSql = sSql + "WHERE"
    With colArgs
        If vKeys(0) <> Empty Then
            .Add ("N_TASK_TEMPL_ID")
            .Add (vKeys(0))
        End If
        'If vKeys(1) <> Nothing Then
            '.Add value2 fieldName
            '.add vKeys(1)
            sSql = sSql + cmGreaterThanOrEqualWhereString
        'End If
        'If vKeys(2) <> Nothing Then
            '.Add value3 fieldName
            '.add vKeys(2)
            sSql = sSql + cmGreaterThanOrEqualWhereString
        'End If
    End With
    'finalize SQL statement
    sSql = sSql + cmGreaterThanWhereString
    Set ArgumentsForBusinessObject = colArgs
End Function
```

On the CCA 208, allowance must be made for the passing of the vKeys

Public Function RetrieveBusinessObjects (vMsg As Variant, sSql As String, nMaxRows As Integer, Optional ByVal vKeys As Variant) As CCollection

```
    Set percmpComponent = New CSRSTestComp
    Dim i As Integer
    Set adoRS =
        percmpComponent.RetrieveBusinessObjects(vMsg, sSql, nMaxRows,
vKeys)
    'convert recordset to business objects
    adoRS.MoveFirst
    Do Until adoRS.EOF
        Call ConvertToBusinessObject
        adoRS.MoveNext
    Loop
    'return the collection of business objects
    Set RetrieveBusinessObjects = dictBusinessObject
    Set dictBusinessObject = New CCollection
End Function
```

The controller initiates the query and updates the variant array of keys and form 204 properties based on the return. In addition to the code shown for the example below, the More Control is enabled if the search is cleared.

```
    'declare instance variables
    Private nMaxRows As Integer
    Dim interimResults As CCollection
    Dim vResults As CCollection
    Dim vKeys(3) As Variant
    'declare Constants
    Private Const nDefaultAmount As Long = 50
    Private Const cmRetrieveBusinessObjectSQL = "SELECT *
FROM NODE_RULE ORDER BY
_ N_TASK_TEMPL_ID"
```

During class initialization perform the following:

```
Public Sub Class_init( )
    'obtain settings from registry
    nMaxRows = CInt(Getsetting(cmRegApp, cmRegArchSection,
cmLimitedResultAmountKey, lDefaultAmount))
    Call resetSearch
    Set objCCA = New (CCA class name)
End Sub
```

Search reset functionality is kept outside of initialization so this may be called from other parts of the application.

```
Public Sub resetSearch( )
    Dim I as Integer
        Set vResults = New CCollection
        For I = 0 To 3
            Set vKeys(I) = Empty
        Next
    Set vKeys(0)  = Empty
        frmCurrentForm.cmdMore.Enabled = True
End Sub
Public Sub RetrieveBusinessObjects( )
        Const cmMethodName As String =
            "retrieveBusinessObjects"
        Call RetainMouse
        ' get arch message
```

```
            Dim vMsg As Variant
            vMsg = objApp.objArch.AsMsgStruct( )
            ' call the component
            Dim pair As CArchPair
         'Declare local variables
            Dim sSql As String
            Dim colArgs As CCollection
            Dim cmClassName As String
         Set interimResults = objCCA.RetrieveBusinessObjects(vMsg,
      cmRetrieveBusinessObjectSQL, nMaxRows, vKeys)
         ctr = ProcessObjectCollection
         'stop if size of return is less than the maximum
            If ctr < nMaxRows + 1 Then
            frmCurrentForm.cmdMore.Enabled = False
            ' restore pointer
            Screen.MousePointer = lPrevPtr
         End Sub
```

In order to retain the values to discriminate between the last row of the result set and the first row of the next the following method on the controller is used:

```
Private Function ProcessObjectCollection( ) As Integer
' merge results with the instance variable for the collection
      Dim ctr As Integer
         ctr = 0
      For Each element In interimResults
         ctr = ctr + 1
         'retain Keys for subsequent Queries
         With element
            Select Case ctr
               Case nMaxRows
                  'store all values that may be used for row
                  comparison
                  vKeys(0) = .NodeId
                  'add last object to collection
                  vResults.Add element
               Case nMaxRows + 1
                  'last object only used for comparison
                  'If the proceeding value can be used to uniquely
                  'identify row then delete value from array
                  ' THERE SHOULD BE N − 1 nested If statements
                  where N =
size of vKeys
                  'If .value2 <> vKeys(1) Then
                     'vKeys(2) = Empty
                        If .NodeId <> vKeys(0) Then vKeys(1) = Empty
                     'End If
               Case Else
                     vResults.Add element
            End Select
         End With
      Next
      ProcessObjectCollection = ctr
End Function
```

Operation of Example with Data

Person

| First Name | Last Name | Status | Unique ID |
|---|---|---|---|
| Joy | Andersen | Closed | 22 |
| Jay | Anderson | Open | 12 |
| John | Barleycorn | Closed | 512 |
| John | Barleycorn | Open | 32 |
| Esther | Davidson | Open | 88 |
| David | Dyson | Closed | 98 |
| Bobby | Halford | Open | 234 |
| Steven | Jackowski | Closed | 4 |

Person

| First Name | Last Name | Status | Unique ID |
|---|---|---|---|
| Kyle | Johnsen | Open | 65 |
| Jeff | Johansen | Open | 13 |
| Mary | Johnson | Closed | 24 |
| Larry | Olsen | Open | 21 |
| William | O'Neil | Closed | 29 |
| Jane | Pick | Open | 3285 |

For this example let nMaxRows=3. The business case calls for the result set to be ordered by the last name, and developer knows that any row can be uniquely identified by the First-Name, LastName, and Unique ID fields so the initial SQL added as a constant in the controller should be;

SELECT * FROM Person ORDER BY LastName, First-Name, Unique_ID

Initial Query

The first query is sent with an empty vKeys Array. When the server receives this query, the method ArgumentsForBusinessObject identifies the elements as being empty and does not populate the colArgs. The query is executed with the initial SQL unchanged. The recordset of size nMaxRows+1 is returned to the CCA 208 and processed the same as non-limited results. The CCA 208 returns the collection of objects to the controller 206. The controller 206 proceeds to populate the vResults collection with the returned objects. vResults is the comprehensive collection of objects returned. When the last object of the first request is reached (at nMaxRows), the values are stored in vKeys as such;

vKeys(0)=LastName (Barleycorn)

vKeys(1)=FirstName (John)

vKeys(2)=Unique_ID (512)

When the First Object of the next request is reached (at nMaxRows+1), comparison of the object variables against the vKeys values is performed. Because the last names match, vKeys(2) will not be deleted and no further checks are performed.

Subsequent Query

The subsequent query will pass vKeys along with it. The server creates the collection of arguments from vKeys and append the sSql string in accordance. The sSql statement that is passed to execute query is SELECT * FROM Person ORDER BY LastName, First-Name, Unique_ID WHERE ?>=? AND ?>=? AND ?>?

This sSql and collection is included in the call to ExecuteQuery which merges the arguments with the string relying on the architecture method MergeSQL to complete the SQL statement.

The starting point of the recordset is defined by the WHERE clause and the limit is set by the nMaxRows value.

Query Less Restrictive WHERE Criteria

After the second query the last row of the query is David Dyson and the next is Bobby Halford. Because the last name is different, vKeys will be empty except for vKeys(0)=Dyson.

The ProcessObjectCollection will populate vKeys as follows when processing nMaxRows object:

vKeys(0)=LastName (Dyson)

vKeys(1)=FirstName (David)

vKeys(2)=Unique_ID (98)

After identifying the differences between vKeys values and the nMaxRows+1 object the vKeys array is updated as follows:
vKeys(0)=LastName (Dyson)
vKeys(1)=Empty
vKeys(2)=Empty The query that is returned from ArgumentsForBusinessObject is
SELECT * FROM Person ORDER BY LastName, FirstName, Unique_ID WHERE ?>?
and the colArgs possessing the fieldname FirstName and the value ("David"). ExecuteQuery merges the arguments with the sql statement as before and returns the value.
Ending After the fifth iteration the result set will only possess 2 records. When the controller 206 processes the returned collection the counter returned from ProcessObjectCollection is less than nMaxRows+1 which indicates that all records have been retrieved.

Security Framework

Implementation

Figure 8:
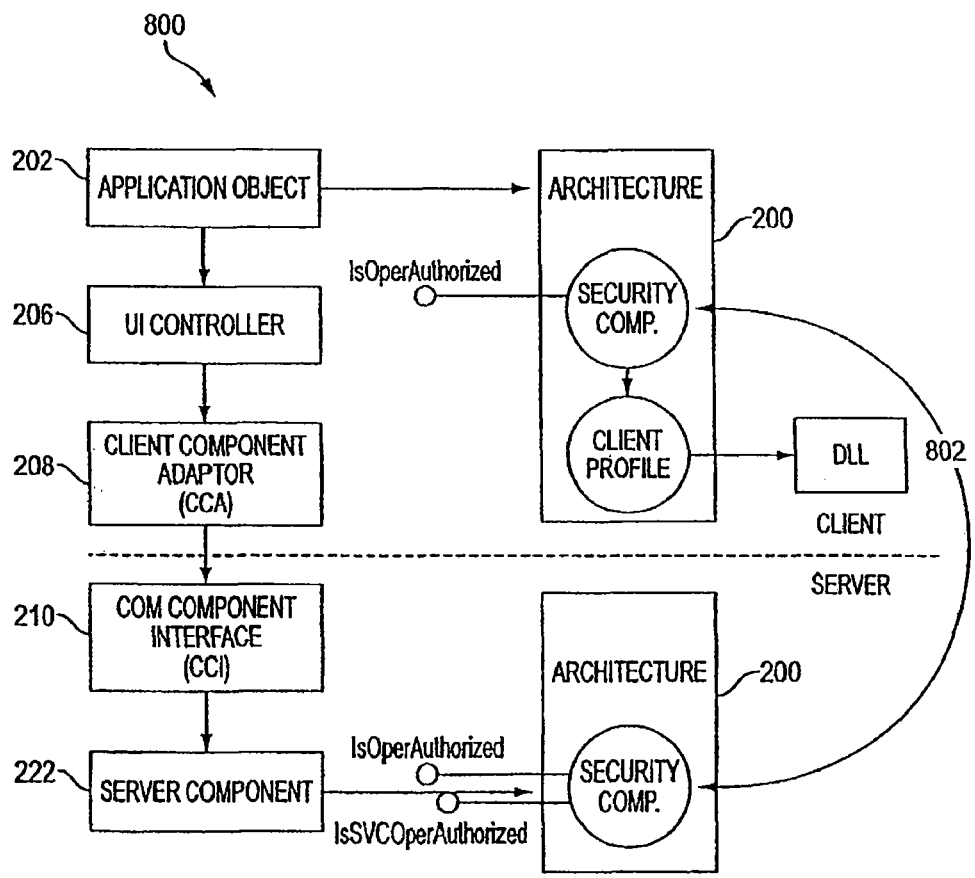
FIG. 8 is a block diagram of the security framework and its components.

FIG. 8 shows a representation of the Security Framework 800 and its main components.

It can be seen from FIG. 8 that the Security object 802 is present at the Client and a Security API is provided at the server. The Security object 802 provides one method responsible for authorizing any operation, being given the vMsg structure, an operation ID and an optional parameter describing the operation's context.

Client
User Authentication:

User authentication is handled via a method located in the Security object 802 called IsOperAuthorized. As the Application object loads, it calls the IsOperAuthorized method, with the operation being "Login", before executing further processing. This method subsequently calls a authentication DLL, which is responsible for identifying the user as an authorized user within the Corporate Security.

UI Controllers:

The UI Controllers limit access to their functions by restricting access to specific widgets through enabling and disabling them. The logic for the enabling and disabling of widgets remains on the UI Controller 206, but the logic to determine whether a user has access to a specific functionality is located in the Security object 802 in the form of business rules. The UI Controller 206 calls the IsOperAuthorized method in order to set the state of its widgets.

Server

Server security is implemented by restricting access to the data in three different ways:

Server Security Method

Server Components 222 call the IsOperAuthorized API in the Architecture before executing every operation. In all cases the Security object 802 returns a boolean, according to the user's access rights and the business rules SQL Filtering Includes security attributes, like claim sensitiveness or public/private file note, into the SQL statements when selecting or updating rows. This efficiently restricts the resulting data set, and avoids the return of restricted data to the client.

Description

Any GUI related security is implemented at the Client using the Security object 802. The information is available both at the Client Profile and Business Objects 207 which enables the security rules to be properly evaluated.

IsOperAuthorized is called to set widgets upon the loading of a UI or if there is a change of state within the UI.

User authentication always is used by the Application Objects 202 in order to validate user privilege to launch the application.

SQL Filtering is used in the cases where sensitive data must not even be available at the Client, or where there is a great advantage on reducing the size of the data set returned to the Client.

SQL Filtering is only used in very rare cases where performance is a serious concern. It is used carefully in order to avoid increased complexity and performance impacts because some queries can be cumbersome and embedding security on them could increase complexity even more.

Security Framework

Overview

The Security object 802 serves the purpose of holding hard coded business rules to grant or deny user access for various application functions. This information is returned to the UI controllers 206 which make the necessary modifications on the UI state. The ClientProfile object serves the purpose of caching user specific (and static) security information directly on the client. This information is necessary to evaluate the business rules at the Security object 802.

Relationships

Figure 9:
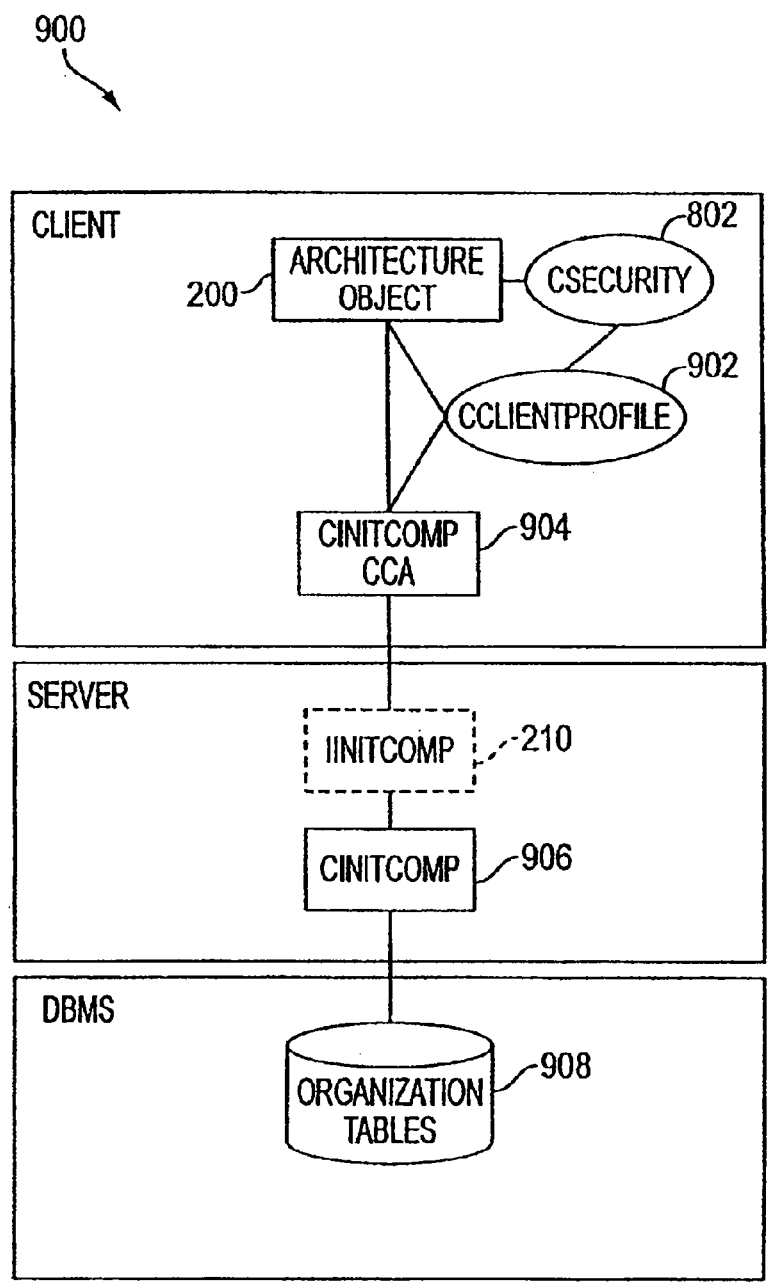
FIG. 9 is an illustration showing the relationships between the security element and other elements.

FIG. 9 shows the relationships between the security element and other elements.

Architecture Object

The TechArch object is responsible for providing access and maintaining the state of the ClientProfile 902 and Security objects 802. The ClientProfile object 902 is instantiated and destroyed in the TechArch's initialization and terminate methods, respectively. This object is maintained through an instance variable on the TechArch object.

CInitCompCCA

The CInitCompCCA object 904 provides two services to the architecture object 200, it serves as an access point to the CInitComp Server 906, and it Marshalls the query result set into a ClientProfile object 902.

CInitComp

The CInitComp server object 906 provides data access to the data that resides in the organization tables 908. This data is useful on the client to determine level of access to data based on hard coded business rules.

Organization Tables

The Organization tables 908 contain user, employee and unit information necessary to build the hierarchy of information necessary to determine level of access to sensitive information.

Client Profile

The ClientProfile object 902 serves the purpose of caching static, user specific security information directly on the client. This information is necessary to determine data access level of information to the user, which is accomplished by passing the necessary values to the Security object 802.

Security Object

The Security Object 802 contains business rules used to determine a user's access privileges in relation to specific functions. The object accepts certain parameters passed in by the various UI Controllers 206 and passes them to through the business rule logic which, in turn, interrogates the Client Profile object 902 for specific user information.

Client Profile

Attributes

The following are internal attributes for the Client Profile object 902. These attributes are not exposed to the application and should only be used by the Security object 802:

sProfile:
This attribute is passed by the legacy application at start-up and contains the user's TSIds, External Indicator, Count of Group Elements and Group Elements. It is marshalled into these attributes by request of the application objects.

colSpecialUsers:
This attribute caches information from a table containing special users which do not fit into one of the described roles, such as Organization Librarian. (e.g., Vice President or CEO of the corporation.)

sTSId:
This is the current users' TSId, and it corresponds to his/her Windows NT Id. It is used to get information about the current logged on user from the Organizational Tables 908.

sEmployeeId:
This corresponds to the user's employee Id, as stored in the Organizational tables 908. It is used against the passed in employee Id, in order to check relationship between performers and the current user.

sEmployeeName, sEmployeeFirst, sEmployeeMI and sEmployeeLast:
All these attributes correspond to the current user's name.

dictClientPrivileges:
This attribute contains a collection of identifiers that indicate what role/authority an individual plays/possesses. This value is used to identify the static role of the logged in user.

These values are used for security business logic which grants or denies access based on whether the user is internal or external, or whether the user is in a given administrative role. Existing values are the following:
SC—Indicates sensitive Claim authority
CC—Indicates Change Claim status authority
MT—Indicates maintain F&C Templates authority
MO—Indicates maintain Organization authority
MR—Indicates maintain Roles authority The following are the proposed additions:
TA—Indicates authority to execute Task Assistant
FN—Indicates authority to execute FileNotes
CH—Indicates authority to execute Claim History
TL—Indicates authority to maintain Task Templates dictProxyList:
This attribute contains an employees' reporting hierarchy. It is used to determine whether the current user/employee has permission to perform some action based on his/her relationship to other users/employees within their hierarchy. A business example of this is the case of a supervisor, who has rights to view information that his/her subordinates have access to. The relationship API's make use of dictProxyList to determine if the user assigned to the information is super or subordinate of the current user.

boolInternal:
This attribute indicates whether the logged in user is external or internal. It is also marshalled from the sProfile attribute, passed in by the legacy application.

Public Methods

The following are the APIs exposed by the Client Profile object. These APIs are used for security checking by the Security object and should not be used by the developers in any portion of the application.

GetAuthorizedEmployees As Collection
This function returns a collection of employee Ids from the employees supervised by the current user.

IsSuperOf(sUserId) As Boolean
This API returns true if the logged in user is a super of the passed in user Id. It looks up the sUserId value inside the dictProxyList attribute.

IsRelativeOf(sUserId) As Boolean
This API returns true if the passed in user Id corresponds to either the logged in user or someone from the dictProxyList.

IsInternal As Boolean
This API is used to grant or restrict the user to information based on whether the data is private to the organization whether the user is internal or external.

IsInRole(sRole) As Boolean
This API looks up the appropriate sRole value contained within the dictClientRoles attribute to determine whether the current user is authorized to perform that role.

The following accessory are used to get data from the Client Profile's object:
UserId: returns sTSId
EmployeeId: return sEmployeeId
EmployeeName: returns sEmployeeName
EmployeeFirstName: returns sEmployeeFirst
EmployeeLastName: returns sEmployeeLast
EmployeeMiddleInitial: returns sEmployeeMI
ExpandTree: returns boolExpandTreePreference
TemplatePathPreference: returns sTemplatePathPreference

Security Object

Public Methods

The following API is exposed by the Security Object and is used by the application for security checking:

IsOperAuthorized(vMsg As Variant, nOperations As cmOperations, vContext As Variant) as Boolean
This API will return true or false depending on what is returned from the business rule functions to determine user access levels. This API is called on two situations:
1. When setting the initial state before loading the form. If a security requirement exists, IsOperAuthorized is called for the appropriate operation.
2. After any relevant change on the UI state. For example, when a sensitive claim is highlighted on the Task Assistant window. A relevant change is one which brings the need for a security check.

The valid values for the enumeration and the correspondent context data are:
cmMaintainFormsCorr (none)
cmRunEventProcessor (none)
cmWorkOnSensitiveClaim (a Claim object)
cmMaintainPersonalProfile (none)
cmMaintainWorkplan (none)
cmDeleteFileNote (a File Note object)
cmMaintainTaskLIbrary (none)
cmMaintainOrg (none)

Server Security APIs

IsSVCOperAuthorized (vMsg As Variant, sOperations As String, vContext As Variant) as Boolean
This API is called by every method on the server that persists data or can potentially access sensitive data (reactive approach).
IsOperAuthorized (vMsg As Variant, nOperations As cmOperations, vContext As Variant) as Boolean
This API is available for those cases where a proactive security check is needed on the server.

Implementation Examples

The following examples show some ways to implement the options described above:
Client
  Business Logic
    IsOperAuthorized
      Let's consider the case of the Task Assistant window, where the user should not be allowed to view any information on a sensitive claim if he/she is not the claim performer or the performer's supervisor. The following code would be at the Controller:

```
Private Sub TaskTree_NodeChanged(....)
    myController.SetCurrentTask
    myController.SetState
End Sub
Private Sub SetState( )
    Dim objSecurity as Object
    Dim vContext(1) as Object
    Set objSecurity = taaApp.taoArch.objSecurity
    vContext(0) = CurrentClaim
    vContext(1) = CurrentTask
    tlbEditIcon.Enabled =
        objSecurity.IsOperAuthorized(vMsg,
        cmWorkOnSensitiveClaim,
    vContext)
    End Sub
```

Let's consider the case of the Maintain Correspondence Search window where only a user who is a Forms and Correspondence Librarian should be allowed to delete a template. The following code would be at the Controller:

```
Private Sub SetWindowMode( )
    Dim objSecurity as Object
    Set objSecurity = taaApp.taoArch.objSecurity
    ...
    tlbEditIcon.Enabled = objSecurity.IsOperAuthorized(vMsg,
cmMaintainFormsCorr)
End Sub
```

Server
  SQL Filtering:
    Let's consider the example of the Draft File Note window, where a user can only look at the draft file notes on which he/she is the author. At the controller, one would have:

```
Public Sub GetDraftFNotes( )
    Dim objCP as Object
    Set objCP = taoArch.objClientProfile
    Dim fntCCA as Object
    Set fntCCA = taaApp.taoArch.GetCCA(cmCCAFileNote)
    Call fntCCA.GetADraftFNote(vMsg, objCP.sOrgUserId, colFNotes)
End Sub
```

And at the Component, the SQL statement would be:

```
Select nFNoteId,
    sFNoteAuthor,
    dFNoteFinal,
    :
    :
From     File Note
Where    sFileNoteSts = 'D'
And      sFNoteAuthor = sAuthor
```

Task Engine Application

This application runs on the server as a background process or service with no direct interaction with Client applications, so it doesn't need any GUI related security. Basically, its main actions are limited to the generation of new tasks in response to externally generated events or, more specifically, it:
  Reads static information from the Task Template tables;
  Reads events from the Event tables;
  Inserts tasks on the Task table.
In this sense, its security is totally dependent on external entities as described below:
  The Task Library application is the entrance point for any changes on the Task Template database tables. It will make use of the options described above in order to fulfill its security requirements.
  Events are generated from legacy applications, so the Task Engine relies completely on the security implemented for these applications in order to control the generation of events.
  Another level of security for event generation relies on the Database authorization and authentication functions. Only authorized components have access to the database tables (this is valid for all the other applications as well).

Claim Folder

Definition
  The Claim Folder manages claim information from first notice through closing and archiving. It does this by providing a structured and easy to use interface that supports multiple business processes for handling claims. The information that it captures is fed to many other components that allow claims professionals to make use of enabling applications that reduce their workload. Because physical claim files are still required, the claim folder provides capabilities that support physical file tracking. It works with the LEGACY system to support all the capabilities that exist within the current system.
  The primary processes supported by the Claim Folder are:
  First Notice of Loss
    The Claim Folder is the primary entry point for new loss information. Claim files exist in the Claim Folder before they are "pushed" to the LEGACY system to perform financial processing.
  Claim Inquiry
    Claim Folder supports internal and external inquires for claim information. The folder design allows quick access to various levels of information within the claim for many different reasons.

Initiation of Claim Handling
  The Claim Folder provides initial loss information to the claim professional so they may begin the process of making first contacts with appropriate participants in the claim. It allows them to view and enter data received through their initial contacts and investigation.

Investigation and Evaluation
  The Claim Folder provides access to detailed information needed for the investigation and evaluation process. It allows the claim handler to navigate between all the applications and information they need to support these processes.

Identifying Claim Events
  The Claim Folder identifies critical events that occur in the life of a claim, such as a change of status, which can trigger responses in other components to perform automated functions, like triggering tasks in the Task Assistant.

Managing the Physical File
  The Claim Folder supports better tracking capabilities for the physical files that go along with the electronic record of a claim.

Value

By capturing detailed information on claims, the Claim Folder tries to improve the efficiency of claim professionals in many ways. First, because the information is organized in a logical, easy to use format, there is less digging required to find basic information to support any number of inquiries. Second, the Claim Folder uses its information to support other applications like Forms and Correspondence, so that claim information does not have to be reentered every time it is needed. Third, it provides better ways to find physical files to reduce the time required finding and working with them. Beyond this, there are many other potential uses of claim folder information.

The Claim Folder also tries to overcome some of the current processing requirements that the LEGACY system imposes such as recording losses without claims, requiring policy numbers for claim set-up, requiring reserves for lines, and other restrictions. This will reduce some of the low-value added work required to feed the LEGACY system.

Finally, the Claim Folder organizes and coordinates information on participants and performers so that all people involved in a claim can be identified quickly and easily.

Key Users

Although claim professionals are the primary users of the Claim Folder, any claims professional can utilize the Claim Folder to learn about a claim or answer an inquiry about a claim.

Component Functionality

Because the Claim Folder is the primary entry point for new claims, it needs to capture information necessary to set-up new claims and be able to pass the information to the LEGACY system. Once the information is passed, the LEGACY system owns all information contained in both systems, and it is uneditable in the Claim Folder. However, the Claim Folder has more information than what is contained in the LEGACY system, and therefore allows certain information to be entered and modified once the claim is pushed to the LEGACY system.

The Claim Folder decomposes a claim into different levels that reflect the policy, the insured, the claim, the claimants, and the claimant's lines. Each level has a structured set of information that applies to it. For example, the claim level of the claim has information on the claim status, line of business, and performers. An individual line has information which includes the line type, jurisdiction, and property or vehicle damages. The claimant level contains contact information as well as injury descriptions.

The information at each level is grouped into sections for organization purposes. Each level has a details section that includes the basic information about the level.

The key levels on the Claim Folder and their information sections are:
  The Policy Level: Details and Covered Auto for auto claims, Covered Property for property claims and Covered Yacht for marine claims.
  The Claim Level: Details, Facts of Loss, Events, Liability. Liability is considered part of the Negotiation component and described there.
  The Participant Level: Details and Contact Information. For claimants, additional sections are shown to display, Events, Injury and Disability Management. The participant level is discussed in the Participant Component.
  The Line Level: Details, Damaged Vehicle for vehicle lines, Damaged Property for property lines, Damaged Yacht for marine lines, Events, Damages, and Negotiation. Damages and Negotiation are considered part of the Negotiation component and described there.

Events are triggered in the Claim Folder by performing certain actions like changing a jurisdiction, identifying an injury, or closing a line. Other general events are triggered in the Event Section on most levels by clicking the one that has occurred. These events are processed by the Event Processor and could generate any number of responses. In one embodiment of the present invention, the primary response is to trigger new tasks in the Task Assistant for a claim.

User Interfaces
  Claim Folder UI
  Policy Level—Policy Details Tab
  Policy Level—Covered Vehicle Tab
  Policy Level—Covered Property Tab
  Policy Level—Covered Yacht Tab
  Claim level—Claim Details Tab
  Claim level—Facts of Loss Tab
  Claim level—Events Tab
  Claim level—Liability Tab
  Line level—Line Details Tab
  Line level—Damaged Property Tab
  Line level—Damaged Auto Tab
  Line level—Damaged Yacht Tab
  Line level—Events Tab
  Line level—Damages Tab
  Line level—Negotiation Tab
  Task Assistant
  File Notes
  Claim History
  Search Task Template
  Search for Correspondence
  Find Claims
  Version 7
  View File Folder
  Print Label Claim Folder Tree and Menu Design Claim Tree
  The claim tree in the Claim Folder window decomposes the claim into policy, insured, claim, claimant, and line levels depending on the specific composition of the claim.

The policy level is always the first node in the claim tree and is identified by the policy number. Before the policy number is entered, the field is listed as "Unknown". If a claim is uncoded, the field is listed as "Uncoded". Selecting the policy level brings up the policy level tabs in the body of the Claim Folder.

The insured level is always the second node in the claim tree and is identified by the insured's name. Before the insured is identified, the field is listed as "Unknown". Selecting the insured level brings up the insured participant tabs in the body of the claim folder. Only one insured is listed at this level as identified in the policy level tabs, however, multiple insureds can still be added. Additional insureds are shown in the participant list below the claim tree.

The claim level is always the third node in the claim tree and is identified by the claim number. When the claim level is selected, the claim level tabs appears in the body of the Claim Folder.

After the claim level, all claimants are listed with their associated lines in a hierarchy format. When a claimant is added, a node is added to the tree, and the field identifying the claimant is listed as "Unknown". Once a participant has been identified, partial or client, the name of the claimant is listed on the level.

When the level is selected, the participant level tabs for the claimant is shown in the body of the claim folder.

Line levels are identified by their line type. Before a line type is selected, the line level is listed as "Unknown". When a line level is selected, the line level tabs for the specific line are shown in the body of the claim folder.

There are several things that can alter the claim tree once it has been set up. First, if a claimant or line is deleted, it is removed from the claim tree. A claim that is marked in error does not change the appearance of the levels. Second, the claim, claimant, and line levels are identified by different icons depending on whether they are pushed to V7 or not. Third, when a line or claimant is offset, it is identified as such.

Participant List

The participant list box contains all the non-claimant and non-insured participants on the claim. (Claimants and insureds are shown in the claim tree and not repeated here.) Participants are shown with their name and role. When a participant is selected, the participant level tabs are displayed in the claim folder.

Claim Folder Menu Items

The claim folder menus contain the actions that a user would need to perform within the claim folder. They can all be accessed through keyboard selection. The menu options become enabled or disabled based on the state of the Claim Folder. The Claim Folder can be in view mode or edit mode for a specific level in the Claim Tree. When the Claim Folder is in edit mode, most options are disabled until the user saves their changes and is returned to view mode. The enabling/disabling of menu options is also dependent on whether the claim or portions of the claim have been pushed to V7.

Claim Folder Tool Bar

The tool bar represents common action that a user performs that can be easily accessed by clicking the appropriate icon. There are five groups of button on the Claim Folder tool bar that represent, in order, common activities, adding new items to a claim, launching utilities, performing V7 activities, and accessing help functions. The enabling/disabling of tool bar buttons follows the same logic as for menu items.

Window Description

| Control Name | Type | Description | Default Value/State |
| --- | --- | --- | --- |
| Claim Tree | Tree View | The Claim Tree lists the policy, insured, all of the claimants and their related lines in a claim tree format. | The current claim tree structure for the selected claim. The claim level is selected and the claim level tabs are displayed. |
| Participant List | List View | A list of all non-insured and non-claimant participants associated with a claim. | All participants who are not claimants or insureds for the claim and their roles |
| Edit Tool Bar Button | Command Button | Changes the tabs for the level selected in the claim tree or participant list view to edit mode. | Enabled when claim is in view mode. |
| Refresh Tool Bar Button | Command Button | Refreshes the current claim, including all Participant and Line information. | Enabled when claim is in view mode. |
| Find Tool Bar Button | Command Button | Opens the Claim Search window to allow the user to search for another claim | Enabled |
| Claim Allocation Tool Bar Button | Command Button | Opens the Claim Allocation window. | Enabled when claim is in view mode. |
| Manage Physical File Tool Bar Button | Command Button | Opens the Manage Physical File window. | Enabled when claim is in view mode. |
| Declare Event Tool Bar Button | Command Button | Opens the Declare Events window. | Enabled when claim is in view mode. |

-continued

| Control Name | Type | Description | Default Value/State |
| --- | --- | --- | --- |
| Claimant Tool Bar Button | Command Button | Adds claimant and opens Participant tabs in edit mode for entry of a new claimant level node | Enabled when claim is in view mode. V7 limit for claimants is 999, we will not edit this here. |
| Participant Tool Bar Button | Command Button | Adds a new participant and opens Participant tabs in edit mode. | Enabled when claim is in view mode. |
| Line Tool Bar Button | Command Button | Adds line and opens Line tabs in edit mode for entry of a new line level node. | Enabled when claim is in view mode and claimant context selected in claim tree. V7 limit for lines is 15 per claimant, this button will be disabled after 15 added. |
| Assign Performer Tool Bar Button | Command Button | Opens Assign Performer window | Enabled when claim is in view mode. |
| Print Screen Tool Bar Button | Command Button | Prints the current claim folder window. | Enabled |
| Task Assistant Tool Bar Button | Command Button | Launches Task Assistant for the current claim | Enabled when claim in view mode. |
| File Notes Tool Bar Button | Command Button | Launch File Notes for the current claim | Enabled when claim in view mode. |
| Claim History Tool Bar Button | Command Button | Launch Claim History for the current claim | Enabled when claim in view mode. |
| Correspondence Tool Bar Button | Command Button | Opens Forms and Correspondence window | Enabled when claim in view mode. |
| Push to V7 Tool Bar Button | Command Button | Open the terminal emulator window at the first V7 setup screen. | Enabled when claim is in view mode and claim status is pre-push or open and there are new claimants or lines to push. |
| Make Payment Tool Bar Button | Command Button | Open the V7 PUEM screen in the terminal emulator window if a claimant or participant tied to one claimant is selected. Otherwise, display window that requires user to select a claimant. | Enabled when claim had been pushed to V7 and a participant is selected. |
| Help Tool Bar Button | Command Button | Opens Help | Enabled |
| Claim|Edit | Menu Option | Changes Claim tabs into Edit mode so that the user can make changes | Enabled when claim is in view mode. |
| Claim|Refresh | Menu Option | Refreshes the current claim, including all Participant and Line information. | Enabled when claim is in view mode. |
| Claim|Find | Menu Option | Opens the Claim Search window | Enabled |
| Claim|Save | Menu Option | Save the claim level when it is in edit mode. | Enabled when the claim level is in edit mode. |
| Claim|Claim Status| First Report Complete | Menu Option | Changes the status of the claim to "Unassigned" and creates First Report Complete Event. | Enabled when claim is in view mode and claim status is "New". |
| Claim|Claim Status| Assignment Complete | Menu Option | Changes the status of the claim to "Open" and creates Assignment Complete Event. | Enabled when claim is in view mode and claim status is "Unassigned". |

| Control Name | Type | Description | Default Value/State |
|---|---|---|---|
| Claim\|Claim Status\|Close | Menu Option | Initiates the close claim process | Enabled when claim is in view mode, V7 claim status is closed, and Millennium Claim Status is not "Closed" or "Archived" |
| Claim\|Claim Status\|Reopen | Menu Option | Changes the status of the claim to "Open". | Enabled when claim is in view mode and "Closed" or "Archived". |
| Claim\|Claim Status\|Mark In Error | Menu Option | Marks the current claim and all of its lines in error. Expires all participants. | Enabled when claim is in view mode, and not pushed to V7. |
| Claim\|Allocate | Menu Option | Opens the Claim Allocation window. | Enabled when claim is in view mode. |
| Claim\|Manage Physical File | Menu Option | Opens Physical File window | Enabled when claim is in view mode. |
| Claim\|Declare Event | Menu Option | Opens Declare Event window | Enabled when claim is in view mode. |
| Claim\|Close Claim Folder | Menu Option | Closes current claim folder window | Enabled |
| Edit\|Cut | Menu Option | Move selected text to the clipboard | Disabled |
| Edit\|Copy | Menu Option | Copy selected text to the clipboard | Disabled |
| Edit\|Paste | Menu Option | Paste text from the clipboard | Disabled |
| View\|Collapse All | Menu Option | Collapses the claim tree | Enabled |
| View\|Expand All | Menu Option | Expand the claim tree | Enabled |
| Policy\|Edit | Menu Option | Opens policy tabs in edit mode. | Enabled when claim is in view mode. |
| Policy\|Save | Menu Option | Save current policy tab information. | Enabled when policy level is in edit mode. |
| Participant\|New\|Claimant | Menu Option | Opens Participant tabs in edit mode for entry of a new claimant level node in the claim tree. | Enabled when claim in view mode. |
| Participant\|New\|Insured | Menu Option | Opens Participant tabs in edit mode for entry of a new insured level node in the claim tree. | Enabled when claim in view mode. |
| Participant\|New\|Other | Menu Option | Opens Participant tabs in edit mode for entry of a new entry in the Participant list. | Enabled when claim in view mode. |
| Participant\|Edit | Menu Option | Puts currently selected participant tabs into edit mode. | Enabled when claim is in view mode and participant selected in tree or list box. |
| Participant\|Save | Menu Option | Saves information changed on participant tabs and returns claim to view mode. | Enabled only when a participant level is in edit mode. |
| Participant\|Delete | Menu Option | Deletes selected participant | Enabled only when claim is in view mode and participant is selected. |
| Line\|New | Menu Option | Adds new line to claim tree and opens line tabs in edit mode. | Enabled when claim is in view mode, claimant has been selected, and limit of 15 lines per claimant has not been exceeded. |

-continued

| Control Name | Type | Description | Default Value/State |
|---|---|---|---|
| Line\|Edit | Menu Option | Puts Line tabs into edit mode so that the user can change line details | Enabled when claim is in view mode and line is selected. |
| Line\|Save | Menu Option | Save information entered on line tabs and returns claim to view mode. | Enabled when a line is in edit mode. |
| Line\|Change Status\|Close | Menu Option | Changes status of a line in the claim folder to "Closed" | Enabled when claim is in view mode, a line is selected, the line is not closed, and its V7 status is closed. |
| Line\|Change Status\|Reopen | Menu Option | Changes the status of the line selected to "Open". | Enabled when claim is in view mode, a line is selected, and line is "Closed". |
| Line\|Change Status\|Mark in Error | Menu Option | Marks selected line in error. | Enabled when claim is in view mode, a line is selected, and line has not been pushed. |
| Line\|Allocate | Menu Option | Opens the Claim Allocation window. | Enabled |
| Performers\|Assign | Menu Option | Opens the Assign Performers window | Enabled when claim is in view mode. |
| Performers\|View All | Menu Option | Displays all claim performers assigned to the claim in View Performer UI. | Enabled when claim is in view mode. |
| Utilities\|Print Screen | Menu Option | Prints current screen. | Enabled |
| Utilities\|View Task Assistant | Menu Option | Opens Task Assistant window for current claim. | Enabled when claim is in view mode. |
| Utilities\|Create New File Note | Menu Option | Opens File Notes window for current claim. | Enabled when claim is in view mode. |
| Utilities\|View Claim History | Menu Option | Opens Claim History window for current claim. | Enabled when claim is in view mode. |
| Utilities\|Create Correspondence | Menu Option | Opens Forms and Correspondence window. | Enabled when claim is in view mode. |
| Version 7\|Push Claim | Menu Option | Launches V7 to start the push process. | Enabled when claim is in view mode and in "Pre-Push" status or open when there are unpushed claimants and lines. |
| Version 7\|Undo Push | Menu Option | Reverts claim to pre-push status. | Enabled when claim is in view mode and status is "Push-Pending". |
| Version 7\|Make Payment | Menu Option | Open the V7 PUEM screen in the terminal emulator window if a claimant or participant tied to one claimant is selected. Otherwise, display window that requires user to select a claimant. | Enabled when claim had been pushed to V7 and a participant is selected. |
| Help\|Contents | Menu Option | Opens help file to content menu. | Enabled |
| Help\|Search For Help On | Menu Option | Open help file to search window. | Enabled |

-continued

| Control Name | Type | Description | Default Value/State |
|---|---|---|---|
| Help\|About | Menu Option | Opens window displaying information about the application. | Enabled |

Window Details

| Control Name | Initial Focus | Default Button | Tab Order |
|---|---|---|---|
| Claim Tree | Yes | | 1 |
| Participant List | | | 2 |
| Claim Menu | | | 3 |
| Edit Menu | | | 4 |
| View Menu | | | 5 |
| Policy Menu | | | 6 |

-continued

| Control Name | Initial Focus | Default Button | Tab Order |
|---|---|---|---|
| Participant Menu | | | 7 |
| Line Menu | | | 8 |
| Performer Menu | | | 9 |
| Utilities Menu | | | 10 |
| Version 7 Menu | | | 11 |
| Help Menu | | | 12 |

CAR Diagram

| Control Name | Action | Response | Short Cut Key | Mnemonic Key |
|---|---|---|---|---|
| Claim Tree | Click | Highlights Node in Tree Disable participant in list view if one selected previously Shows related tabs in view mode. Enable appropriate menu items and tool bar buttons. | | |
| | Double Click | Level selected in tree enters Edit mode. | | |
| All Text Fields | Highlight | Enable Cut and Copy. | | |
| Participant List | Click | Highlights participant in list box Deselects level in claim tree if one selected previously Shows related tabs in view mode. Enable appropriate menu items and tool bar buttons. | | |
| | Double Click | Participant selected in list view enters Edit mode. | | |
| Edit Tool Bar Button | Click | Changes the tabs for the level selected in the claim tree or participant list view to edit mode. | | |
| Refresh Tool Bar Button | Click | Refreshes the current claim, including all Participant and Line information. | | |
| Find Tool Bar Button | Click | Opens the Claim Search window to allow the user to search for another claim | | |
| Claim Allocation Tool Bar Button | Click | Opens the Claim Allocation window. | | |
| Manage Physical File Tool Bar Button | Click | Opens the Manage Physical File window. | | |
| Declare Event Tool Bar Button | Click | Opens the Declare Events window. | | |
| Claimant Tool Bar Button | Click | Adds claimant and opens Participant tabs in edit mode for entry of a new claimant level node | | |

-continued

| Control Name | Action | Response | Short Cut Key | Mnemonic Key |
|---|---|---|---|---|
| Participant Tool Bar Button | Click | Adds new participant and opens Participant tabs in edit mode. | | |
| Line Tool Bar Button | Click | Adds line and opens Line tabs in edit mode for entry of a new line level node. | | |
| Assign Performer Tool Bar Button | Click | Opens Assign Performer window | | |
| Print Screen Tool Bar Button | Click | Prints the current claim folder window. | | |
| Task Assistant Tool Bar Button | Click | Launches Task Assistant for the current claim | | |
| File Notes Tool Bar Button | Click | Launch File Notes for the current claim | | |
| Claim History Tool Bar Button | Click | Launch Claim History for the current claim | | |
| Correspondence Tool Bar Button | Click | Opens Forms and Correspondence window | | |
| Push to V7 Tool Bar Button | Click | Open the terminal emulator window at the first V7 setup screen. | | |
| Make Payment Tool Bar Button | Click | Open the V7 PUEM screen in the terminal emulator window if a claimant or participant tied to one claimant is selected. Otherwise, display window that requires user to select a claimant. | | |
| Help Tool Bar Button | Click | Opens Help | | |
| Claim|Edit | Click | Changes Claim tabs into Edit mode so that the user can make changes | | |
| Claim|Refresh | Click | Refreshes the current claim, including all Participant and Line information. | Ctrl + R | |
| Claim|Find | Click | Opens the Claim Search window | Ctrl + F | |
| Claim|Save | Click | Save the claim level when it is in edit mode. | | |
| Claim|Claim Status|First Report Complete | Click | Changes the status of the claim to "Unassigned" and creates First Report Complete Event. | | |
| Claim|Claim Status|Assignment Complete | Click | Changes the status of the claim to "Open" and creates Assignment Complete Event. | | |
| Claim|Claim Status|Close | Click | Initiates the close claim process | | |
| Claim|Claim Status|Reopen | Click | Changes the status of the claim to "Open". | | |
| Claim|Claim Status|Mark In Error | Click | Marks the current claim and all of its lines in error. Expires all participants. | | |
| Claim|Allocate | Click | Opens the Claim Allocation window. | | |
| Claim|Manage Physical File | Click | Opens Physical File window | | |
| Claim|Declare Event | Click | Opens Declare Event window | | |
| Claim|Close Claim Folder | Click | Closes current claim folder window | | |
| Edit|Cut | Click | Move selected text to the clipboard | Ctrl + X | |
| Edit|Copy | Click | Copy selected text to the clipboard | Ctrl + C | |

-continued

| Control Name | Action | Response | Short Cut Key | Mnemonic Key |
|---|---|---|---|---|
| Edit\|Paste | Click | Paste text from the clipboard | Ctrl + V | |
| View\|Collapse All | Click | Collapses the claim tree | | |
| View\|Expand All | Click | Expand the claim tree | | |
| Policy\|Edit | Click | Opens Policy tabs in edit mode | | |
| Policy\|Save | Click | Save policy information and returns tabs to view mode. | | |
| Participant\|New\|Claimant | Click | Opens Participant tabs in edit mode for entry of a new claimant level node in the claim tree. | | |
| Participant\|New\|Insured | Click | Opens Participant tabs in edit mode for entry of a new insured level node in the claim tree. | | |
| Participant\|New\|Other | Click | Opens Participant tabs in edit mode for entry of a new entry in the Participant list. | | |
| Participant\|Edit | Click | Puts currently selected participant tabs into edit mode. | | |
| Participant\|Save | Click | Saves information changed on participant tabs and returns claim to view mode. | | |
| Participant\|Delete | Click | Deletes selected participant | | |
| Line\|New | Click | Adds new line to claim tree and opens line tabs in edit mode. | | |
| Line\|Edit | Click | Puts Line tabs into edit mode so that the user can change line details | | |
| Line\|Save | Click | Save information entered on line tabs and returns claim to view mode. | | |
| Line\|Change Status\|Close | Click | Changes status of a line in the claim folder to "Closed" | | |
| Line\|Change Status\|Reopen | Click | Changes the status of the line selected to "Open". | | |
| Line\|Change Status\|Mark in Error | Click | Marks selected line in error. | | |
| Line\|Allocate | Click | Opens the Claim Allocation window. | | |
| Performers\|Assign | Click | Opens the Assign Performers window | | |
| Performers\|View All | Click | Displays all claim performers assigned to the claim in View Performer UI. | | |
| Utilities\|Print Screen | Click | Prints current screen. | Ctrl + P | |
| Utilities\|View Task Assistant | Click | Opens Task Assistant window for current claim. | | |
| Utilities\|Create New File Note | Click | Opens File Notes window for current claim. | | |
| Utilities\|View Claim History | Click | Opens Claim History window for current claim. | | |
| Utilities\|Create Correspondence | Click | Opens Forms and Correspondence window. | | |
| Version 7\|Push Claim | Click | Launches V7 to start the push process. | | |
| Version 7\|Undo Push | Click | Reverts claim to pre-push status. | | |
| Version 7\|Make Payment | Click | Open the V7 PUEM screen in the terminal emulator window if a | | |

-continued

| Control Name | Action | Response | Short Cut Key | Mnemonic Key |
|---|---|---|---|---|
| | | claimant or participant tied to one claimant is selected. Otherwise, display window that requires user to select a claimant. | | |
| Help\|Contents | Click | Opens help file to content menu. | | |
| Help\|Search For Help On | Click | Open help file to search window. | | |
| Help\|About | Click | Opens window displaying information about the application. | | |

Data Elements

| Literal | Length | Control Type | Data Entity Tie | Edit Rules* | Error Handling |
|---|---|---|---|---|---|
| Claim Tree | | Tree View | | | |
| Policy | | Tree View Node | Policy Number (Policy) | | |
| Insured | | Tree View Node | Participant Preferred Name (Insurance Involvement) | | |
| Claim | | Tree View Node | Claim Number (Claim) | | |
| Claimant | | Tree View Node | Particiapant Preferred Name (Insurance Involvement) | | |
| Line | | Tree View | Line Type (Line) | | |
| Participant List Box | | List View | Participant Preferred Name and Role (Insurance Involvement & Involvement Role) | | |

Commit Points

| | |
|---|---|
| Claim | \|Save Menu Option - Saves all claim level data |
| Policy | \|Save Menu Option - Saves all policy level data |
| Participant | \|Save Menu Option - Saves all participant level data |
| Line | \|Save Menu Option - Saves all line level data |
| Claim | \|Close Claim Folder Menu Option - Prompts user to save changes if in edit mode. |

Claim History

Definition

Claim history shows information in one user interface that is intended to include all the constituent elements of a claim file. The four types of history included in the component are searchable by common indexing criteria like participant, performer, and claim phase. A caption report can be produced which shows the history selected in a document format.

Value

Claim history provides the users with one common interface through which to view a large variety of information about the claim. It includes all history available on a claim, and is expanded as claim capabilities are built, like incoming mail capture. Users develop customized views of history based on any criteria the history can be indexed by, and these reports are saved as customizable Word documents. The way the history information is indexed provides quick access to pertinent data needed to respond to a variety of requests.

Key Users

All members of the claims organization can use claim history as a way to quickly see all activity performed on a claim. This utility increases the ability to locate key information regarding any claim.

Component Functionality

Claim history is a component that contains a simple process to retrieve history from the other components in the system. It contains no native data itself. Even viewing a history element is done in the component window where the item was first captured.

The second key process of claim history is to produce a caption report of all history elements according to the items the user wants to include.

There are two user interfaces needed for this component that correspond to the two key functions above:

Claim History Search: This window utilizes the claim phase, participant, performer and history type fields on each history record to help the user narrow the search for specific history.

Caption Report: This report uses the functionality of Word to produce a report of each history item the user wants to see and its associated detail. Since the report is produced in Word, it can be fully customized according to many different needs.

User Interfaces
  Claim History Search
  Caption Report (Word document, not UI design)

Forms and Correspondence

Definition

The Forms & Correspondence component supports internal and external Claim communication and documentation across all parts of the claims handling process.

The Forms and Correspondence-Create Correspondence function provides the ability to search for a template using various search criteria, select a template for use and then leverage claim data into the selected template.

The Forms and Correspondence-Template Maintenance function is a tool for the librarian to create, delete, and update Correspondence templates and their associated criteria.

Some specific processes supported by Forms & Correspondence are:
  Reporting of claims
    to state/federal agencies, etc. at First Notice of Loss
    internal requests for information
  Advising Participants
  Contacting Participants
  Performing Calculations
  Creating correspondence for claims or non-claims Value The Forms and Correspondence component supports user in creating documentation.

Leveraging information from the claim directly into correspondence reduces the amount of typing and dictating done to create forms and letters. The typical data available to the templates should include: author, addressee, claim number, date of loss, insured name, policy number, etc. A librarian adds and maintains standardized forms and letters in logical groupings made available for the entire company.

Key Users

Claim employees are the primary users of the Forms and Correspondence component, but it can be used by anyone who has access to the system to create documents using existing templates.

Forms and Correspondence librarians use the system to create, update or remove templates.

Component Functionality
  Forms and Correspondence—Create Correspondence
  1. Search for a template based on search criteria.
  2. Create a correspondence from a template using claim data.
  3. Create a correspondence from a template without using claim data.
  4. View the criteria for a selected template.
  5. View the Microsoft Word template before leveraging any data.
  Forms and Correspondence—Template Maintenance
  1. Search for a template based on search criteria.
  2. Create, duplicate, edit, and delete Correspondence templates and their criteria.
  3. Internally test and approve newly created/edited templates.
  4. Properly copy Word templates for NAN distribution.

User Interfaces
  Search for Correspondence
  Correspondence Details
  Associate Fields
  Maintain Correspondence Search
  Correspondence Template Information—Details tab
  Correspondence Template Information—Criteria tab
  Microsoft Word File Notes Definition File notes captures the textual information that cannot be gathered in discrete data elements as part of claim data capture. They are primarily a documentation tool, but also are used for internal communication between claim professionals. Users can sort the notes by participant or claim phase (medical, investigation, coverage, etc.) in order to permit rapid retrieval and organization of this textual information.

Value

File notes speeds the retrieval and reporting of claim information. A file notes search utility with multiple indexing criteria provides claim professionals and supervisors with the ability to quickly find a file note written about a particular person or topic. The file notes tool utilizes modern word processing capabilities which speed entry, reduce error, and allow for important information to be highlighted. Furthermore, the categorization and key field search eases the process of finding and grouping file notes. Finally, file notes improves communication as they can be sent back and forth between those involved in managing the claim.

Key Users

All members of the claims organization can utilize file notes. External parties via RMS can view file notes marked General. This utility increases the ability to locate key information regarding a claim. Anyone who wants to learn more about a claim or wants to record information about a claim utilizes the file notes tool.

Component Functionality

File Notes searching is included as part of the claim history component which allows the user to search the historical elements of a claim file including tasks, letters, and significant claim change events.

The user interfaces that are needed for this component are:
  The File Notes Search (part of Claims History component): This window utilizes the claim phase fields on the file notes record to help the user narrow the search for specific file notes. Also, it allows users to view all file notes that meet specified criteria in a report style format.
  File Notes Entry: The window used to record the file note. It embeds a word processing system and provides the ability to categorize, indicate a note as company (private) vs. general (public), save the note as a draft or a final copy, and send the note to another person.

User Interfaces
  File Notes
  Draft File Note Review
  Participant Search
  Performer Search Address Book Definition Address Book is the interface between the claims system and the Client database. The Client application is a new component designed to keep track of people or organizations that interact with RELIANCE for any reason, but claims are most likely the first application to use Client. The Address Book is accessed directly from the Desktop and from the Claim Folder.

The Address Book meets several needs within the claim organization. Although, its primary function is to support the adding of participants to a claim, it acts as a pathway to the Client database for searching out existing participants, and adding new people or organizations to the corporate database.

The Client database maintains information on names, addresses, phone numbers, and other information that always applies to a person or organization no matter what role they play on a claim.

Value

Address Book provides a common definition of people or organizations that interact with RELIANCE, and therefore provides a much more efficient means of capturing this information. Each Client database entry provides the ability to link a person or organization to all the different roles that they play across the organization, and therefore makes retrieving information on a client by client basis quick and easy.

There are many benefits to RELIANCE by having a common address book. Information on people and organizations is leveraged into other activities like enabled tasks that lookup a client's phone numbers when a call needs to be made. Information that has been redundantly stored in the past can be entered once and reused. Once all areas of RELIANCE use the Client application, different areas of the company can share definitions of individuals and organizations.

Component Functionality

Address Book allows users to add, edit and delete records from the Client database. It also provides a robust search facility, including phonetic name searches to find people contained in the Client database.

There are two primary user interfaces for the Address Book:
- Find Address Book Entry—This is a search window that allows a user to find records in the Client database using names, addresses, phone numbers, and other identifiers. From this window, specific records can be selected and attached as participants on claims.
- Maintain Address Book Entry—This window allows users to add or edit information about a client by specifying their names, addresses, phone numbers, email information, and identification numbers like a SSN or TIN.

The Address Book is created concurrently with the Client application to make sure that a consistent design approach is followed.

Key Users

All members of the claim organization use the Address Book to look up information on people and organizations in the client database. Those who set up and handle claims use the Address Book to identify participants.

User Interfaces
  Find Client
  Maintain Client

Index

Definition

The Index, or Claim Search, component provides the ability to locate claims within the system using various search criteria. The criteria cover a wider variety of search capabilities than exist today including, but not limited to, claim performers, participants, phonetic name searches, addresses, roles, offices, and lines of business. The search results display selected claim, participant, and performer data to help identify each claim.

The Index component also allows easy navigation to various claim components like the Claim Folder, once a claim has been identified. It can be accessed from the Desktop and from any open Claim Folder.

The Index component is designed to support several business processes within the claim organization. Its functions are critical to improving claim staff productivity and customer service in the following areas:

Matching Mail
  The capabilities of the Index search make it easier to identify the claim a piece of mail belongs to based on criteria used to identify claims in forms, correspondence, and bills. The performers for a claim can also be identified for mail routing purposes.

Phone Inquiries
  This window is the primary point to handle incoming phone inquiries for any claim. Users can find claims quickly without having to burden the caller with requests for additional information.

Duplicate Claims
  Prior to setting up new claims, checks can be done to ensure that the claim has not already been entered into the system. The additional search capabilities provide a greater assurance that duplicate claims will not be entered. This reduces the need to delete or merge claim records.

Fraud Identification
  Because claims can be searched easily by participant and other criteria, fraud questions can be easily researched. This is not the primary purpose of this component, however.

Value

Index reduces the time required to find existing claims, and also reduces potential rework from not finding claims when they are needed for matching mail or duplicate checks.

Key Users

Claim employees are the primary users of the Index window, but it can be used by anyone who has access to the system to access claims without having to memorize tracking numbers.

Component Functionality

Index is primarily a robust search engine that quickly and efficiently searches for claims. It is not a component that stores its own data, as it is primarily focused on pointing users more quickly and directly to claim data.

Index is composed of one search window that follows the format of all other search windows in the system.

User Interfaces
  Find Claims

Injury

Definition

The Injury component captures versions of a claimant's injuries as they progress. This window captures injury information in the form of discrete data fields, reducing the need for free form text file notes. Capturing data, instead of text, allows the injury to be closely tracked and quickly reported. The data can also serve as feedback statistics, i.e. for building best claims practices and in risk selection. The preferred method of identifying and documenting injuries is the ICD-9 code. The user can enter or search for the ICD-9 code using descriptors or numbers.

Value

Data on every injury is captured and summarized in a consistent, accessible format, making recording and reviewing the case considerably less time consuming and more organized, allowing the adjuster to focus on desired outcomes. This "snapshot" of the current status and history of an injury greatly facilitates handing off or file transfers between claim professionals. Additionally, the discrete data field capture enables the use of events to identify action points in the lifecycle of a claim that has injuries.

Key Users

All members of the claims organization can utilize the Injury component. This component increases the ability to locate and summarize key information regarding an injury.

Component Functionality

Injury is an aspect of participant information, which is related to the claimant participants on the claim. The participant component relates clients to all other claim-related entities. Information on injuries will be related to participant records and displayed at the participant level information in the Claim Folder. New entities are needed to implement injury data capture: injury and ICD-9 search. The Injury component interacts with five other components: Claim Folder—which contains Disability Management data about a claimant; Participant—which lists the individuals associated with the claim; as well as File Notes, Task Assistant and the Event Processor. The injury component also uses Microsoft WORD to create a formatted, historical injury report for a particular individual.

The user interfaces that are needed for this component are:
Injury: This is the primary injury window which captures basic injury report data, including: the source of the injury report, the date of the injury report, a Prior Medical History indicator, and then a detailed list of the injuries associated with that report. The detailed list includes discrete fields for the following data: ICD-9 code, body part, type, kind, severity, treatment, diagnostic, a free form text description field, and a causal relation indicator.
ICD-9: This is the search window for locating ICD-9 codes and associated descriptions.
Disability Management: This window contains a subset of participant data fields that enables more effective injury management.

Figure 10:
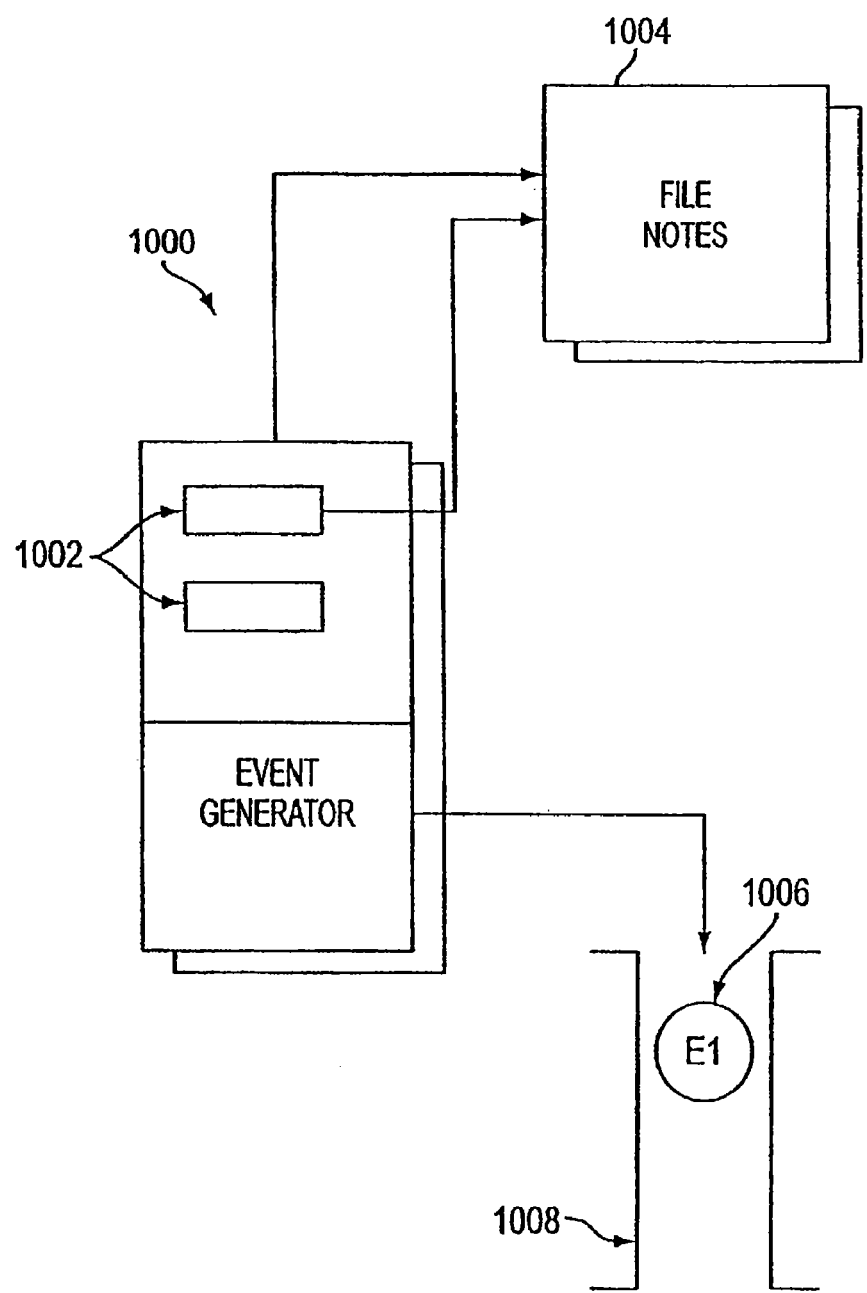
FIG. 10 is an illustration of the Negotiation component of one embodiment of the present invention.

User Interfaces
Claim Folder—Participant Level—Injury Tab
ICD-9 Search Window
Claim Folder—Participant Level—Disability Management Tab Negotiation Definition FIG. 10 is an illustration of the Negotiation component of one embodiment of the present invention. Negotiation provides a single, structured template that is supplemented by supporting views, to capture events regarding a negotiation. The negotiation interface 1000 captures key elements of a negotiation, such as a settlement target range, current demands and offers, and Supporting Strengths and Opposing Assertions of the claim. Negotiation information is gathered in discrete data elements 1002, enabling the capability to generate events 1006 based on key attributes or changes in a negotiation. These events 1006 are then sent to a common event queue 1008. The negotiation component 1000 interfaces with the File Notes 1004 component to provide additional documentation capability, in a non-structured format. The negotiation template is supported by all other data contained in the Claim Folder.

Value

Data on every case is summarized in a consistent, accessible format, making recording and reviewing the case considerably less time consuming and more organized, allowing the adjuster to focus on negotiation strategy and desired outcomes. This "snapshot" of the current status greatly facilitates handing off or file transfers between claim professionals. Additionally, the discrete data field capture enables the use of events to identify action points in a negotiation.

Key Users

All members of the claims organization can utilize Negotiation. This component increases the ability to locate and summarize key information regarding a negotiation.

Component Functionality

Negotiation is a type of resolution activity, which is part of the claim component of the claims entity model. The claim component is the central focus of the claims entity model, because it contains the essential information about a claim. The claim component supports the core claim data capture functionality, first notice processes, and resolution activity for claims. The main types/classes of data within the claim component are: Claim, Claimant, Line, Claim History, Resolution Activity, Reserve Item, and Reserve Item Change. Three entities are needed to implement negotiation: resolution activity, claim and claim history. There is also interaction between the Negotiation component and the Task Assistant, File Notes and Event Processor components.

The user interfaces needed for negotiation are:
Negotiation: This window captures demand and offer data, including: amount, date, type and mode of communication. The target settlement range, lowest and highest, is captured, along with strengths and weaknesses of the case.

Supporting user interfaces, which are also part of the Claim Folder, include:
Liability (claim level tab): This window is used to document liability factors in evaluating and pricing a claim. The liability factors include percent of liability for all involved parties; form of negligence that prevails for that jurisdiction; theories of liability that the claim handler believes to be applicable to the claim. Used prior to developing negotiation strategy.
Damages (line level tab): This window provides the capability for pricing and evaluating a claim based on incurred and expected damages. Used prior to developing negotiation strategy.

Figure 11:
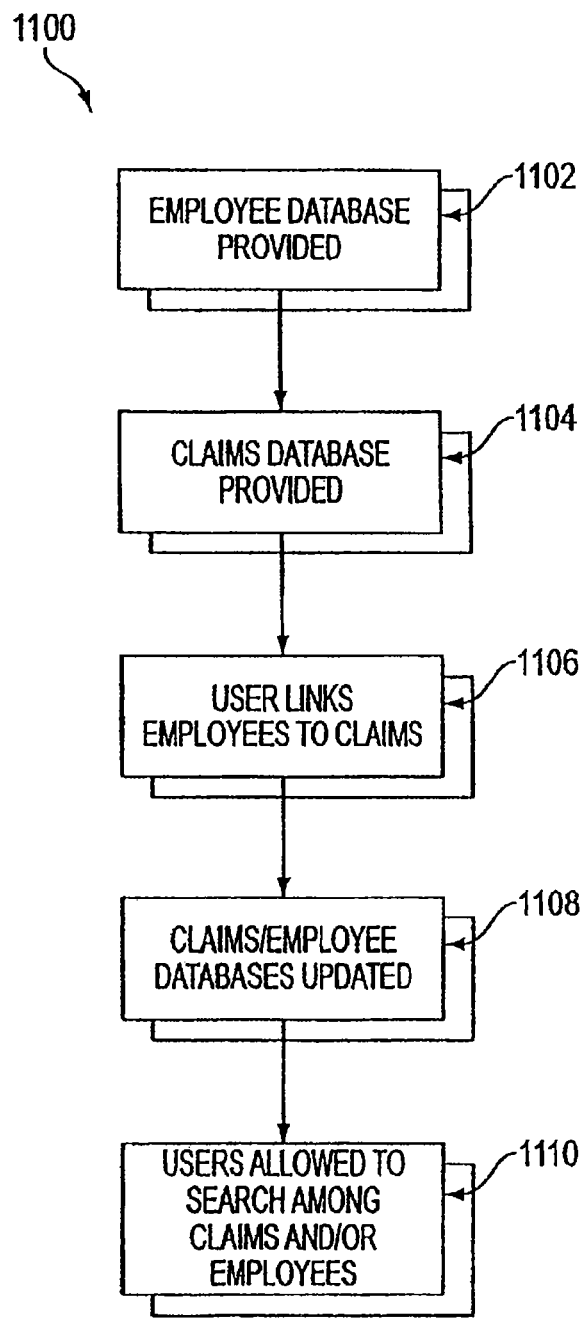
FIG. 11 is a flow diagram of the operations carried out by the Organization component of one embodiment of the present invention.

User Interfaces
Claim Folder—Line Level—Negotiation Tab
Claim Folder—Claim Level—Liability Tab
Claim Folder—Line Level—Damages Tab Organization Definition FIG. 11 is a flow diagram of the operations utilized by the Organization component in accordance with one embodiment of the present invention. The Organization component 1100 allows common information for the people who perform work on claims to be stored, searched, and reused across all the claims they work.

In one embodiment of the organization component 1100, all employee records are kept in a common database 1102 so that they can be attached to the specific claims they work, located in a claim database 1104. The common information that is kept on the employee record includes name, location, phone, and some minimal organizational context information like office or division. This is the minimum required to support the tracking of performers on claims. The employee information 1102 is then linked 1106 to the claim information 1104 and the databases are updated 1108. Having linked the employees 1102 with the claims 1104 they are working on, the database can be searched by employee or claim 1110.

However, this version of the organization can be expanded to include organization relationships (specifically tracking where an employee falls in the organization structure), groups of individuals as performers for claim assignment, and claim allocation within the organization structure. These capabilities are to support any notion of caseload analysis, management reporting, or automated assignment that would need to be included.

Value

By tracking common definitions of employees across claims, indexing capabilities are improved and performers on claims are accurately tracked.

Key Users

The primary users of the organization capabilities are the administrative personnel who set up performers, as well as the technicians who track who is working a claim.

Component Functionality

The design of the minimum scope of the organization component includes a search window to find employees in the organization and a detail window to see specific information on each employee.

User Interfaces
- Organization Entity Search
- Add/Edit Organization Entity

Participant

Definition

Figure 12:
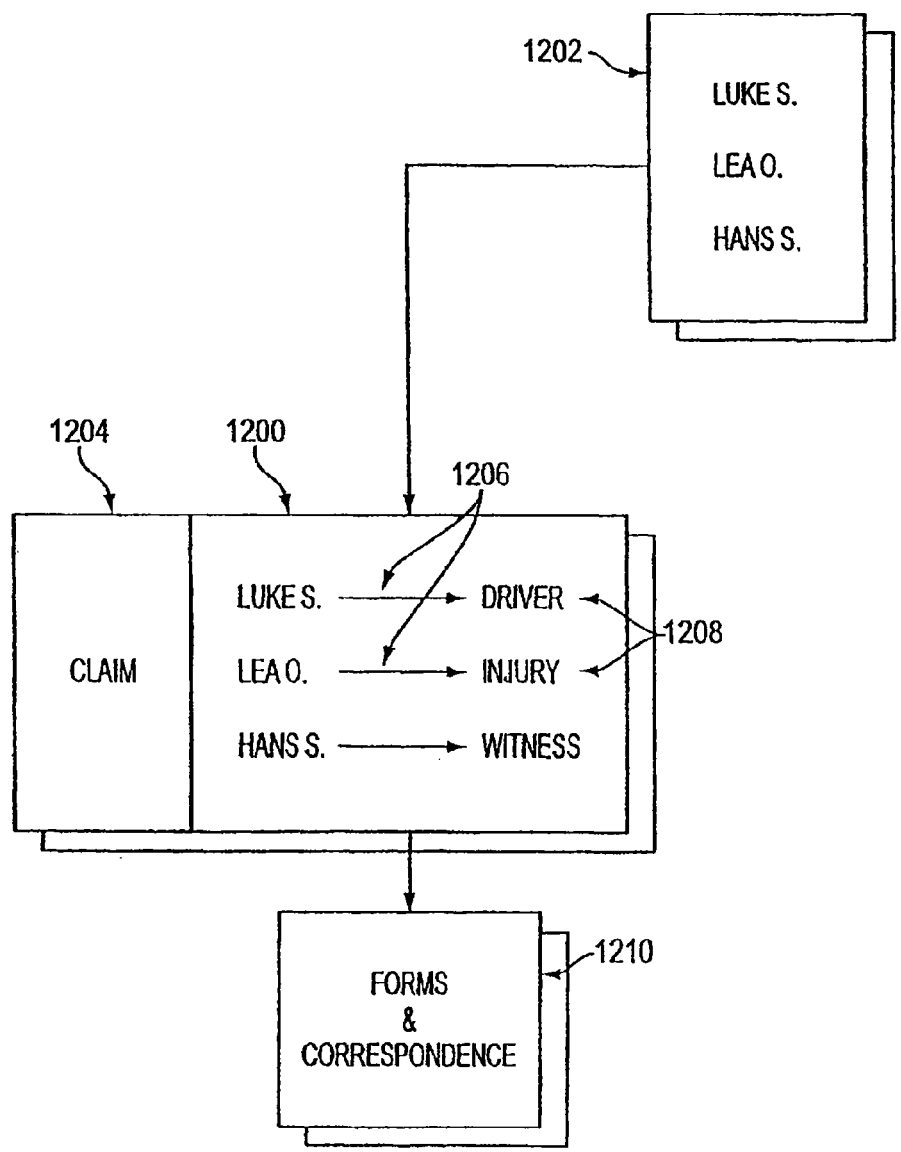
FIG. 12 is an illustration of the Participant component of one embodiment of the present invention.

FIG. 12 is an illustration of the Participant component in accordance with one embodiment of the present invention. Participant 1200 provides the link between claims and individuals and organizations stored in the Client database and accessed through the Address Book 1202. Participant links clients to claims 1204 by defining the roles that they play, e.g. claimant, driver, or doctor. It reuses the information contained in the Address Book 1202 so that it does not have to be reentered for each participant.

The participant component also allows linkages 1206 to be made between participant and to various items on claims. A doctor can be linked to the claimant they treat and a driver can be linked to the damaged vehicle they were driving.

Once a participant has been added to a claim, additional information 1208 that is specific to that claim can be attached. This information includes injury, employment, and many other types of information that are specific to the role that a person or organization plays in a claim.

The business processes primarily supported by Participant 1200 are:

Recording Involvement in a Claim
 There is a basic data capture requirement to keep track of individuals and organizations involved in a claim, and this is done most efficiently using the participant approach.
Recording Role Specific Information
 Address Book 1202 stores information that can be reused across claims, but the Participant component 1200 needs to maintain the information that is specific to an individual or organization's involvement in a specific claim.
Making Contact with Clients
Because participant ties back to the common Address Book 1202, any contact information contained there can be quickly and easily obtained.
Forms and Correspondence 1210
Leveraging address information into letters provides an efficiency enablement to all users who don't need to look up name and address information.
Categorizing History Information
Participants are used to categorize history items like tasks and file notes so that information relating to a single participant on a claim can be easily retrieved.
Claim Indexing
Attaching participants to a claim allows the Index component to be more effective in the processing of claim inquires.

Key Users

The primary users of the Participant components 1200 are those who work directly on processing claims. They are the ones who maintain the participant relationships.

Claims professionals who deal with injuries use the Participant tabs in the claim folder to track injuries and manage disabilities for a better result on the claim.

Value

Because the Participant component 1200 only seeks to define the roles that individuals and organization play across all claims, there is no redundant entry of name, address, and phone information. This is all stored in the Address Book 1202.

The number of potential participant roles that can be defined is virtually limitless, and therefore expandable, as the involvement of additional people and organizations needs to be captured.

Component Functionality

Most participant functionality is executed within the context of the Claim Folder. The Claim Folder contains participants levels in two ways. First, claimants are shown in the claim tree on the left-hand side of the window. Below this, other participants are shown in a list. Selecting any participant displays a set of participant information tabs that displays the following information:

Participant Details—Basic information about the role that a participant plays in a claim and all the other participants that are associated to it.
Contact Information—Information from the Address Book on names, addresses, and phone numbers.
Injury—Specific information on the nature of injuries suffered by injured claimants.
Disability Management—Information on injured claimants with disabilities.

Only the first two tabs will be consistently displayed for all participants. Other tabs can appear based on the role and characteristics of a participant's involvement in a claim.

Adding or editing participant role information is actually done through the Address Book 1202 search window. The process is as simple as finding the Address Book 1202 record for the intended participant and specifying the role the participant plays in the claim. Once this is done, the participant will be shown in the Claim Folder, and additional information can be added.

The notion of a participant is a generic concept that is not specific to claims alone. It is a based on design pattern that can be expanded as additional claims capabilities are built. Any involvement of an individual or an organization can be modeled this way.

User Interfaces
- Participant Level—Participant Details Tab
- Participant Level—Contact Information Tab
- Participant Level—Events Tab
- Participant Level—Injury Tab (Injury Component)
- Participant Level—Disability Management Tab (Injury Component)
- View Participant List

Performer

Definition

The Performer component allows organizational entities (individuals, groups, offices, etc.) to be assigned to various roles in handling the claim from report to resolution. The Performer component is utilized on a claim-by-claim basis.

A performer is defined as any individual or group that can be assigned to fulfill a role on a claim.

The Performer component supports the assignment processes within the claim handling process. This goes beyond the assignment of claim at FNOL. This component allows the assignment of work (tasks) as well.

Some specific processes supported by Performer are:
    Assign claims
        identification of different roles on the claims in order to assign the claim (Initiate Claim—DC Process Work)
    Keeps roles and relationships of performers within claims
    Assigning tasks
    Reassignments
    Supports Initiate claim process—assignment
    Search mechanism for employees, offices
    All performers should be in the Organization component
    Provides history of assignments Value The Performer component allows the assignment of roles or tasks to individuals or groups. The data about performers resides in a common repository: the Organization component.

The Performer component reduces the time required to find employees, teams or any potential performer, and ensures consistency of data.

Key Users

The primary users of the Performer component are those who work directly on processing claims. They are the ones who maintain the assignment of roles or tasks related to a claim.

Component Functionality

The Performer component supports an informational function and an assignment function.
1. View details for performers (employee, office, unit, etc.). These details may suggest organizational entity relationships but in no way define or maintain them.
2. View all performers assigned to a claim, currently and historically (includes individuals, groups, offices, etc.)
3. Assign performers to a claim—at the claim level, claimant, and supplement levels (including individuals, office, groups, etc.)

User Interfaces
    Assign Performer
    Performer Roles
    View Performer List

Task Assistant

Definition

The Task Assistant is the cornerstone of a claim professional's working environment. It provides diary functions at a work step level that allow the management of complex claim events. It enables the consistent execution of claim best practices by assembling and re-assembling all of the tasks that need to be performed for a claim based on detailed claim characteristics. These characteristics come from regulatory compliance requirements, account servicing commitments, and best practices for handling all types of claims. The Task Assistant also provides mechanisms that automate a portion of or all of the work in performing a task to assist the claim professional in completing his or her work. Once a task is completed, the Task Assistant generates a historical record to document the claim handler's actions.

The Task Assistant is . . .
        A method for ensuring consistent execution of regulatory requirements, account servicing commitments and claim handling best practices
        A source of automated assistance for claim professionals
        An organization-wide communication tool within the context of a claim (it does not replace Lotus Notes).
        A mechanism for making claims strategy common practice and sharing corporate experience
        A diary application to keep track of claims
        A historical tracking tool
        A way to get a claim professional's or a team leader's attention
        A mechanism for making process changes in the organization quickly Within the Task Assistant, claim professionals have the ultimate control to determine if and when tasks need to be completed. They also have the ability to add tasks to the list to represent work they do that is not reflected in standard definitions of tasks in the system. This supports a vision of the claim professional as a knowledgeable worker who spends most of his or her time focused on a successful result through investigation, evaluation, and negotiation of the best possible outcome.

Value

The Task Assistant reduces the time required to handle a claim by providing the claim professional with the automatic scheduling of claim activity. It helps the claim professional remember, perform and record tasks completed for every claim. Completed tasks are self-documenting and remain part of the claim history.

The Task Assistant also ensures the consistent handling of claims throughout the organization, and by doing so can significantly impact expenses and loss costs. Furthermore, it helps ensure regulatory compliance and the fulfillment of account promises. It supports the teamwork required in handling difficult claims as a structure communication mechanism.

The automated enablements for tasks reduce the amount of time claim professionals have to spend on low value-added activities such as writing correspondence. They can therefore spend a larger amount of time investigating, evaluating, and negotiating each claim.

Key Users

While claim professionals are the primary users of the Task Assistant, others use the application as well. The entire claims department utilizes the Task Assistant to structure work and communicate with one another. Team leaders use the Task Assistant to conduct file review and to guide the work of the claim professional. Administrative staff use the Task Assistant as a means to receive work and to communicate the completion of that work. Claim professionals use the Task Assistant to complete work and to request assistance from team leaders and specialty claim professionals.

The Task Assistant requires a new type of user to set-up and maintain the variety of tasks that are created. A task librarian maintains the task library, which contains the list of all the standardized tasks across the organization. The librarian defines rules which cause tasks to be placed on task lists based on claim characteristics, dates which define when tasks are due, and task enablement through other applications.

Component Functionality

Figure 13:
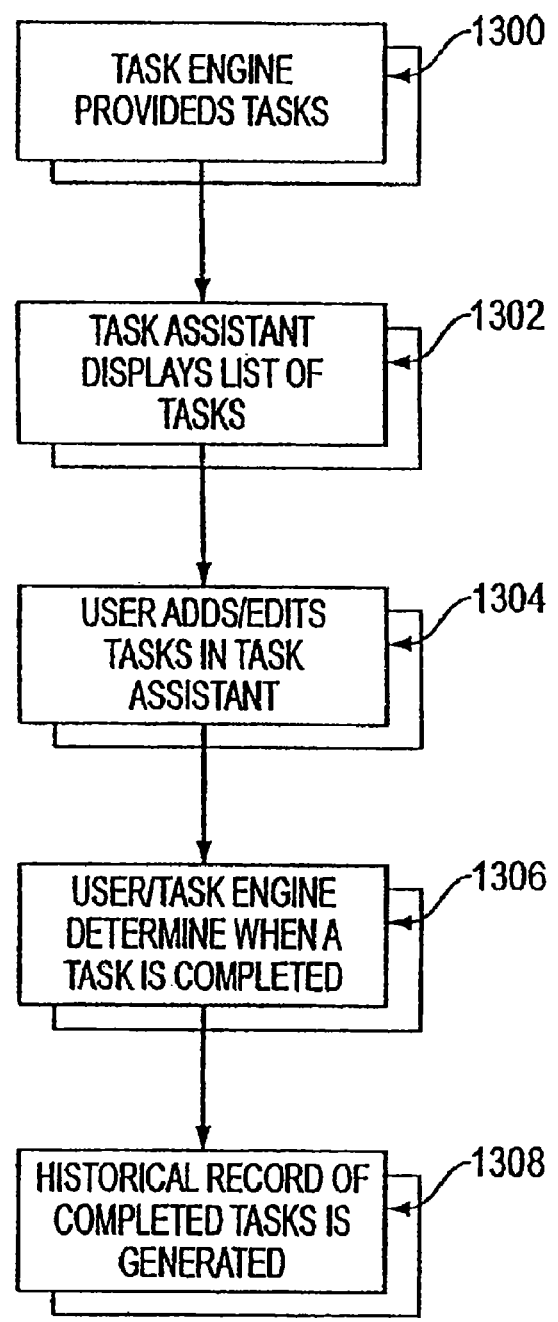
FIG. 13 is a flow diagram of the operations carried out by the Task Assistant component of one embodiment of the present invention.

FIG. 13 is a flow diagram of the operations utilized by the Task Assistant component of the present invention. The processing of tasks through the Task Assistant comprises the lifecycle of the task from its creation to its completion or deletion. In first operation 1300, the Task engine provides tasks to the Task Assistant. In the second operation 1302, the Task Assistant then displays the list of tasks provided by the Task Engine. In the third operation 1304, the user is allowed to add tasks and edit tasks provided by the Task Engine. The fourth operation 1306 occurs as the claim is processed. As the claim is processed, the user and the Task Engine determine when the various tasks are completed. When a tasks is completed, the fifth operation 1308 occurs. In the fifth 1308 operation, a historical record is generated for any tasks which is determined to be completed.

The key user interfaces for this component are:

The Task Assistant: This is the utility that supports the population, execution, and historical tracking of tasks. It allows users to perform tasks, complete tasks, and remove tasks that have been automatically added.

The Task Workplan: This user interface allows the user to strategize the plan for a specific claim. It shows tasks attached to their respective levels of the claim including lines, participants, and the claim itself.

Task Enablement Windows: There are many windows that can be added to enable task with other applications such as telephone support, forms and correspondence, and file notes. The number of potential task enablements is virtually limitless.

Task Entry: Allows a user to add new task that weren't automatically added to the task list to cover situations where the claim handler wants to indicate work to be done that is not reflected by the standard task definitions in the task library.

Behind the functioning of the Task Assistant, the Task Engine continually evaluates messages sent from other components and determines based on the rules established by the task librarian, which tasks should be populated on the Task Assistant. Messages are sent to the Task Assistant when something significant occurs in another component. The messages contain the characteristics the Task Engine needs to evaluate in order to place the proper tasks on the task list.

Figure 14:
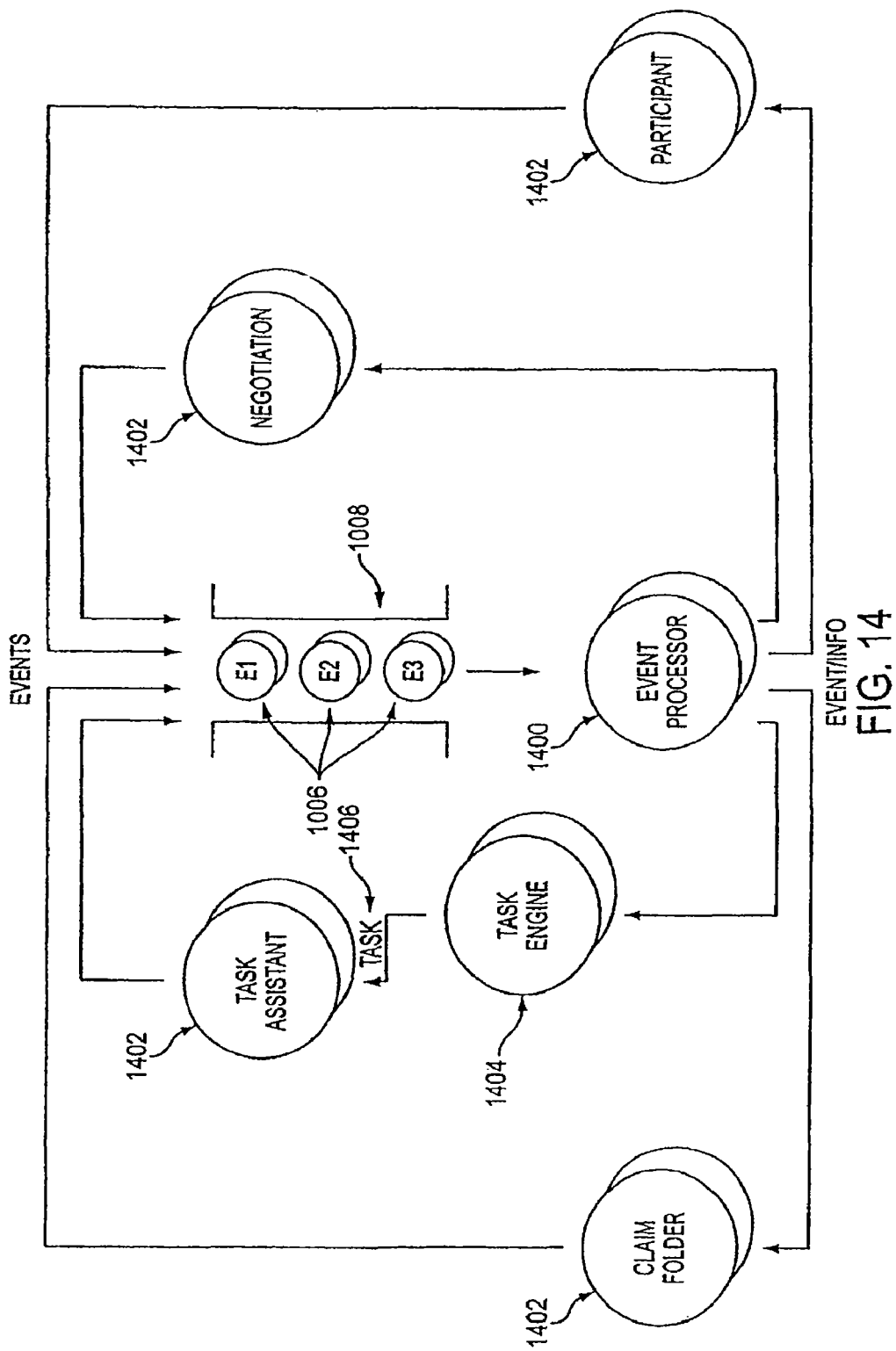
FIG. 14 is an illustration of the Event Processor in combination with other components of the system in accordance with on embodiment of the present invention.

User Interfaces
 Task Assistant
 Reassign Task
 Edit/Add Task
 Clear Task
 Mark Task In Error
 Build Workplan
 Participant Search
 Participant Phone Number
 Phone Task
 Personal Profile
 Account Search
 Organization Search
 Performer Search Event Processor/Task Engine Definition FIG. 14 is an illustration of the Event Processor 1400 in combination with other components of the system in accordance with on embodiment of the present invention. The Event Processor 1400 works behind the scenes of all claims applications to listen for significant events that have occurred in the life of various entities in the system like claims (but potentially many more like accounts or policies in the future). It determines what the response should be to each event and passes it onto the system component that will process it. The Event Processor is completely generic to any specific entity or event in the system and therefore enables automation based on an almost limitless number of events and responses that could be defined.

Figure 15:
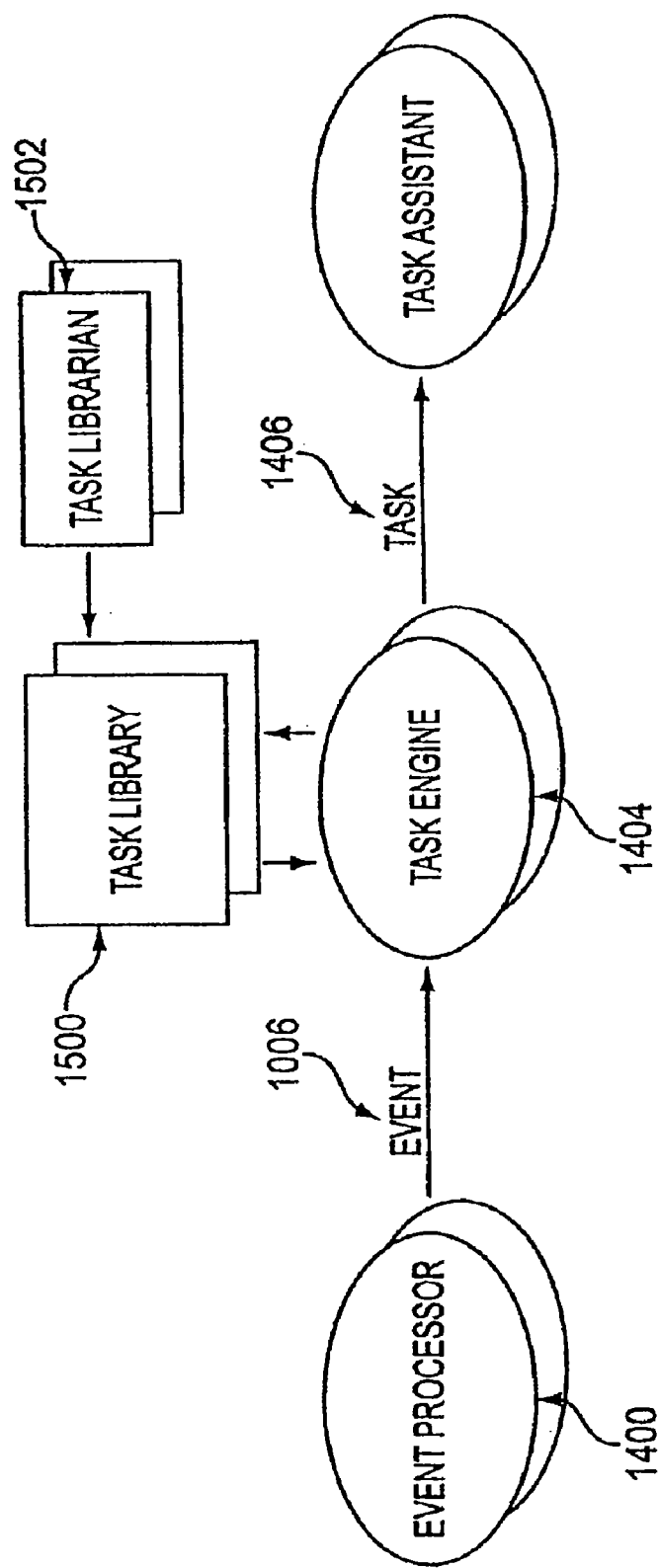
FIG. 15 is an illustration of the Task Engine in accordance with one embodiment of the present invention.

FIG. 15 is an illustration of the Task Engine 1404 in accordance with one embodiment of the present invention. The Task Engine 1404 processes the most common set of event responses, those that need to generate tasks 1406 based on events 1006 that have occurred. It compares the tasks that have been defined to the system to a set of claim criteria to tell which tasks should be added and which tasks should now be marked complete.

The only interface the user sees to these components is the task library 1500, which allows task librarians 1502 to define the tasks and the rules that create them which are used by the Task Engine 1404. Working with these components is almost entirely a function performed by specialists who understand the complexity of the rules involved in ensuring events 1006 and tasks 1406 are to handled properly.

The event processor 1400 also manages the communication and data synchronization between new claim components and LEGACY claim systems. This single point of contact effectively encapsulates the complex processes of translation and notification of events between the two systems.

Value

The automated determination of event responses provides enormous benefits to system users by reducing the maintenance they have to perform in ensuring the correct disposition of claims. Users trigger events by the data they enter and the system activities they perform, and the system automatically responds with appropriate automated activities like generating tasks.

The task generation rules defined in the Task Library provide an extremely flexible definition of claim handling processes limited only by the data available in the system on which task creation rules can be based. Process changes can be implemented quickly by task librarians, and enforced through the Task Assistant.

Key Users

Although all claim personnel directly benefit from the functioning of the event processor and task assistant, only specially trained users control the processing of these components. Task Librarians using the Task Library user interface handle the process of defining new tasks and the rules that trigger them in the Task Engine.

Operations personnel who ensure that all events are processed correctly and that the appropriate system resources are available to manage the throughput handle event processing.

Component Functionality

As shown in FIG. 14, the Event Processor 1400 utilizes a common queue 208 of events 1006 that are populated by any component 1402 of the system to identify what events have occurred. Working this queue, the Event Processor determines the appropriate response for an event and provides information to other components that need to process them. The Event Processor does not process any events itself and maintains clear encapsulation of system responsibilities. For example, an event that affects claim data is processed by the claim component.

The Task Engine 1404 follows a process of evaluating events 1006, determining claim characteristics, and matching the claim's characteristics to tasks defined in the Task Library 1500.

The key user interface for the Task Engine 1404 is the Task Library 1500. The Task Library 1500 maintains the templates that contain the fields and values with which tasks are established. A task template might contain statements like "When event=litigation AND line of business=commercial auto, then . . . " Templates also identify what a tasks due date should be and how the task is enabled with other applications.

User Interfaces
 Search Task Template
 Search Triggering Templates
 Task Template Details While various embodiments have been described above, it should be understood that they have been presented by way of example only, and not limitation. Thus, the breadth and scope of a preferred embodiment should not be limited by any of the above described exemplary embodiments, but should be defined only in to accordance with the following claims and their equivalents.

We claim:

1. A computer system for displaying information about an insurance claim for an insured event on a screen of a visual display device, the computer system comprising:
   a server computer comprising a hardware configuration of a central processing unit, a memory and an input/output adapter, the memory having stored thereon logic executable by the central processing unit including an event processor and a task engine that interacts with the event processor to enable said insurance claim to be processed; and
   an insurance claim database coupled to the server computer and storing data in electronic format, the insurance claim database comprising a claim folder that decomposes data of an insurance claim for the insured event into a plurality of levels, the plurality of levels including a policy level, a claim level, a participant level and a line level,
   wherein the server computer is configured to generate a user interactive interface that interactively displays on the screen of the visual display device at least one of the plurality of levels reflecting information related to a policy, the claim, claimants and an insured person in a structured format to a plurality of users, and to allow each of the users to simultaneously interact with one of the plurality of levels to retrieve and enter data for the same insurance claim;
   wherein the event processor maintains encapsulation of responsibilities of said computer system for displaying information from said event processor, wherein said responsibilities do not include functions performed by said event processor, interacts with the insurance claim database to identify a data event that affects data in the claim folder, determines a response, identifies a system component to enable said claim to be processed and transmits the data event to the identified system component;
   wherein when said identified system component is the task engine, the task engine evaluates the data event, determines claim characteristics and matches the characteristics to tasks to automatically generate a list of tasks to be taken by one of the plurality of users handling said insurance claim to direct a workflow for said insurance claim to be processed.

2. The system of claim 1 wherein the visual display device displays policy level information comprising information related to covered autos for auto claims, information related to covered property for property claims and information related to covered yachts for marine claims.

3. The system of claim 1 wherein the visual display device displays claim level information comprising details information, facts of loss information, events information and liability information.

4. The system of claim 1 wherein the visual display device displays participant level information comprising details information and contact information, information related to the insured event, injury information and disability management information.

5. The system of claim 1 wherein the visual display device displays line level information comprising information related to damaged vehicles for vehicle lines, information related to damaged property for property lines and information related to damaged yachts for marine lines, and information related to the insured events, damages and negotiation associated with the vehicles, property and yachts.

6. The system of claim 1, wherein the visual display device displays claim level information comprising details information, facts of loss information, events information and liability information.

7. The system of claim 1 wherein the visual display device displays participant level information comprising information related to persons involved in the claim, information related to the role of persons in the claim and contact information of the persons.

8. The system of claim 1 wherein the line level comprises a user interface enabling the capture of negotiation information.

9. The system of claim 1 further comprising a client computer in communication with the server computer, wherein the client computer is configured to provide information concerning an individual in the insured event and for allowing one of the plurality of users to link the individual to the insured event.

10. The system of claim 9 wherein the client computer is configured to display the user interface as a response to the communication with the server computer.

11. The system of claim 10 wherein the client computer is configured to allow one of the plurality of users to edit information associated with the plurality of levels.

12. The system of claim 10 wherein the database is configured to allow one of the plurality of users to search for information associated with one of the policy level, the claim level, the participant level and the line level.

13. The system of claim 1 wherein the visual display device displays participant level information comprising a category of historical information, a claim index and contact information.

14. The system of claim 1 wherein the visual display device displays policy level information comprising information on the claimants that are injured with disabilities.

15. The system of claim 1 wherein the visual display device displays policy level information comprising specific information on injuries suffered by the claimants.

16. The system of claim 15 further comprising a statistical model for claim practices and risk selection that uses the specific information on injuries suffered by the claimants, said specific information being stored in claims folders and accessible by said server computer.

17. The system of claim 15 wherein the specific information is represented by ICD-9 code.

18. The system of claim 1 further comprising a client computer in communication with said server computer, said client computer displaying a claim tree associated with said policy.

19. The system of claim 18 wherein said claim tree lists said policy, said insured person, claimants and related lines in a claim tree format.

20. The system of claim 18 wherein said client computer further displays claim level tabs.

21. The system of claim 18 wherein said claim folder displayed on a client computer can be changed between a view mode and an edit mode.

22. The system of claim 21 further comprising menu options displayed on said client computers, wherein said menu options depend upon whether said claim folder is in said view mode or said edit mode.

23. The system of claim 18 wherein the insurance claim database uses an optimistic locking mechanism when the claim tree is displayed to the plurality of users simultaneously.

24. A computer system that displays insurance claim information about an insured event, the computer system comprising:
- an insurance claim database comprising data in electronic format, the insurance claim database comprising a claim folder that decomposes data of an insurance claim for the insured event into a plurality of levels, the plurality of levels including a policy level, a claim level, a participant level and a line level;
- a server computer comprising executable logic stored on a memory including:
  - an event processor that identifies a data event, determines a response, identifies a system component to process an insurance claim and transmits information regarding the data event to the identified system component; and
  - a task engine that interacts with the event processor to enable the insurance claim to be processed; and
- a user interactive interface that is generated by the server computer that interactively displays, on a screen of a hardware visual display device, information from at least one of the plurality of levels in a structured format to a plurality of users, allowing each of the users to simultaneously interact with one of the plurality of levels to retrieve and enter data for the same insurance claim, the entered data triggering the data event,
- wherein when the event processor identifies the task engine as the system component to process the insurance claim, the task engine evaluates the event, determines claim characteristics for the event and matches the characteristics to tasks to automatically generate a list of tasks to be taken by one of the plurality of users handling the insurance claim to direct a workflow for the insurance claim to be processed.

25. A computer system for displaying insurance claim information comprising:
- an insurance claim database comprising data in an electronic format, the insurance claim database comprising a claim folder that decomposes data of an insurance claim for an insured event into a plurality of levels, the plurality of levels include a policy level, a claim level, a participant level and a line level;
- a server computer having a hardware configuration of a central processing unit, a memory, and an input/output adapter, and
- a user interactive interface that is generated and interactively displays, on a screen of a hardware visual display device, information from at least one of the plurality of levels in a structured format to a plurality of users, wherein a plurality of users via a plurality of interfaces is allowed to simultaneously interact with one of the plurality of levels to retrieve and enter data on the same insurance claim;
- wherein the server computer comprises executable logic stored on the memory including an event processor that identifies the entered data as a data event, determines a response for the data event and identifies a system component to process the response and transmits information for processing the claim to the identified system component.

* * * * *